(12) United States Patent
Landwehr et al.

(10) Patent No.: US 7,496,228 B2
(45) Date of Patent: Feb. 24, 2009

(54) METHOD AND SYSTEM FOR DETECTING AND CLASSIFYING OBJECTS IN IMAGES, SUCH AS INSECTS AND OTHER ARTHROPODS

(76) Inventors: Val R. Landwehr, 5005 Belmont Ave. South, Minneapolis, MN (US) 55419; Fernando Agudelo-Silva, 520 Santa Barbara Rd., Berkeley, CA (US) 94707

( * ) Notice: Subject to any disclaimer, the term of this patent is extended or adjusted under 35 U.S.C. 154(b) by 1035 days.

(21) Appl. No.: 10/838,928

(22) Filed: May 3, 2004

(65) Prior Publication Data

US 2005/0025357 A1 Feb. 3, 2005

Related U.S. Application Data

(60) Provisional application No. 60/478,636, filed on Jun. 13, 2003.

(51) Int. Cl.
*G06K 9/00* (2006.01)
(52) U.S. Cl. ........................ 382/170; 382/165
(58) Field of Classification Search ................ 382/110, 382/162, 165, 168, 170, 173
See application file for complete search history.

(56) References Cited

U.S. PATENT DOCUMENTS

| | | | |
|---|---|---|---|
| 3,949,515 A | 4/1976 | Mitchell et al. | |
| 4,611,425 A | 9/1986 | Dickerson | |
| 5,546,475 A * | 8/1996 | Bolle et al. | 382/190 |
| 5,594,654 A | 1/1997 | Shuman et al. | |
| 5,646,404 A | 7/1997 | Litzkow et al. | |
| 6,112,454 A | 9/2000 | Plato et al. | |
| 6,430,868 B1 | 8/2002 | Plato et al. | |
| 6,445,409 B1 * | 9/2002 | Ito et al. | 348/155 |
| 7,020,329 B2 * | 3/2006 | Prempraneerach et al. | 382/164 |
| 2002/0144452 A1 | 10/2002 | Beroza | |

OTHER PUBLICATIONS

Adlerz, W. C. "Comparison of Aphids Trapped on Vertical Sticky Board and Cylindrical Aphid Traps and Correlation with Watermelon Mosaic Virus 2 Incidence." *Journal of Economic Entomology* 69 (4) (Aug. 1976) : 495-498.

(Continued)

*Primary Examiner*—Phuoc Tran
(74) *Attorney, Agent, or Firm*—Charles A. Lemaire; Lemaire Patent Law Firm, P.L.L.C.

(57) ABSTRACT

A color-based imaging system and method for the detection and classification of insects and other arthropods are described, including devices for counting arthropods and providing taxonomic capabilities useful for pest-management. Some embodiments include an image sensor (for example, a digital color camera, scanner or a video camera) with optional illumination that communicates with a computer system. Some embodiments include a color scanner connected to a computer. Sampled arthropods are put on a scanner to be counted and identified. The computer captures images from the scanner, adjusts scanner settings, and processes the acquired images to detect and identify the arthropods. Other embodiments include a trapping device and a digital camera connected by cable or wireless communications to the computer. Some devices include a processor to do the detection and identification in the field, or the field system can send the images to a centralized host computer for detection and identification.

22 Claims, 41 Drawing Sheets
(12 of 41 Drawing Sheet(s) Filed in Color)

OTHER PUBLICATIONS

Agudelo-Silva, F., et al. "Dormant Season Application of Steinernema Carpocapsae (Rhabditida: Steinernematidae) and Heterorhabditis Sp. (Rhabditida: Heterorhabditidae) On Almond For Control of Overwintering Amyelois Transitella and Anarsia Lineatella (Lepidoptera: Gelechiidae)" *Florida Entomologist* 78 (3) (Sep. 1995) : 516-523.

Atmar, J. W., et al. "Construction of a Device to Identify and Count Insects Automatically" *Environmental Entomology*, 2 (4) (Aug. 1973) : 713-716.

Ballard, Dana et al. "Computer Vision", *Prentice-Hall, Inc.*: Englewood Cliffs, NJ, (1982),Table of Contents, 151-152, 235-127, Author Index, Subject Index.

Barnett, Vic , et al. "Outliers in Statistical Data (Second Edition)", *John Wiley & Sons Ltd.: Chichester*, (1978) : Table of Contents 144-202, 243-280, Index.

Bergman, D. K. et al. "Cuticular Hydrocarbons of the Russian Wheat Aphid", *Southwestern Entomologist* 15 (2) (Jun. 1990) : 91-100.

Berlinger, M. J. "A Yellow Sticky Trap For Whiteflies: Trialeurodes Vaporariorum and Bemisia Tabaci (Aleurodidae)*)", *Ent. Exp. & Appl* 27 (1980) : 98-102.

Booth, Steven R. et al. "Evaluation of Entomopathogenic Nematodes to Manage Root Weevil Larvae in Washington State Cranberry, Strawberry, and Red Raspberry" *Environmental Entomology* 31 (5) (Oct. 2002) : 895-902.

Chai, Douglas, et al. "A Bayesian Approach to Skin Color Classification in YCBCR Color Space", *IEEE Region Ten Conference (TENCO '2000)*, Kuala Lumpur, Malaysia 2 (Sep. 2000) : 421-424.

Clark, J. D., et al. "A Battery-Powered Light Trap Giving Two Years' Continuous Operation" *Journal of Economic Entomology* 66 (2) (Apr. 1973) : 393-396.

Di Ruberto, Cecilia, et al. "Analysis of Infected Blood Cell Images Using Morphological Operators" *Image and Vision Computing* 20 (2) (Feb. 2002) : 133-146.

Dietrich, Christopher H., et al., "Automated Identification of Leafhoppers (Homoptera: Cicadellidae: Draeculacephala Ball)" *Annals of the Entomological Society of America* 87 (4) (Jul. 1994) : 412-423.

Estep, Kenneth W., et al., "Counting, Sizing, and Identification of Algae Using Image Analysis", *Sarsia*, 74, (Dec. 29, 1989),261-268.

Hart, Peter E., "The Condensed Nearest Neighbor Rule", *IEEE Transactions on Information Theory*, (May 1968),515-516.

Herms, W. B., "A Field Test of the Effect of Artificial Light on the Behavior of the Codling Moth", *Journal of Economic Entomology*, 22, (Feb. 1929),78-88.

Hienton, Truman E., "Summary of Investigations of Electric Insect Traps", *Technical Bulletin No. 1498, ricultural Research Service, United States Department of Agriculture*: Washington, D.C., (Oct. 1974).

Kerguelen, V. , et al., "Measuring Mite Feeding Damage on Avocado Leaves With Automated Image Analysis Software", *Florida Entomologist*, 82 (1), (Mar. 1999),119-122.

Kim, Soowon , et al., "Detection of Insect Damage in Almonds", *Proc. SPIE vol. 3543, p. 101-110, Precision Agriculture and Biological Quality*, George E. Meyer; James A. Deshazer; Eds., (1999).

Kokko, E. G., et al., "Method to Quantify Leaf Beetle Consumption of Leaf Disks Using Image Analysis", *The Canadian Entomologist*, 127, (Jul./Aug. 1995),519-525.

Lockey, Kenneth H., "Lipids of the Insect Cuticle: Origin, Composition and Function", *Comp. Biochem. Physiol.*, 89B (4), (1988),595-645.

Lopez-D., Fernando , et al., "A New Yeast Hydrolysate-Borax Bait for Trapping the Caribbean Fruit Fly", *Journal of Economic Entomology*, 64 (6), (Dec. 1971),1541-1543.

Moffitt, H. R., "A Color Preference of the Western Flower Thrips, Frankliniella Occidentalis", *Journal of Economic Entomology*, 57 (4), (Aug. 1964),604-605.

Motulsky, Harvey , "Detecting Outliers", GraphPad.com, http://www.graphpad.com/articles/outlier.htm,(1995-2002),1-4.

Ong, S. H., et al., "Segmentation of Color Images Using a Two-Stage Self-Organizing Network", *Image and Vision Computing*, 20 (4), (Apr. 1, 2002),279-289.

Petitt, F. L., et al., "An Automated System For Collection and Counting of Parasitized Leafminer (Diptera: Agromyzidae) Larvae", *Florida Entomologist*, 79 (3), (Sep. 1996),450-454.

Riley, D. G., et al., "Pepper Weevil Adult Response to Colored Sticky Traps in Pepper Fields", *Southwestern Entomologist*, 19 (2), (Jun. 1994),93-107.

Russ, John C., "The Image Processing Handbook (2nd Edition)", *CRC Press, Inc.*: Boca Raton, (1995),Table of Contents, 199-201, 523-526, Index.

Shuman, D. , et al., "A Computer-Based Electronic Fall-Through Probe Insect Counter For Monitoring Infestation in Stored Products", *Transactions of the ASAE*, 39 (5), (1996),1773-1780.

Smith, Kirk A., "Control of Insect Pests With Entomopathogenic Nematodes", *Food & Fertilizer Technology Center*. <http://www.agnet.org/library/article/tb139a.html>., (Oct. 1, 1994),1-9.

Spielman, Andrew , "Reducing Dengue Disease Using Biological Agents", *Horizon Solutions Site For Kids*. <http://www.solutions-site.org/kids/stories/KScat4_sol78_2.htm>., References, (2003).

Tou, Julius T., et al., *Pattern Recognition Principles. Addison-Wesley Publishing Company, Inc.*: Reading, MA, (1974),Table of Contents, 81-86, 316-361, Index.

Tumlinson, J. H., et al., "Sex Pheromones Produced by Male Boll Weevil: Isolation, Identification, and Synthesis", *Science*, 166, (Nov. 21, 1969),1010-1012.

Van De Vooren, J. G., et al., "Identification of Mushroom Cultivars Using Image Analysis", *Transactions of the ASAE*, 35 (1), (Jan.-Feb. 1992),347-350.

Vernon, R. S., et al., "Spectral Responsiveness of Frankliniella Occidentalis (Thysanoptera: Thripidae) Determined by Tarp Catches in Greenhouses", *Environmental Entomology*, 19 (5), (Oct. 1990),1229-1241.

Weeks, Arthur R., *Fundamentals of Electronic Image Processing. SPIE Optical Engineering Press*: Bellingham., (1996),Table of Contents, 228-293, Index.

Weeks, P. J. D., et al., "Automating Insect Identification: Exploring the Limitations of a Prototype System", *J. Appl. Ent. 123* (1-8), (1999),1-8.

Weeks, P. J. D., et al., "Automating the Identification of Insects: A New Solution to an Old Problem", *Bulletin of Entomological Research*, 87, (1997),203-211.

Weeks, P. J. D., et al., "Species-Identification of Wasps Using Principal Component Associative Memories", *Image and Vision Computing*, 17 (12), (Oct. 1999),861-866.

Wingfield, Nick , "Cameras That Cater to Worrywarts Help Keep an Eye on Things", *The Wall Street Journal*, (Oct. 31, 2002),B1.

Yu, Dicky S., et al., "Identification of Ichneumonid Wasps Using Image Analysis of Wings", *Systematic Entomology*, 17, (1992), 389-395.

Zayas, I. Y., et al., "Detection of Insects in Bulk Wheat Samples With Machine Vision", *Transactions of the ASAE*, 41 (3), (1998), 883-888.

Zhou, Yuan-Hua, et al., "Automatic Description of the Venation of Mosquito Wings From Digitized Images", *Systematic Zoology*, 34 (3), (1985), 346-358.

* cited by examiner

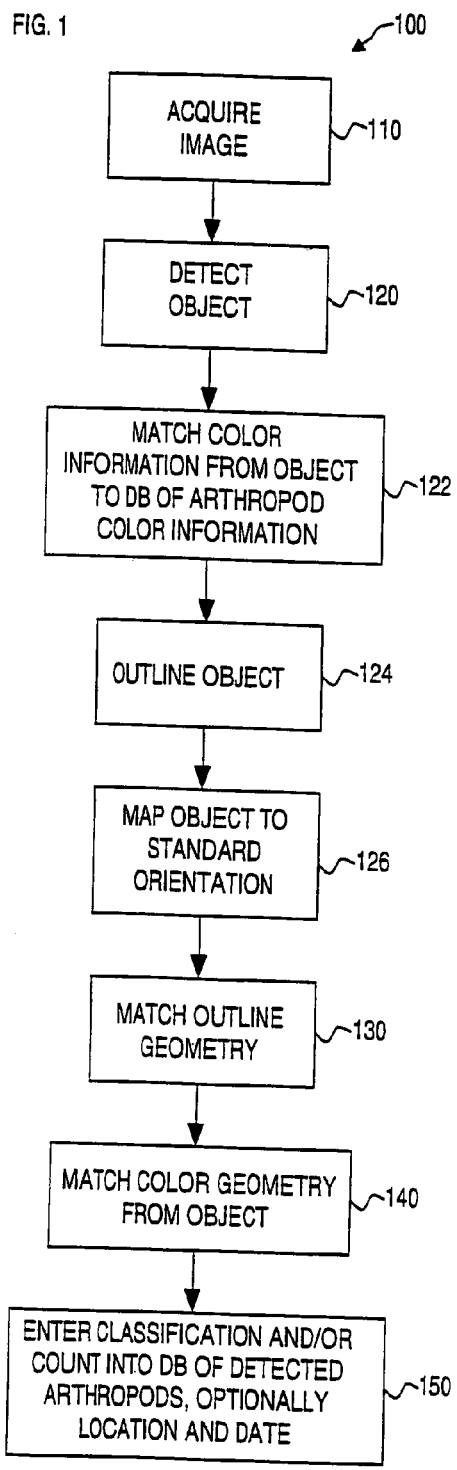
FIG. 1
FIG. 2A
| ID | COLOR | | | COLOR GEOM. | OUTLINE GEOM. | ... |
|---|---|---|---|---|---|---|
| 1 | L | H | S | SPATIAL DATA | SPATIAL DATA | |
| 2 | L | H | S | SPATIAL DATA | SPATIAL DATA | |
| ⋮ | | | | | | |
FIG. 2B
| ID | AGE OR DEV. STG. | LOCA-TION | DATE | TIME | LURE | COUNT | ... |
|---|---|---|---|---|---|---|---|
| GENUS-SPECIES 1 | | | | | | | |
| GENUS-SPECIES 2 | | | | | | | |
| ⋮ | | | | | | | |
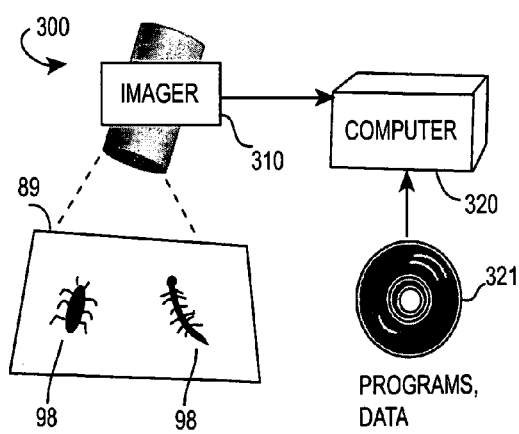
FIG. 3

400

401

410
402

411
412

421
422

431
432

440
441
442

510 ACQUIRE IMAGE (I) → 520 PROCESS IMAGE TO DETECT AND IDENTIFY ARTHROPODS (P) → 530 DATA THAT IDENTIFIES AND QUANTIFIES THE DETECTED AND IDENTIFIED ARTHROPODS (O)

500

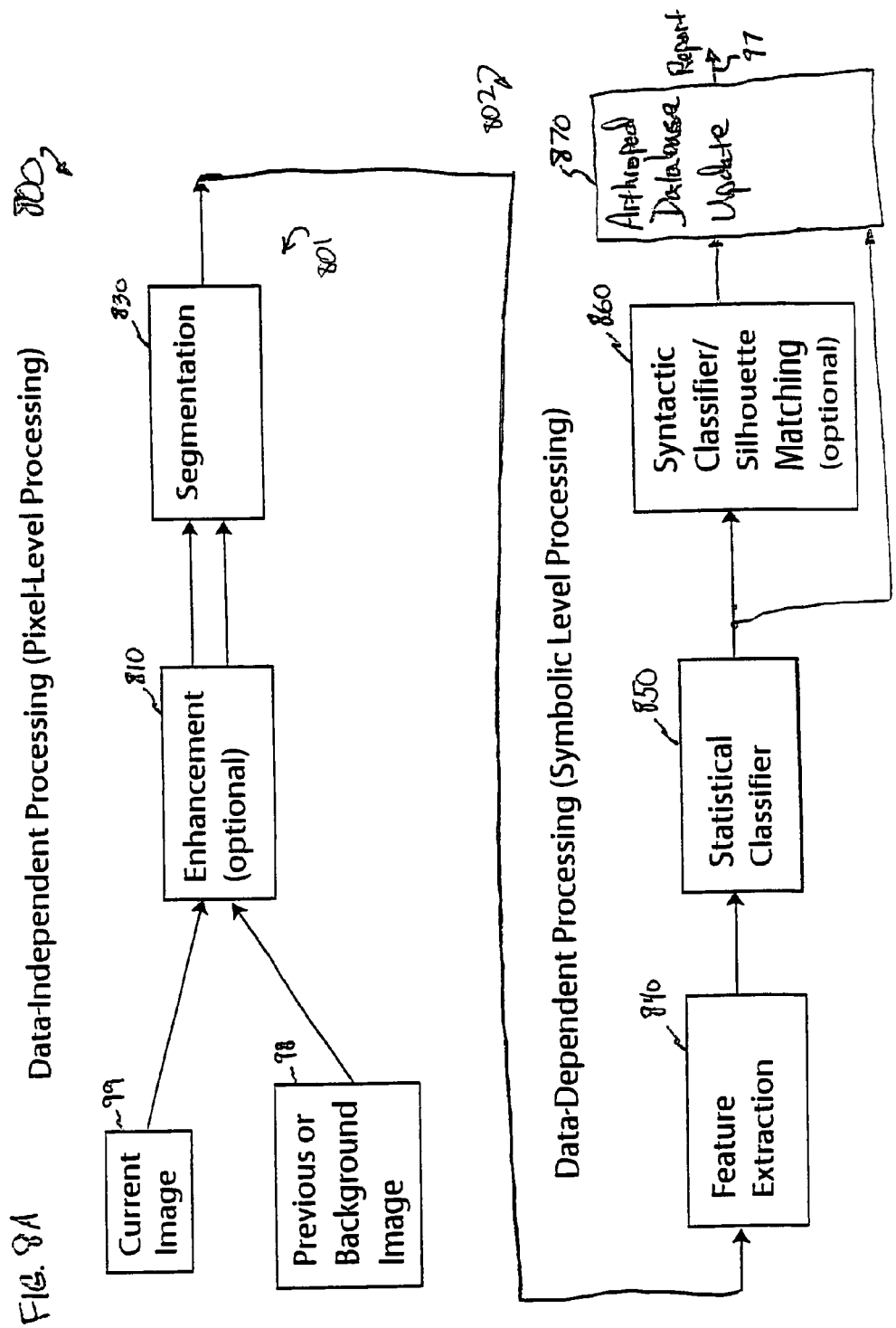

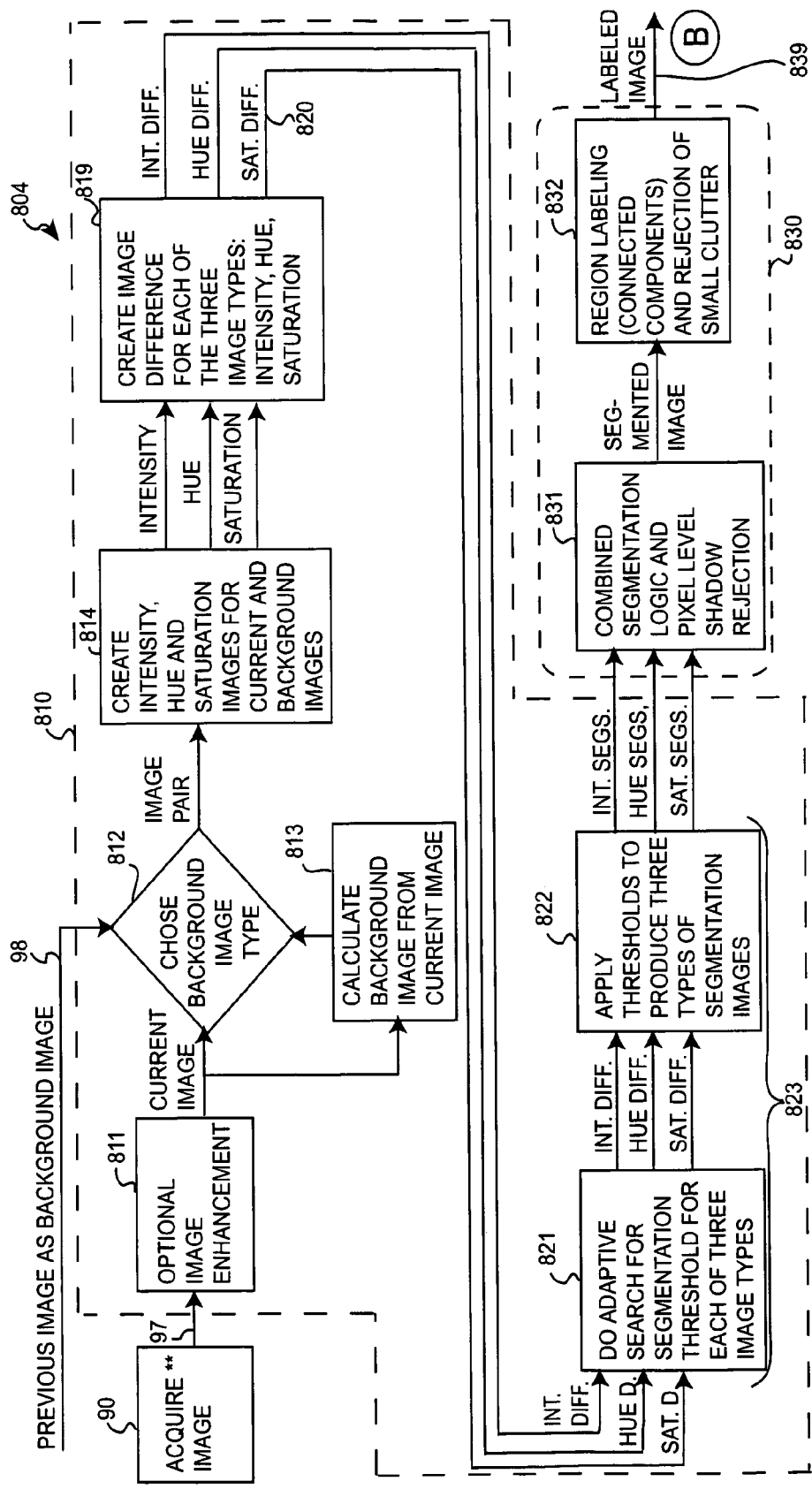

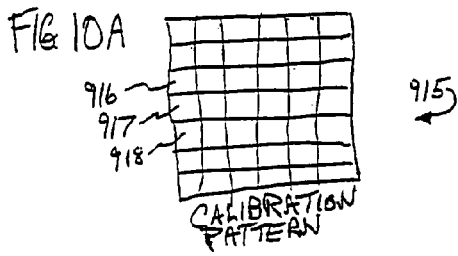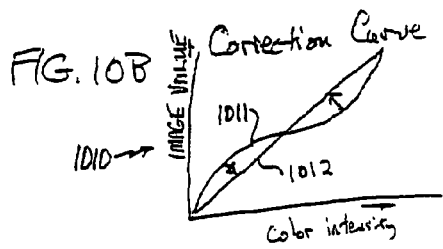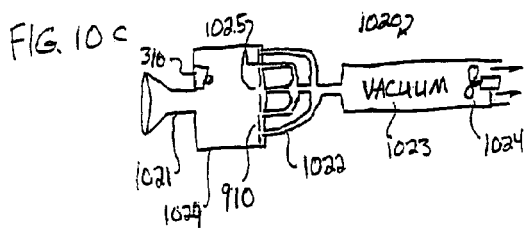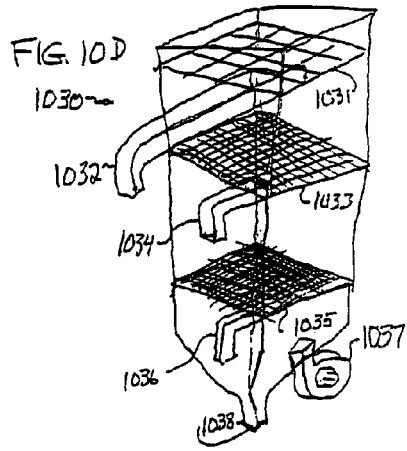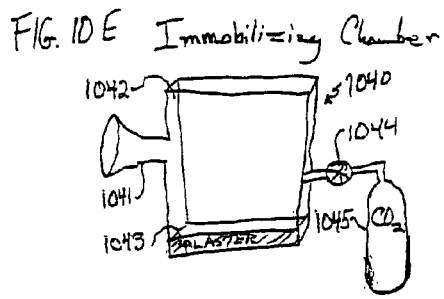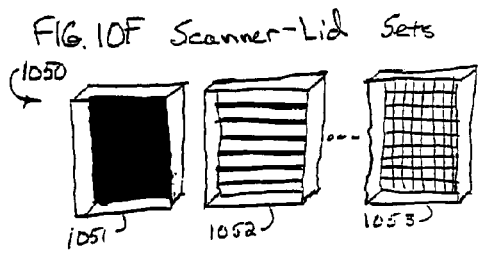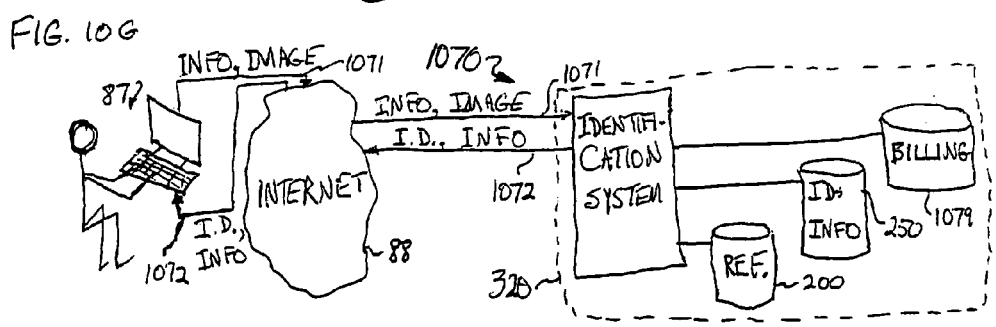

FIG. 10H

| | 1062 | 1063 | 1064 | 1065 | 1066 / 1067 | 1068 | 1060 1061 1061 |
|---|---|---|---|---|---|---|---|
| | SPECIES | GENUS | SILHOUETTE(S) | HUE-SAT HISTOGRAM(S) | | CONTROL METHODS | IMAGE(S) |
| 1093 | | 1094 | 1095 | 1096 | 1097 | | 1099 1099 1091 |
| 1093 | | 1094 | 1095 / 1095 / 1095 | 1096 / 1096 / 1096 | 1097 / 1097 / 1097 | 1098 | 1099 / 1099 / 1092 |
| | | | | | 1097 / 1097 / 1097 | 1098 | 1099 / 1099 |

WEEVIL                          //FIRST FIELD  -  CLASS STRING
WEEVILSIDEVIEW                  //SECOND FIELD -  SUBCLASS STRING
1                               //THIRD FIELD  -  CLASS NUMBER
1                               //FOURTH FIELD -  SUBCLASS NUMBER
1292.000                        //FIFTH FIELD  -  AREA OF ARTHROPOD
202.000                         //SIXTH FIELD  -  PERIMETER
57.922                          //SEVENTH FIELD  LENGTH
34.461                          //EIGHTH FIELD -  WIDTH
0.398                           //NINTH FIELD  -  CIRCULAR FITNESS FEATURE
0.647                           //TENTH FIELD  -  RECTANGULAR MATCH FEATURE
1.681                           //FIELD 11  -  ELONGATION (MAJOR TO MINOR AXIS)
0.0 0.0 0.0 0.0 0.0 0.0 1.5 3.0 8.4 8.9 10.4 9.9  //FIELD 12 = 12 VALUES OF THE SHAPE HISTOGRAM
                                7.9 12.9 10.9 9.4 8.9 2.0 2.5 2.5 1.0
-66                             //FIELD 13  -  AVG GRAY LEVEL DIFFERENCE FROM BACKGROUND
                                //FIELD 14     64 VALUES OF THE INTENSITY HISTOGRAM
0.0  0.0  0.0  0.0  0.0  0.0  0.0  0.0  0.0  0.0  0.0  0.0  0.2  1.8
10.4 21.8 17.3 12.8 8.4 7.3 5.3 5.3 5.6 3.1 0.5 0.1 0.0 0.0
0.0  0.0  0.0  0.0  0.0  0.0  0.0  0.0  0.0  0.0  0.0  0.0  0.0  0.0
0.0  0.0  0.0  0.0  0.0  0.0  0.0  0.0  0.0  0.0  0.0  0.0  0.0  0.0
```

FIG. 10J

//FIELD 15 — 32 X 32 COLOR SATURATION MATRIX — 1080

(32×32 matrix of values, nearly all 0.0, with a small cluster of nonzero values including: 0.7, 1.9, 9.3, 18.8, 1.5, 0.3, 3.5, 8.9, 7.1, 3.6, 28.3, 3.0, 0.3, 0.2, 1.1, 1.0, 0.3)

080302CBW0000    //FIELD 16 — COLLECTION ID

FIG 10K 1081

| FIELD # IN RECORD | FIELD NAME | FIELD DESCRIPTION |
|---|---|---|
| 1 | CLASS STRING | CHARACTER STRING NAME OF CLASS. NORMALLY GENUS AND SPECIES NAME. HOWEVER, CAN ADDITIONALLY IDENTIFY A DISTINCT-LOOKING TYPE WITHIN A SPECIES SUCH AS A LIFE STAGE (E.G., LARVA VERSUS ADULT) OR GENDER. |
| 2 | STRING FOR SUBCLASS | NORMALLY THIS IS A CHARACTER STRING DESCRIBING THE SPECIES AND ORIENTATION SUCH AS VENTRAL, LATERAL OR DORSAL VIEW OF AN ADULT ASPARAGUS BEETLE. THIS FIELD IS INTENDED MORE FOR EVALUATION OF THE CLASSIFICATION OF SOFTWARE BY A SPECIALIST THAN THE GENERAL USER. |
| 3 | CLASS NUMBER | NUMERICAL CODE FOR A CLASS. NUMERICAL REPRESENTATION OF FIELD 1. |
| 4 | SUBCLASS NUMBER | NUMERICAL REPRESENTATION OF FIELD 2. |
| 5 | AREA | THE AREA OF THE ARTHROPOD. USER CAN CHOSE WHETHER IT'S IN PIXELS OR SQUARED MILLIMETERS. |
| 6 | PERIMETER | THE PERIMETER OF THE ARTHROPOD. USER SELECTS WHETHER IT IS IN PIXELS OR MILLIMETERS. |
| 7 | LENGTH | THE LENGTH OF THE MAJOR AXIS OF THE ARTHROPOD IN EITHER PIXELS OR MILLIMETERS. USER SELECTS UNIT. |
| 8 | WIDTH | THE LENGTH OF THE MINOR AXIS OF THE ARTHROPOD IN EITHER PIXELS OR MILLIMETERS. |
| 9 | CIRCULAR FITNESS FEATURE | THE ISOPERIMETRIC QUOTIENT OR CIRCULAR OR COMPACTNESS FEATURE OF THE ARTHROPOD. UNIT LESS RANGING FROM 0.0 TO 1.0. |
| 10 | RECTANGULAR FITNESS FEATURE | RATIO OF ARTHROPOD'S AREA DIVIDED BY THE MINIMUM BOUNDING RECTANGLE. UNIT LESS AND RANGING FROM 0.0 TO 1.0. |
| 11 | ELONGATION FEATURE | THE HEIGHT TO WIDTH RATIO, OR MAJOR TO MINOR AXIS RATIO. UNITLESS AND POSITIVE REAL-VALUED NUMBER. |
| 12-32* | SHAPE HISTOGRAM | FEATURE VECTOR THAT CHARACTERIZES THE ARTHROPOD'S SHAPE. EACH HISTOGRAM BIN CONTAINS THE PERCENTAGE OF PIXELS ON THE ARTHROPOD'S PERIMETER THAT ARE OF A PARTICULAR DISTANCE TO THE CENTER OF THE ARTHROPOD'S IMAGE. EACH BIN REPRESENTS A FRACTION OF THE MAXIMUM DISTANCE FROM THE ARTHROPOD'S CENTER TO IT PERIMETER. DEFAULT IS BIN INCREMENTS ARE 1/20 OF THE MAXIMUM DISTANCE RESULTING IN 21 BINS. HOWEVER, THIS RESOLUTION CAN BE ALTERED TO EITHER FEWER OR MORE BINS. THE VALUE OF EACH BIN IS UNIT LESS AND RANGES FROM 0.0 TO 100.0 PERCENT. |

FIG 10L
1081

| FIELD # IN RECORD | FIELD NAME | FIELD DESCRIPTION |
|---|---|---|
| 33 | AVERAGE INTENSITY | THE AVERAGE GRAY-LEVEL OR INTENSITY VALUE OF THE LIGHT REFLECTED OFF THE ARTHROPODS SURFACE. VALUE RANGES FROM 0.0 TO 255.0 FOR EIGHT BIT VALUES BUT OTHER QUANTITIZATIONS ARE POSSIBLE AS THE CASE OF 10, 12 OR 16 BIT DATA. |
| 34-97** | INTENSITY HISTOGRAM | A 64 ELEMENT ARRAY WHERE EACH BIN REPRESENTS THE PERCENTAGE OF PIXELS ASSOCIATED WITH THE ARTHROPOD'S IMAGE THAT HAVE A PARTICULAR INTENSITY OR GRAY-LEVEL. THE DEFAULT OF 64 BINS INDICATES THAT WE ARE USING THE SIX MOST SIGNIFICANT BITS OF THE GRAY-LEVEL VALUE. THIS CAN BE ALTERED TO A FINER OR MORE COURSE INTENSITY OR LUMINANCE RESOLUTION. |
| 98-1121 | HUE/COLOR SATURATION | A 32X32 ARRAY WHERE EACH ELEMENT HISTOGRAM OF THE MATRIX REPRESENTS THE PERCENTAGE OF PIXELS ASSOCIATED WITH THE ARTHROPOD'S IMAGE THAT HAVE A PARTICULAR COMBINATION OF RED (CR) AND BLUE (CB). EACH ROW REPRESENTS THE AMOUNT OF RED AND THE COLUMNS THE AMOUNT OF BLUE. THE DEFAULT 32X32 ARRAY SIZES INDICATES THAT WE ARE USING A COLOR RESOLUTION OF THE 5 MOST-SIGNIFICANT BITS FOR EACH COLOR VALUE. THIS COLOR RESOLUTION AND HENCE ARRAY SIZE CAN BE INCREASED OR DECREASED. |
| 1122 | COLLECTION ID | A KEY TO LINK THIS RECORD TO RECORDS IN OTHER TABLES OF THE DATABASE. SPECIFICALLY, THE COLLECTION ID WOULD LINK THE DATA ASSOCIATED WITH THIS ARTHROPOD TO A TABLE CONTAINING INFORMATION ABOUT THE COLLECTION SAMPLE OR ORIGIN OF THE ARTHROPODS AND TO AN IMAGE DATABASE CONTAINING THE ORIGINAL INPUT IMAGE AND RESULTS IMAGE. THESE IMAGES COULD BE THE ORIGINAL IMAGES OR COMPRESSED VERSIONS OF THEM. |

FIG. 10M        1082

| FIELD #s IN RECORD | FIELD NAME | FIELD DESCRIPTION |
|---|---|---|
| 1 | CLASS STRING | CHARACTER STRING NAME OF CLASS. NORMALLY GENUS AND SPECIES NAME. HOWEVER, CAN ADDITIONALLY IDENTIFY A DISTINCT-LOOKING TYPE WITHIN A SPECIES, SUCH AS A LIFE STAGE (E.G. LARVA VERSUS ADULT) OR GENDER. |
| 2 | STRING FOR SUBCLASS | NORMALLY THIS IS A CHARACTER STRING DESCRIBING THE SPECIES AND ORIENTATION SUCH AS "VENTRAL (OR LATERAL OR DORSAL) VIEW OF AN ADULT ASPARAGUS BEETLE." THIS FIELD IS INTENDED MORE FOR EVALUATION OF THE CLASSIFICATION OF SOFTWARE BY A SPECIALIST THAN THE GENERAL USER. |
| 3 | CLASS NUMBER | NUMERICAL CODE FOR A CLASS. NUMERICAL REPRESENTATION OF FIELD 1. |
| 4 | SUBCLASS NUMBER | NUMERICAL REPRESENTATION OF FIELD 2. |
| 5 | PERIMETER SIZE | NUMBER OF PIXELS COMPRISING THE SILHOUETTE. |
| 6 | REFERENCE POINT | X,Y COORDINATE OF FIRST PIXEL COMPRISING THE SILHOUETTE. THIS IS THE REFERENCE POINT FOR ADDITIONAL PIXELS OF SILHOUETTE AND COLOR-PATTERN PIXELS. |
| 7 ... N | CHAIN CODE | ENCODING OF THE REMAINING SILHOUETTE PIXELS. IN SOME EMBODIMENTS, EACH PIXEL IS REPRESENTED BY FOUR BITS. VALUES OF 1 THROUGH 8 EACH REPRESENT ONE OF THE POSSIBLE DIRECTIONS FROM THE PRECEDING PERIMETER PIXEL. |
| N+1 | NUMBER COLOR PIXELS | NUMBER OF COLOR REFERENCE PIXELS, E.G., M. |
| N+2 | 1ST COLOR PIXEL'S OFFSET | X,Y OFFSET FROM REFERENCE POINT (I.E., FROM REFERENCE POINT OF FIELD 6). |

FIG. 10N

| FIELD #s IN RECORD | FIELD NAME | FIELD DESCRIPTION |
|---|---|---|
| N+3 | INTENSITY | INTENSITY VALUE OF FIRST COLOR PIXEL. |
| N+4 | HUE | HUE VALUE OF FIRST COLOR PIXEL. |
| N+5 | SATURATION | SATURATION VALUE OF FIRST COLOR PIXEL. |
| N+((M-1)*4)+2 | MTH OR LAST COLOR | X,Y OFFSET FROM REFERENCE POINT PIXEL'S OFFSET. |
| N+((M-1)*4)+3 | MTH INTENSITY | INTENSITY VALUE OF LAST COLOR PIXEL. |
| N+((M-1)*4)+4 | MTH HUE | HUE VALUE OF LAST COLOR PIXEL. |
| N+((M-1)*4)+5 | MTH SATURATION | SATURATION VALUE OF LAST COLOR PIXEL. |
| N+((M-1)*4)+6 | COLLECTION ID | A KEY TO LINK THIS RECORD TO RECORDS IN OTHER TABLES OF THE DATABASE. SPECIFICALLY, THE COLLECTION ID LINKS THE DATA ASSOCIATED WITH THIS ARTHROPOD TO A TABLE CONTAINING INFORMATION ABOUT THE COLLECTION SAMPLE OR ORIGIN OF THE ARTHROPODS AND TO AN IMAGE DATABASE CONTAINING THE ORIGINAL INPUT IMAGE AND RESULTS IMAGE. THESE IMAGES ARE THE ORIGINAL IMAGES OR COMPRESSED VERSIONS OF THEM, IN SOME EMBODIMENTS. |

FIG. 12    DETECTION OF ARTHROPODS USING COLOR AS WELL AS LUMINANCE

FIG. 15 CREATION OF A 2D COLOR HUE/SATURATION HISTOGRAM FOR INSECT RECOGNITION

FIG. 17 APPROACH TO ARTHROPOD CLASSIFICATION

FIG. 25 ⌐2500
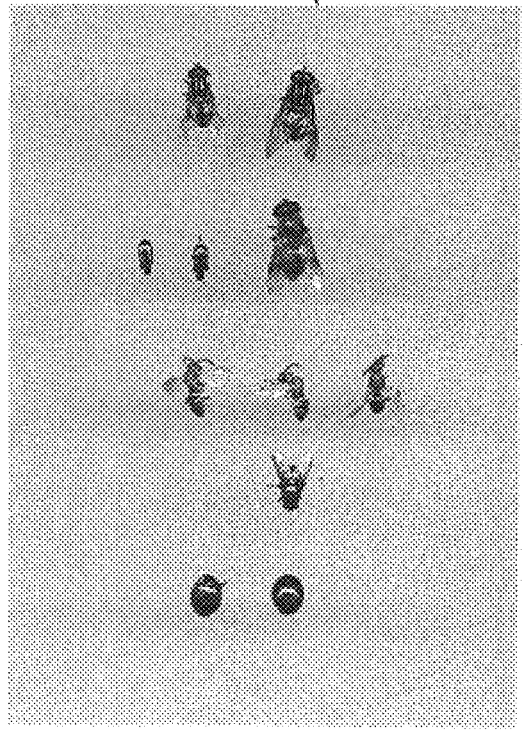
FIG. 26 ⌐2600
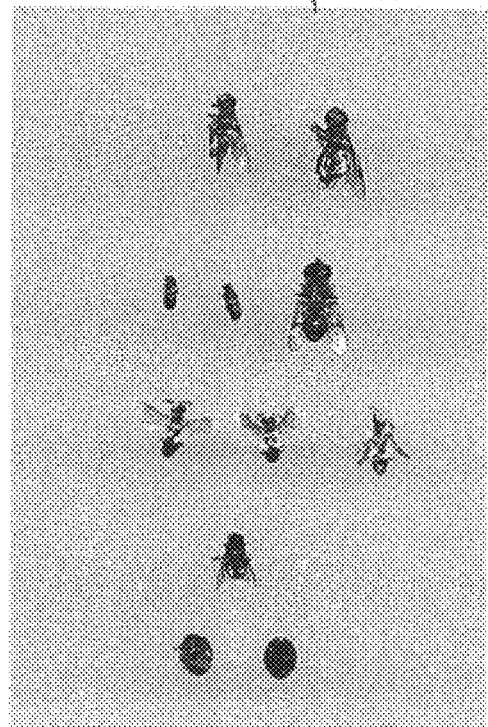
FIG. 27A ⌐2700
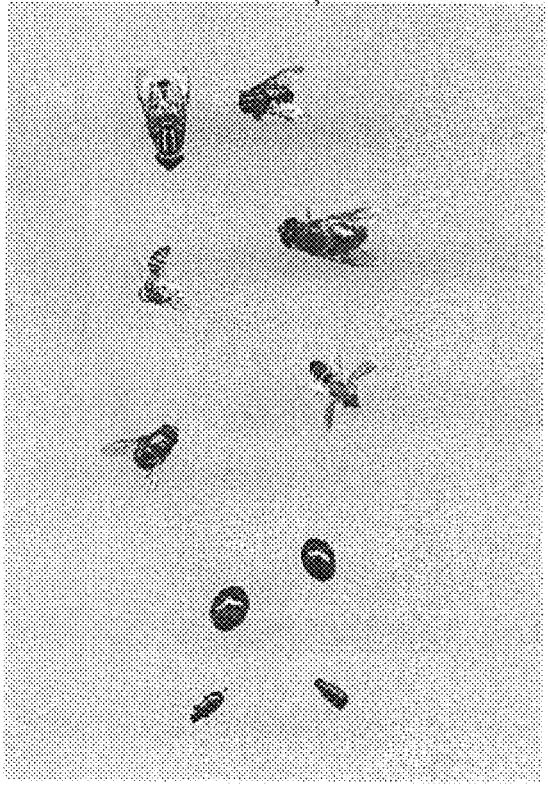
FIG. 27B ⌐2710
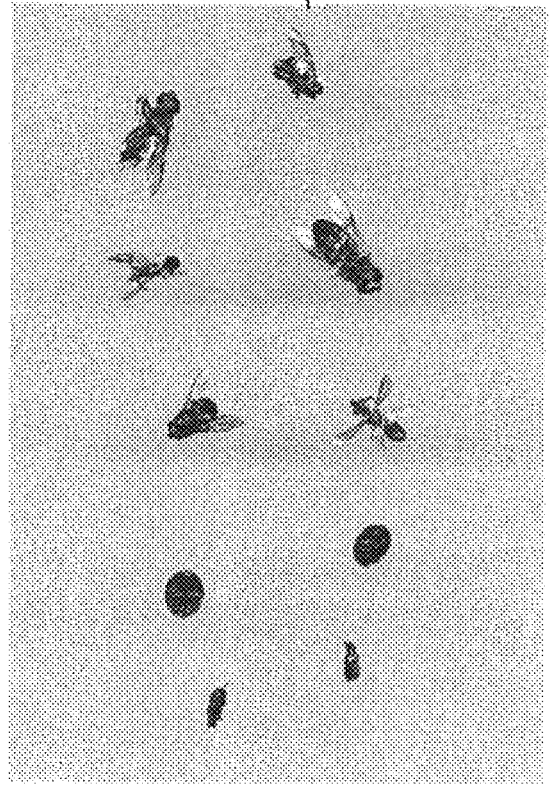

FIG. 28A    2800     FIG. 28B    2810
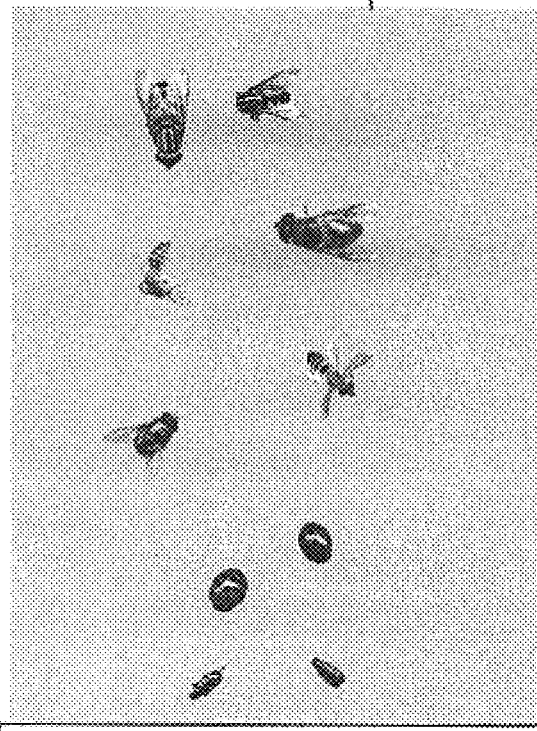
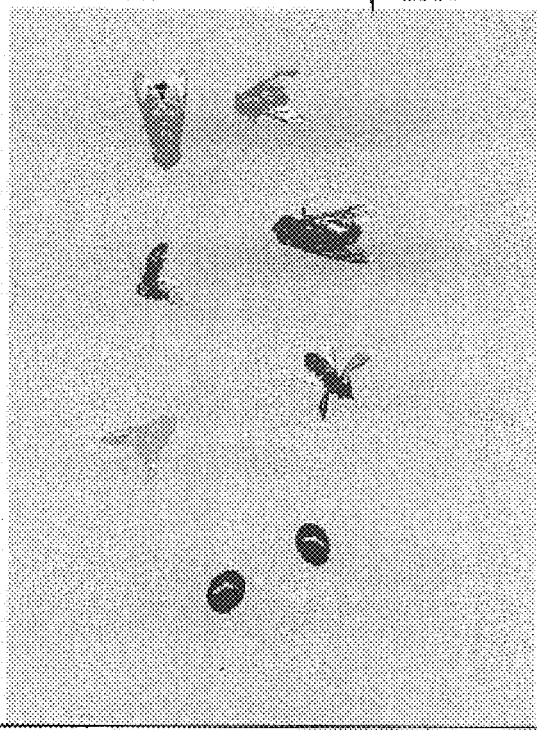
FIG. 29A    2900     FIG. 29B    2910
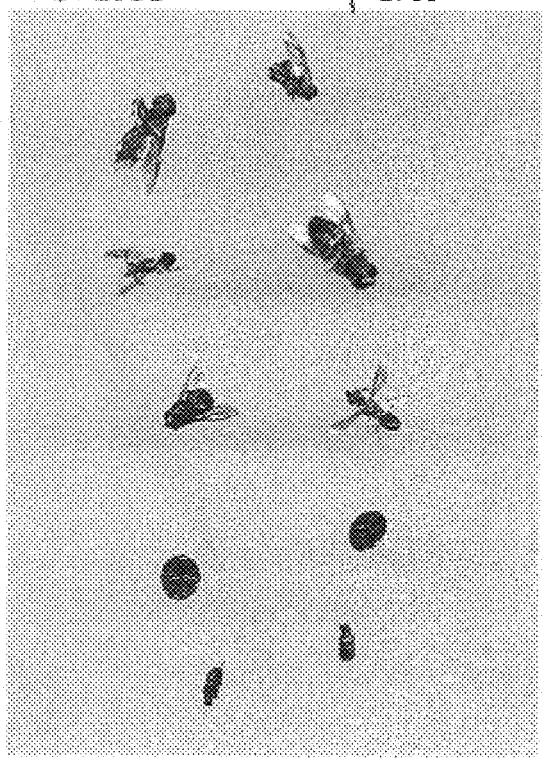
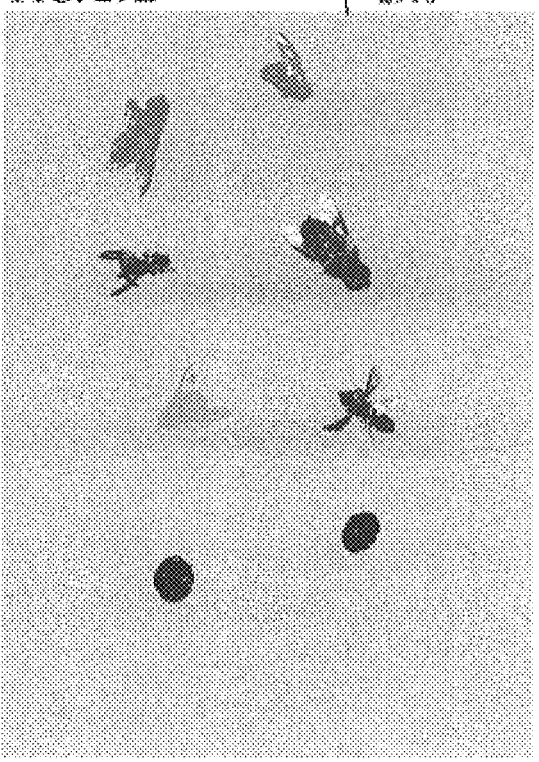

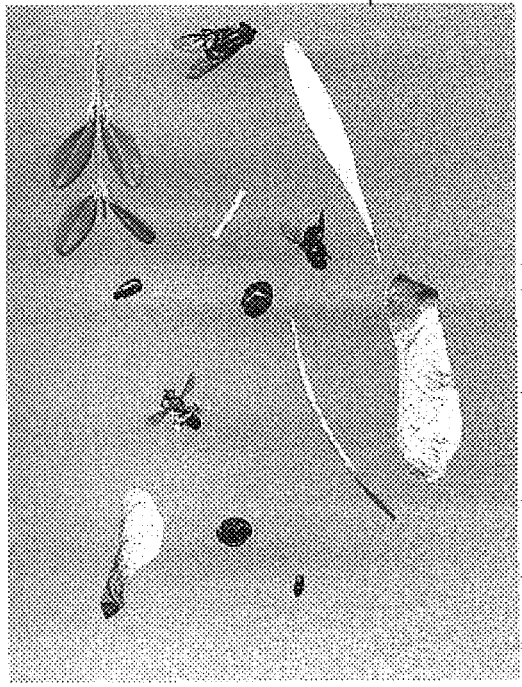
FIG. 30A    ─3000
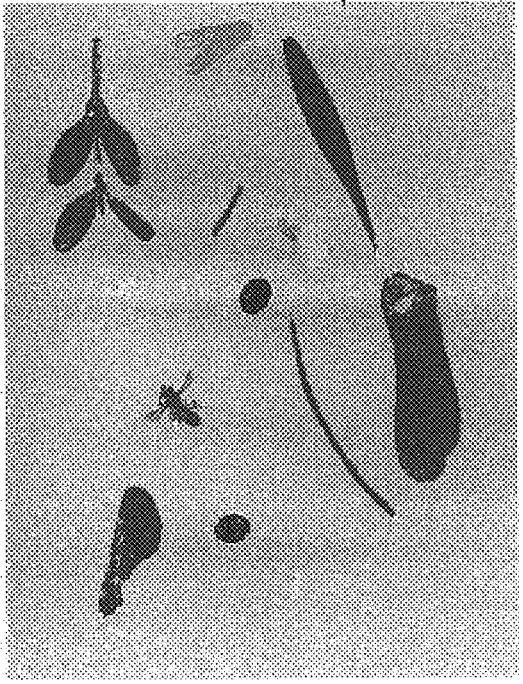
FIG. 30B    ─3100
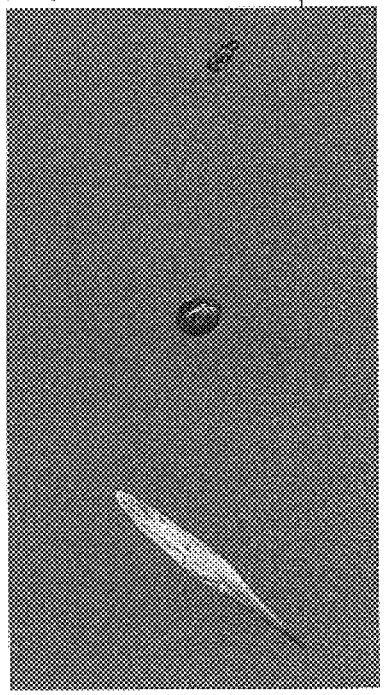
FIG. 31    ─3100

3210

3220

3230

3240

3250

3260

3300

3400

3240

3250

3260

3600

3710

3720

3730

3740

3750

3760

3810

3820

3830

4000

4100

4200

4300

4400

4500

METHOD AND SYSTEM FOR DETECTING AND CLASSIFYING OBJECTS IN IMAGES, SUCH AS INSECTS AND OTHER ARTHROPODS

RELATED APPLICATIONS

Benefit is claimed under 35 U.S.C. 119(e) to provisional application Ser. No. 60/478,636 entitled "DEVICES, SOFTWARE, METHODS AND SYSTEMS FOR ELECTRONIC OBJECT DETECTION AND IDENTIFICATION AND APPLICATION TO THE DETECTION OF INSECTS AND OTHER ARTHROPODS" by Val R. Landwehr and Fernando Agudelo-Silva, filed Jun. 13, 2003, which is incorporated in its entirety by reference.

FIELD OF THE INVENTION

The present invention relates to the field of automated machine-vision recognition, and more specifically, to a method and apparatus for machine-vision object detection and classification, particularly of insects and other arthropods.

BACKGROUND

Timely, practical and accurate detection and classification of arthropods is crucial in many instances. There are many species of arthropods, particularly among the insects and mites, that cause significant damage and loss to plants, wood and fiber and transmit pathogens among people and other animals. The efficient, accurate and timely detection of arthropod pests is a key factor in managing their populations and limiting the damage and injury they cause. Detection is necessary to determine: 1) arthropod presence or absence; 2) their classification to a certain taxonomic category such as genus or species; 3) their relative or absolute numbers; 4) a critical period in the arthropod pest's life cycle that is amenable to control measures; and, 5) significant phases in the relationship between the arthropod and the organism that it affects.

Estimates of arthropod pest numbers are necessary to decide whether control measures are warranted and detection of the various life stages of a pest suggests when control techniques will be most effective. Associating pest numbers and the pest's life cycle to periods when the host is most vulnerable to injury is also critical in pest management. In addition to insect pests there are many beneficial insect, spider and mite predators that need to be sampled as part of a pest management program. There is also need for a more expeditious technology to classify arthropods in ecological studies. Thus, the sampling of arthropod populations in various habitats is an integral part of such diverse fields as ecological studies, crop protection and human health.

SUMMARY OF INVENTION

Several embodiments of machine-implemented, image-based systems for detecting and classifying insects and other arthropods are described. Examples of useful and practical applications of the systems are described. These examples show that the present invention provides labor-saving devices for counting arthropods and provides improved taxonomic capabilities for pest management specialists, ecologists, science educators, agricultural extension and inspection agencies, among others.

In some embodiments, a sticky substrate is provided in order that arthropods to be classified are captured. In some embodiments, the sticky substrate has a first area that has a first background color (for example, white or bright yellow) and a second area that has a second contrasting background color (for example, black or dark blue). Such a substrate having a plurality of different colors is useful for obtaining images of arthropods having different colors. For example, small white thrips are difficult to detect on a white background or even on a yellow background, however on a black or dark blue background they are much easier to detect. Some embodiments use various graphical patterns, specific color(s), pheromones, kairomones, and/or other chemical attractants to lure the arthropods to the collection surface. In some other embodiments, arthropods are collected and either killed or immobilized and then they are placed on a detection surface which need not be sticky.

A digital camera, flat-bed scanner or other suitable imaging device is used to capture an image of the substrate along with any arthropods that may be stuck to it. In some embodiments, the image is obtained in the field (at the point of collection); in other embodiments, the sticky collection surface with its attached arthropods is transported, mailed, or taken to a facility where the imaging takes place. In some embodiments, an initial reference image of the substrate background is obtained, then insects or other arthropods are collected and another image is obtained, in order to use the difference between the two images to calibrate colors and/or to more readily detect the newly captured arthropods as difference areas between the two images. In some embodiments, a plurality of images of the same substrate is obtained over time, wherein the incremental differences in the images provides information as to when each arthropod appeared.

Once the image or images are obtained, each image is analyzed to detect pixels of interest, to group the detected pixels into detected objects, and the detected objects are processed to extract image information, such as a hue and saturation histogram, the length, width, length-width ratio, perimeter measurement, and/or certain patterns or locations of color information within the detected object, and this image information is compared to a set of reference image information collected from pre-identified arthropods in order to determine which, if any, of the reference arthropods most closely matches the object to be identified.

In some embodiments, once the identification or classification has been made, this information is entered into a database (a collection of ordered information), that tracks such information as the date and location of collection, which and how many of each type of arthropod was collected. In some embodiments, the database also collects and correlates other information such as the types of crops or other vegetation in the area of collection, the types of insecticides used and when, and other information that could be useful in arthropod management programs. In some embodiments, from this information, reports are generated and communicated to relevant governmental (e.g., county, state, or federal) or commercial entities (e.g., grower's associations, coops, or pest-management consultants).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a flowchart of a method 100 according to some embodiments of the invention.

FIG. 2A is representation of a data structure 200 used in some embodiments of the invention.

FIG. 2B is representation of a data structure 250 used in some embodiments of the invention.

FIG. 3 is a perspective block diagram 300 of a system used to acquire an image in some embodiments of the invention.

FIG. 8A is a flowchart of a method 800 according to some embodiments of the invention.

FIG. 8C is a flowchart of a method 804 according to some embodiments of the invention.

FIG. 10A is a representation of a calibration surface 915 used in some embodiments of the invention.

FIG. 10B is a graph of an example calibration function 1010 used in some embodiments of the invention.

FIG. 10C is a block diagram of a collecting chamber 1020 adapted to or coupled with vacuum device(s) to sample insects.

FIG. 10D is a perspective view of a sample cleaning system 1030 used in some embodiments.

FIG. 10E is a perspective view of a sample-processing unit 1040 used in some embodiments.

FIG. 10F is a perspective view of a set of scanner lids 1050 used in some embodiments.

FIG. 10G shows a block diagram of an example on-line arthropod-identification service 1070.

FIG. 10H shows an example reference database structure 1060 for key arthropods.

FIG. 10I shows a first portion of an example reference statistical-feature database structure 1080 for key arthropods.

FIG. 10J shows a second portion of the example reference statistical-feature database structure 1080.

FIG. 10K shows a first portion of an example reference statistical-feature database definition 1081 for key arthropods.

FIG. 10L shows a second portion of the example reference statistical-feature database definition 1081.

FIG. 10M shows a first portion of an example reference color-silhouette database definition 1082 for key arthropods.

FIG. 10N shows a second portion of the example reference color-silhouette database definition 1082.

FIG. 25 shows a digital image called ScanDorsalTraining.bmp used for generating the identifying reference features.

FIG. 26 shows a digital image ScanVentralTraining.bmp that has the ventral view of the same eleven individuals as FIG. 25.

FIG. 27A is a test image ScanDorsalTest.bmp of ten insect individuals.

FIG. 27B is a test image ScanVentralTest.bmp of the same ten insect individuals as FIG. 27A.

FIG. 28A is an image having dorsal views of the same ten garden insects as FIG. 27A.

FIG. 28B is the image after successful detection and recognition of these insects.

FIG. 29A is an image having ventral views of the same ten garden insects as FIG. 27B.

FIG. 29B is the image after the successful detection and recognition of these insects.

FIG. 30A is a test image of insects in clutter.

FIG. 30B is the output results image with the correct detection and identification of the objects.

FIG. 31 is an image that simulates a snapshot from a previous sampling period.

In the drawings, like numerals describe substantially similar components throughout the several views of the process of being made. Signals and connections may be referred to by the same reference number, and the meaning will be clear from the context of the description.

DETAILED DESCRIPTION

Figure 4A:
FIG. 4A is a representation of a detected-object-pixels data structure 400 used in some embodiments of the invention.

In the following detailed description of preferred embodiments, reference is made to the accompanying drawings that form a part hereof, and in which are shown, by way of illustration, specific embodiments in which the invention may be practiced. It is to be understood that other embodiments may be utilized and structural changes may be made without departing from the scope of the present invention.

Definition: Object "identification" includes the detection and classification (such as the name or other identification information, type, species and genus, age, developmental stage) of an object, such as of an arthropod.

FIG. 1 is a flowchart of a method 100 according to some embodiments of the invention. Method 100 includes operation 110 of acquiring an image, operation 120 of detecting an object in the image, operation 122 of matching color information from the object to a database of arthropod color information, operation 124 of outlining the silhouette of the object, operation 126 of mapping the object outline to a standard orientation, operation 130 of matching the outline geometry of the object to reference outlines, operation 140 of matching the color geometry from the object to references, and operation 150 of entering the classification and/or count into a database of detected arthropods optionally with other information (e.g., location, date, and time information).

Note that operations 126 and 130, in some embodiments, map the orientation of the unknown object to a standard orientation (e.g., rotating and/or translating (sliding side-to-side and up or down) until the longest dimension and an origin are aligned to an X-Y coordinate system) and then compare that outline to each reference outline from a reference library (i.e., database) of outline geometries of arthropods each of which is in that standard orientation until a match is found. In other embodiments, for each reference outline geometry from the reference library, the reference outline is obtained one at a time, and the reference outline is rotated and/or translated, compared to the outline of the unknown object (which is in the random orientation in which it was detected), then the reference outline is rotated/translated more, again compared, and so on until the best match is found. Thus, either the unknown can be rotated/translated, and then compared to the library of reference outlines; or the reference outlines can be rotated/translated and compared to the outline of unknown.

At block 110, some embodiments of method 100 include acquiring an image, for example, obtaining a digital image from a scanner or digital camera that "looks" at a sticky substrate, possibly having one or more arthropods that are to be classified, (i.e., "identified" or "recognized"). At block 120, some embodiments of method 100 include detecting an object, i.e., distinguishing pixels of the object from a background, and then grouping or associating neighboring pixels as a single detected object, or "detection." At block 122, some embodiments of method 100 include matching the color histogram (e.g., how many pixels, regardless of location within the image, are of a particular hue and saturation) from the object to histogram data of a reference arthropod from a database having extracted information from a plurality of pre-identified arthropods.

Some embodiments match primarily on the basis of the matching done at block 122 and other feature matchings, and omit the matching operations of blocks 126, 130, and/or 140. At block 124, some embodiments of method 100 include outlining the detected object, i.e., determining which pixels form the outer boundary or silhouette of the detection. At block 126, some embodiments of method 100 include mapping (i.e., rotating and translating pixels) the arthropod's outline to a standard orientation (e.g., head up and image centered). At block 130, some embodiments of method 100 include matching the outline geometry (silhouette) from the object to a particular reference silhouette. At block 140, some embodiments of method 100 include matching the color geometry from the object (e.g., whether particular pixels, at a particular location (e.g., X and Y offsets from an origin location) within the image, are of a particular hue and saturation). At block 150, some embodiments of method 100 include entering the classification and/or the count of arthropods of a particular classification into a database of detected arthropods optionally including the location, date, time, environment, or other collection data. In other embodiments, the classification is output to a user.

FIG. 2A is a representation of a data structure 200 (e.g., useful in a database, in some embodiments). In some embodiments, data structure 200 includes reference database information for key arthropods. Some embodiments include one or more different reference databases of important arthropods for classification. In some embodiments, a plurality of similarly structured databases are provided. Each such database is tailored for particular agricultural crops (e.g., for field use) and/or commodities (e.g., for use in grain elevators or other commodity-storage facilities), or other specialized or identified environments. Each database structure 200 contains a plurality of records 221, 222, etc., that include a sufficient representation of the variation in appearance of the important and common arthropods for a particular crop or environment. In some embodiments, an entry in the database includes an identification number 201, color information 232, color geometry information 236, outline geometry information 241, etc. In some embodiments, the color information 232 includes luminance information 233, hue information 234, and saturation information 235. In some embodiments, a plurality of subfields 231 (sometimes called a "spotprint") are provided, each having color information 232 (e.g., hue and saturation) and color-geometry information 236 (e.g., the X and Y offset for that hue and saturation). Some embodiments include further identification data 242 (such as a complete reference image to be provided to the user to assist the user in visually confirming a classification from the system).

FIG. 2B is a representation of a data structure 250 (e.g., useful in a database, in some embodiments). In some embodiments, data structure 250 includes a plurality of entries 261, 262, etc., each with information for each different type or group of arthropods that have been identified (e.g., entry 261 for the first type of arthropod identified, and entry 262 for the second type of arthropod identified). In some embodiments, the entries in the database include taxonomic information such as genus-species identification information 251, age and/or developmental stage information 259, location found information 252, date detected information 253, time detected information 254, lure information 255, count information 265, etc. Some embodiments of data structure 250 are implemented as a relational database. Some embodiments of data structure 250 are implemented as a relatively simple table. Some embodiments of data structure 250 include further reference information that can be provided to a user such as images of each species and/or each development stage so that the human user can do a visual double check of the results from the automatic system, or control methods, or other information useful to the user and correlated to the identifications made.

FIG. 3 is a high-level perspective block diagram 300 of a system used to acquire an image in some embodiments of the invention. The system includes a surface 89 used to trap and/or attract arthropods 98. In some embodiments the arthropods are manually collected, killed or immobilized and then placed on a detection surface in order to be imaged. Imager system 310 captures a digital image of the surface 89 and arthropods 98, and transfers the image by cable or wireless communications to data-processing system or computer 320 for detection and classification. Some embodiments of the invention include (see FIG. 3) a computer-readable media 321 (such as a diskette, a CDROM, a DVDROM, and/or a download connection to the internet) having instructions stored thereon for causing a suitably programmed data processor to execute one or more of the methods described in FIG. 1 and below, and/or having database records stored thereon such as described for FIGS. 2A, 2B, 10H, 10I, 10J, 10K, 10L, 10M, 10N and elsewhere herein.

FIG. 4A is a representation of detected-object-pixels data structure 400 used in some embodiments of the invention. In some embodiments, digital image 400 is in gray-scale while in other embodiments, includes color information. Data structure 400 represents an example of the digital image captured by a camera of an arthropod to be classified.

Figure 4B:
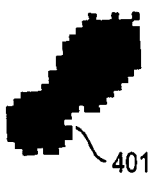
FIG. 4B is a representation of a silhouette-pixels data structure 401 used in some embodiments of the invention.

FIG. 4B is a representation of a filled-silhouette-pixels data structure 401 used in some embodiments of the invention. The captured digital image has been processed to isolate subject arthropod from the background image, and is represented in filled-silhouette form 401 (e.g., wherein all the background pixels are set to a zero value (black) and all the data pixels are set to a 255 value (white)).

Figure 4C:
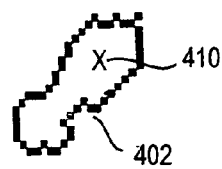
FIG. 4C is a representation of an outline silhouette-pixels data structure 402 used in some embodiments of the invention.

FIG. 4C is a representation of an outline-silhouette-pixels data structure 402 (or simply called a silhouette data structure) used in some embodiments of the invention. The digital image 401 has been further processed to convert it to an outline silhouette 402 with a center-of-mass of point 410.

Figure 4D:
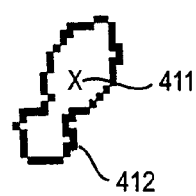
FIG. 4D is a representation of an outline silhouette-pixels data structure 412 used in some embodiments of the invention.

FIG. 4D is a representation of a slightly rotated silhouette-pixels data structure 412 used in some embodiments of the invention. The digital image 402 has been rotated around the center-of-mass 401 (i.e., the graphic center of the silhouette) to produce digital image 412 with a center-of-mass 411.

Figure 4E:
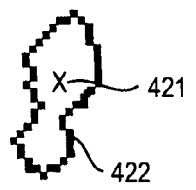
FIG. 4E is a representation of a silhouette-pixels data structure 422 used in some embodiments of the invention.

FIG. 4E is a representation of a rotated silhouette-pixels data structure 422 used in some embodiments of the invention. The digital image 402 has been rotated further around the center-of-mass 401 to produce digital image 422 with a center-of-mass 421.

Figure 4F:
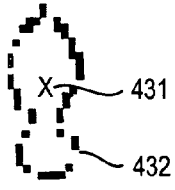
FIG. 4F is a representation of a silhouette-pixels data structure 432 used in some embodiments of the invention.

FIG. 4F is a representation of a further-rotated silhouette-pixels data structure 432 used in some embodiments of the invention. The digital image 402 has been rotated still further around the center-of-mass 401 to produce digital image 432 with a center-of-mass 431. The rotation of the image 402 around the center-of-mass 410 continues until the image is in a standard orientation as shown in image 432.

Figure 4G:
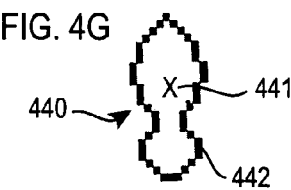
FIG. 4G is a representation of a reference silhouette-pixels data structure 440 used in some embodiments of the invention.

FIG. 4G is a representation of a reference silhouette-pixels data structure 440 used in some embodiments of the invention. Reference data structure 440 consists of the outline silhouette 442 and the center-of-mass 441. In some embodiments, the unknown image data structure in standard orientation, such as in image 432, is compared against the reference data structure 440 to determine a best match and to classify the unknown arthropod. In some other embodiments the outlines of reference data structures are initially in a standard orientation but they are rotated and translated to compare with the outline of the unknown data structure that, because of the random nature of collection, may not be in a standard orientation.

Figure 5:
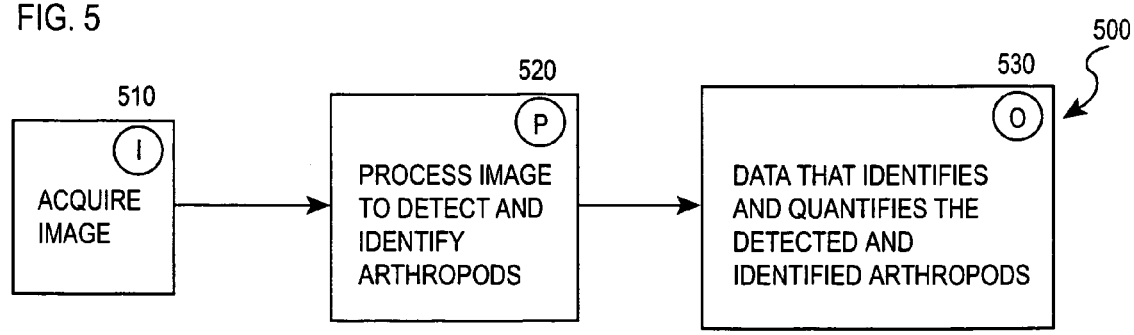
FIG. 5 is a flowchart of a method 500 according to some embodiments of the invention.

FIG. 5 is a high-level flowchart of a method 500 according to some embodiments of the invention. In some embodiments, method 500 represents a high-level overview of method 100 of FIG. 1, and of the methods of FIGS. 10-20 and 24. Method 500 includes the process of acquiring the image 510 (input), processing the image to detect and identify the arthropods 520 (process), and outputting or transmitting data that identifies and quantifies the detected and identified arthropods 530 (output).

Figure 6:
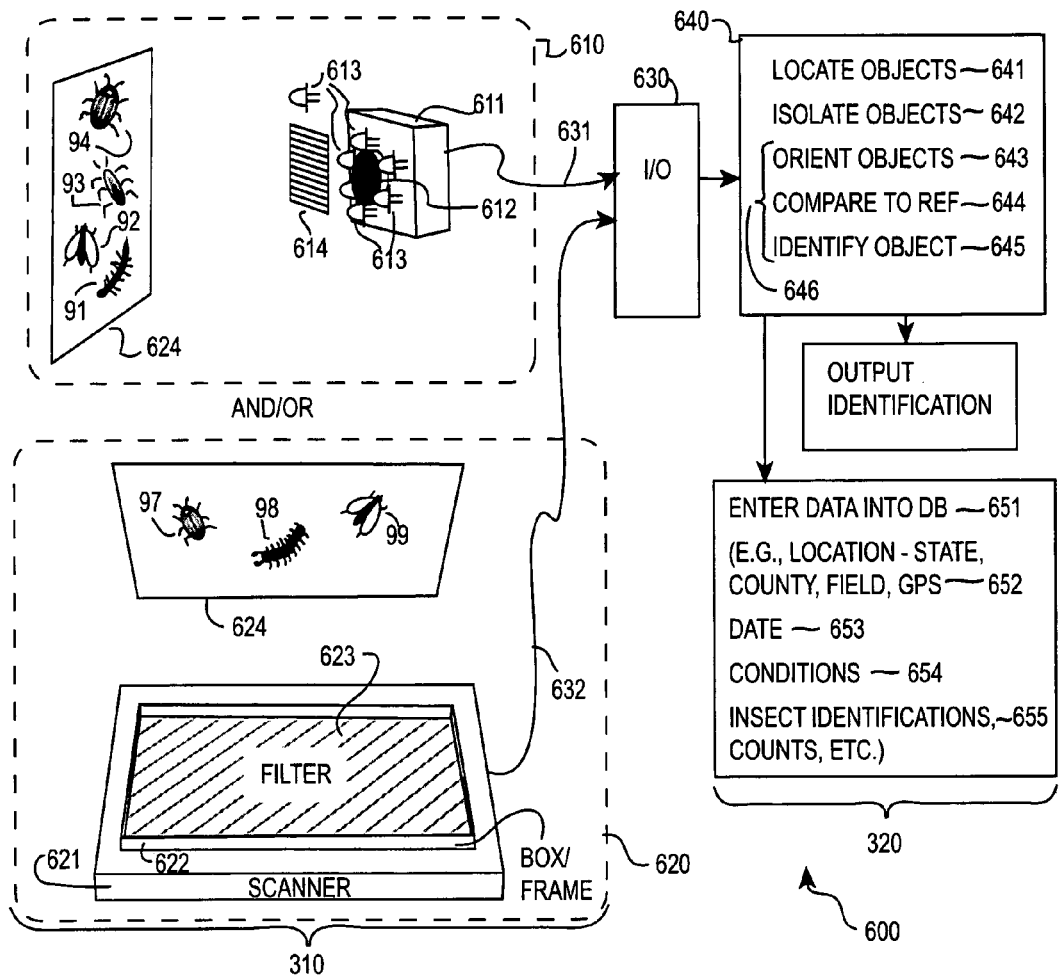
FIG. 6 is a perspective block diagram 600 of a system used to acquire, detect, and classify arthropods, in some embodiments of the invention.

FIG. 6 is a perspective block diagram 600 of a system used to acquire, detect, and classify arthropods, in some embodiments of the invention. In some embodiments, system 600 includes an image acquisition system 310 and an image processing system 320, as depicted in FIG. 3.

In some embodiments, e.g., particularly for deployment in the field, trapping-and-image-acquisition system 610 includes a color digital camera 611 having a lens 612 is connected by cable, fiber, or wireless communications 631 (such as over the internet) to the communications-receiving hardware (e.g., an input/output subsystem) 630 of the user's host computer 320. The camera 611 takes images of arthropods (e.g., 91, 92, 93, and 94) on a trapping surface 624 which is part of the device. In some embodiments, the trapping-andimage-acquisition system 610 includes a filter 614 over the lens 612 and one or more illumination devices 613 to enhance the images of the arthropods of interest. Some embodiments include a diffuser or similar device (not explicitly shown, but for example, by having diffuse-type LEDs for lights 613) on the illumination devices 613, in order to reduce shadows and make the illumination more even across the entire surface 624. In some embodiments, the trapping and image-acquisition system 610 can include a pre-processor to do the detection and classification in the field. In other embodiments, the system 600 sends the images to the user's host computer for detection and classification. In some embodiments, the user initiates a direct request from the host computer 320 for an image or to schedule periodic image sampling and uploading.

In some embodiments, system 600 is used for laboratory and other indoor applications. In some embodiments, image-acquisition system 620 includes a scanner 621. On the surface of the scanner, in some embodiments, a box 622 is used to elevate the sampling substrate or background 624 slightly above the scanner surface (e.g., so the sticky paper does not stick to the glass scanning surface or to filter 623, if used). A filter 623 (e.g., color and/or polarization filter) can optionally by used to enhance the image of the arthropods of interest. In some embodiments, the user places or attracts sampled arthropods onto a substrate 624 to be entrapped and/or scanned, in order to have them detected, counted, and classified. In some embodiments, substrate 624 is sticky, in order to entrap the arthropods. In some embodiments, substrate 624 is colored or patterned with a background that has been empirically determined to attract the arthropods of interest. In some embodiments, substrate 624 is colored or patterned with a plurality of different colors in order to have different contrasting backgrounds that enhance the contrast between the background and a plurality if different arthropods of interest. In some embodiments, substrate 624 includes a chemical attractant to lure the arthropods to its surface. The scanned image of the background and any arthropods that may be on the substrate is sent/transmitted by cable 632, or wireless communications, or other suitable means (such as mailing a CDROM having the image data stored thereon) to the communications hardware 630 and host computer 320.

In some embodiments, host computer 320 contains software to capture or receive images from the camera system 610 and/or the scanner system 620, and process the acquired images to detect and classify the arthropods. The host computer 320 software processes the images 640 and produces output identification data 660 and/or updates database records with arthropod information 650, including, in some embodiments, entering data into database 651, including location data 652 (state, county, field, location within field), date 653, conditions 654, insect identifications, counts, etc. 655.

In some embodiments, the image processing 640 includes locating the objects in the camera or scanned digital image 641, isolating the objects in the image 642, reorienting the object in a standard orientation 643, comparing the object to a reference object or a database of reference objects 644, and identifying the object by detecting and classifying it. The results of the image processing 640 optionally result in output identification data 660 and/or updates database records with arthropod information 650. In some embodiments, updating the database records includes entering the data in a database 651. The data in the database can include location data 652 (e.g., state, county, farm name, field location, GPS location, etc.), date of sampling or processing 653, conditions of sampling 654, along with the number of detected arthropods and the arthropod identification and classification information 655. In some embodiments, the right-hand half (data processing portion) of FIG. 6 is equivalent to system 320 of FIG. 3, and the left-hand half (image obtaining portion) of FIG. 6 is equivalent to system 310 of FIG. 3.

Figure 7:
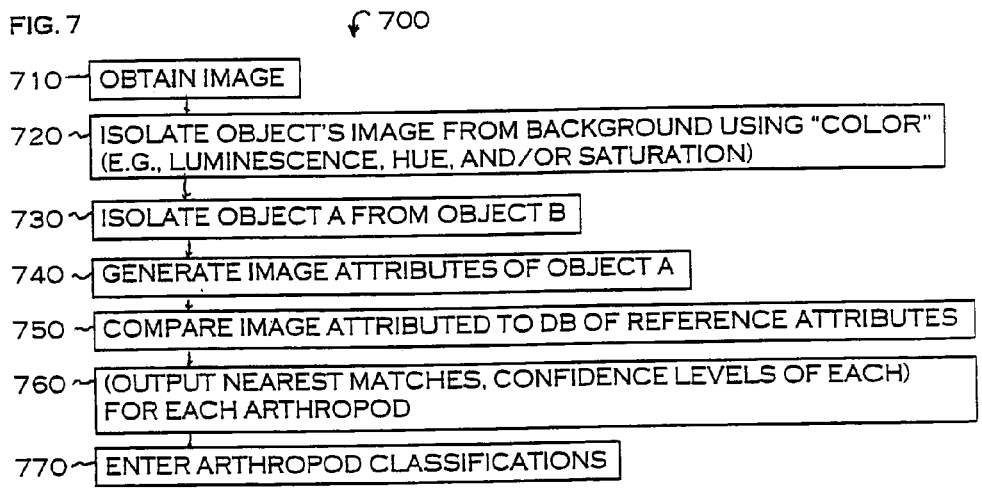
FIG. 7 is a list of a method 700 according to some embodiments of the invention.

FIG. 7 is a flowchart/list of a method 700 according to some embodiments of the invention. Method 700 includes the process of obtaining an image 710, isolating the object image from the background image using "color" 720 (e.g., luminance and/or hue and saturation), isolating the objects in the image 730 (e.g., object A from object B), generating image attributes 740 of object A, comparing image attributes to database of reference attributes 750, storing output detection and identification information for each arthropod 760 (e.g., nearest matches and/or confidence levels), entering the arthropod classifications 770.

Figure 8B:
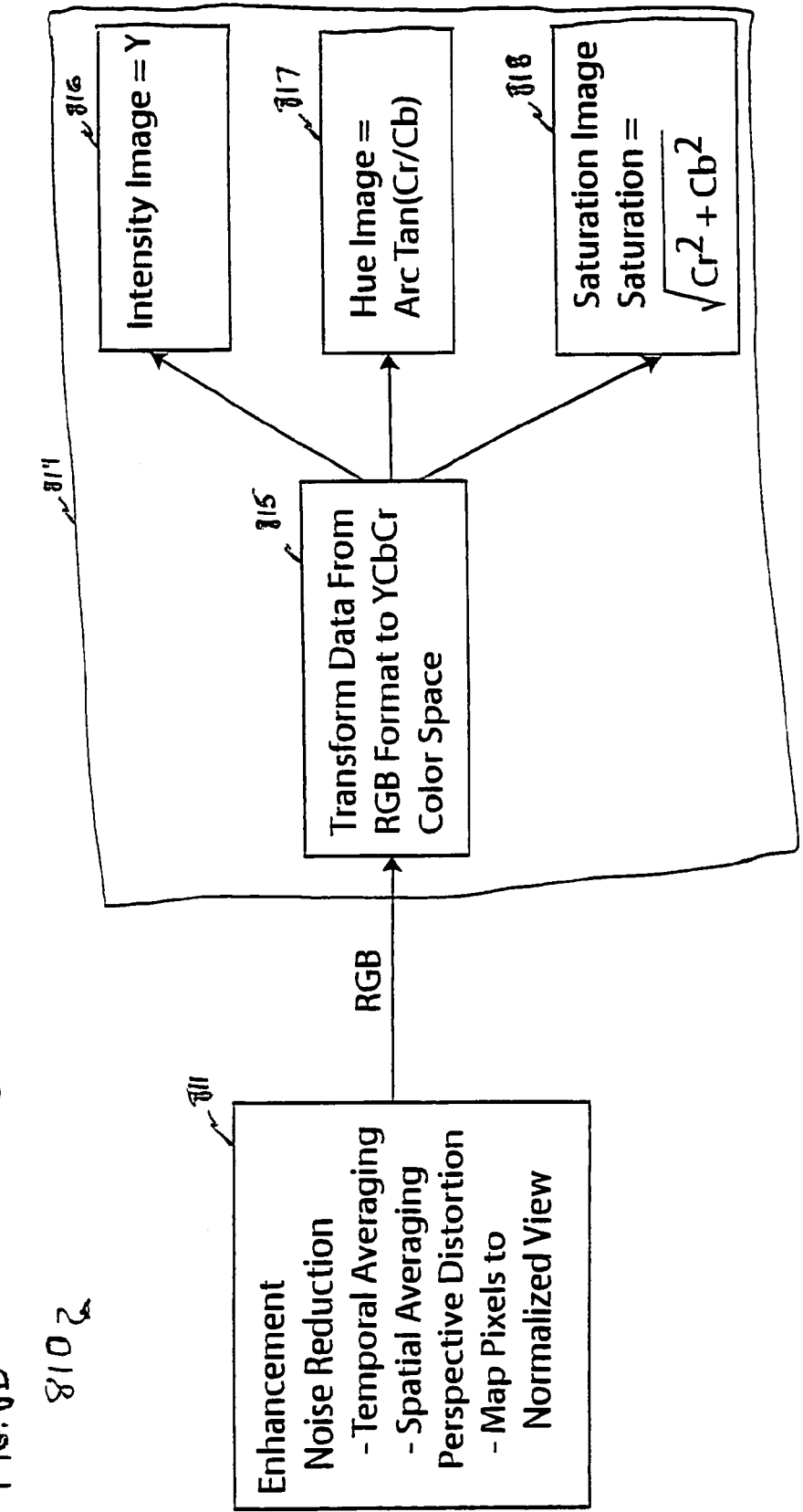
FIG. 8B is a flowchart of a method 810 according to some embodiments of the invention.

FIG. 8A is an overview flowchart of a method 800 according to some embodiments of the invention. At blocks 99 and 98 respectively, some embodiments of method 800 include inputting or obtaining the current image (the one to be analyzed), and inputting or obtaining the prior or background image (the one to be subtracted from the current image). At block 810 (further described in FIG. 8B and FIG. 8C), some embodiments of method 800 include enhancing the image (e.g., by correcting colors based on an subset of the image that represents a calibration standard). At block 830 (further described in FIGS. 8C and 8F), some embodiments of method 800 include segmenting of the detected objects (i.e., collecting or associating pixels that appear to be of a single detection (or detected object)). Blocks 810 and 830 represent the data-independent or pixel-level processing 801. At block 840 (further described below in FIG. 8D and FIG. 8E), some embodiments of method 800 include extracting features (e.g., finding the color histogram and silhouette, and/or rotating/translating to a standard orientation). At block 850 (further described below in FIG. 8D), some embodiments of method 800 include statistically classifying the objects (e.g., arthropods or other objects of interest) using their extracted features. At block 860 (see FIG. 8D), some embodiments of method 800 include syntactically classifying using silhouette and/or color-reference-pixel matching. At block 870, some embodiments of method 800 include updating an arthropod database and/or outputting the classification obtained. Blocks 840, 850, 860 and 870 represent the data-dependent or symbolic-level processing 802.

FIG. 8B is a flowchart of a method 810 according to some embodiments of the invention. At block 811, some embodiments of method 810 include enhancing the image using noise reduction (e.g., temporal averaging and/or spatial averaging), and/or perspective distortion correction (e.g., mapping pixels to a normalized view) and/or color correction (e.g., adjusting the gamma or contrast to obtain more correct color renditions). At block 814, some embodiments of method 810 include block 815 of transforming data from an RBG format to a YCbCr color space, which includes block 816 of calculating the intensity image (the Y data), block 817 of calculating the hue image (the arctangent of (Cr/Cb) data), and block 818 of calculating the saturation image (the square root of (Cr squared plus Cb squared) data).

FIG. 8C is a flowchart of a method 804 of low-level (or pixel-level) image processing, according to some embodiments of the invention. Low-level processing means that each function is applied to each pixel. At block 90, some embodiments of method 804 include acquiring the image. The acquired image can be either a color or black-and-white (B&W) image. For B&W images, the processing skips functions involving hue and saturation images as well as the calculation of color features. At block 811, some embodiments of method 804 include optional enhancing of the image as described in FIG. 8B above. At block 813, some embodiments of method 804 include calculating a background image from the current image (e.g., determining what color most of the pixels are in a given area, and using that color as the background for that area). At block 812, some embodiments of method 804 include choosing which background image type to use. At block 814, some embodiments of method 804 include creating intensity, hue, and saturation images for the current and background images, as described in FIG. 8B above. At block 819, some embodiments of method 804 include creating difference images (between the current and background images) for each of the three image types (intensity, hue, and saturation), and producing outputs 820. At block 821, some embodiments of method 804 include performing an adaptive search for a segmentation threshold for each of the three image types. At block 822, some embodiments of method 804 include applying thresholds to produce three types of segmentation images. Block 830 includes blocks 831 and 832. At block 831, some embodiments of method 804 include applying combined segmentation logic and pixel-level shadow rejection to produce a segmented image. At block 832, some embodiments of method 804 include labeling regions (using connected components logic) and/or rejecting small clutter, to produce a labeled image 839. The labeled image generated by region labeling is also called connected components. Control then passes to FIG. 8D.

Figure 8D:
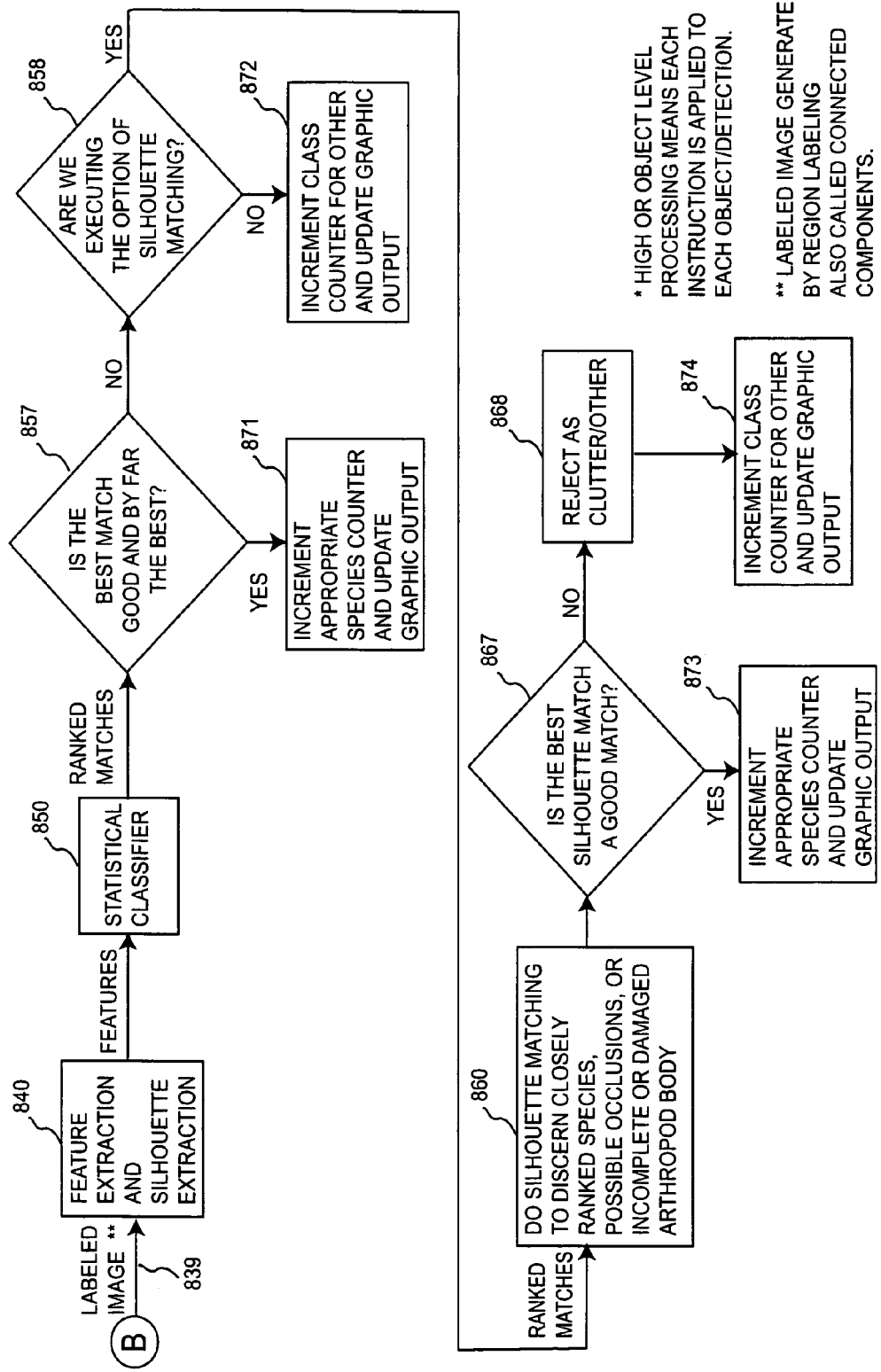
FIG. 8D is a flowchart of a method 805 according to some embodiments of the invention.

FIG. 8D is a flowchart of a method 805 of high-level (or object-level) image processing, according to some embodiments of the invention. High-level processing means that each function is applied to each object or detection. At block 840, some embodiments of method 805 include extracting features and/or silhouettes. At block 850, some embodiments of method 805 include performing statistical classification. At branch block 857, some embodiments of method 805 include going to block 871 if the best match is "good" and by far the best; else control passes to block 858. At block 871, some embodiments of method 805 include incrementing the appropriate species counter and/or updating graphical output. At branch block 858, some embodiments of method 805 include going to block 872 if the method is not executing the option of silhouette matching; else control passes to block 860. At block 872, some embodiments of method 805 include incrementing the classification counter for "other" (for detected objects that were not matched to any reference item included in the reference database) and/or updating the graphical output. At block 860, some embodiments of method 805 include performing silhouette matching to discern closely ranked species, or possible occlusions, or incomplete or damaged arthropod bodies. At branch block 867, some embodiments of method 805 include going to block 873 if the best silhouette match is "good"; else control passes to block 868. At block 873, some embodiments of method 805 include incrementing the appropriate species counter and/or updating graphical output. At block 868, some embodiments of method 805 include rejecting the detected object as clutter or "other" and going to block 874. At block 874, some embodiments of method 805 include incrementing the classification counter for "other" and/or updating the graphical output.

Figure 8E:
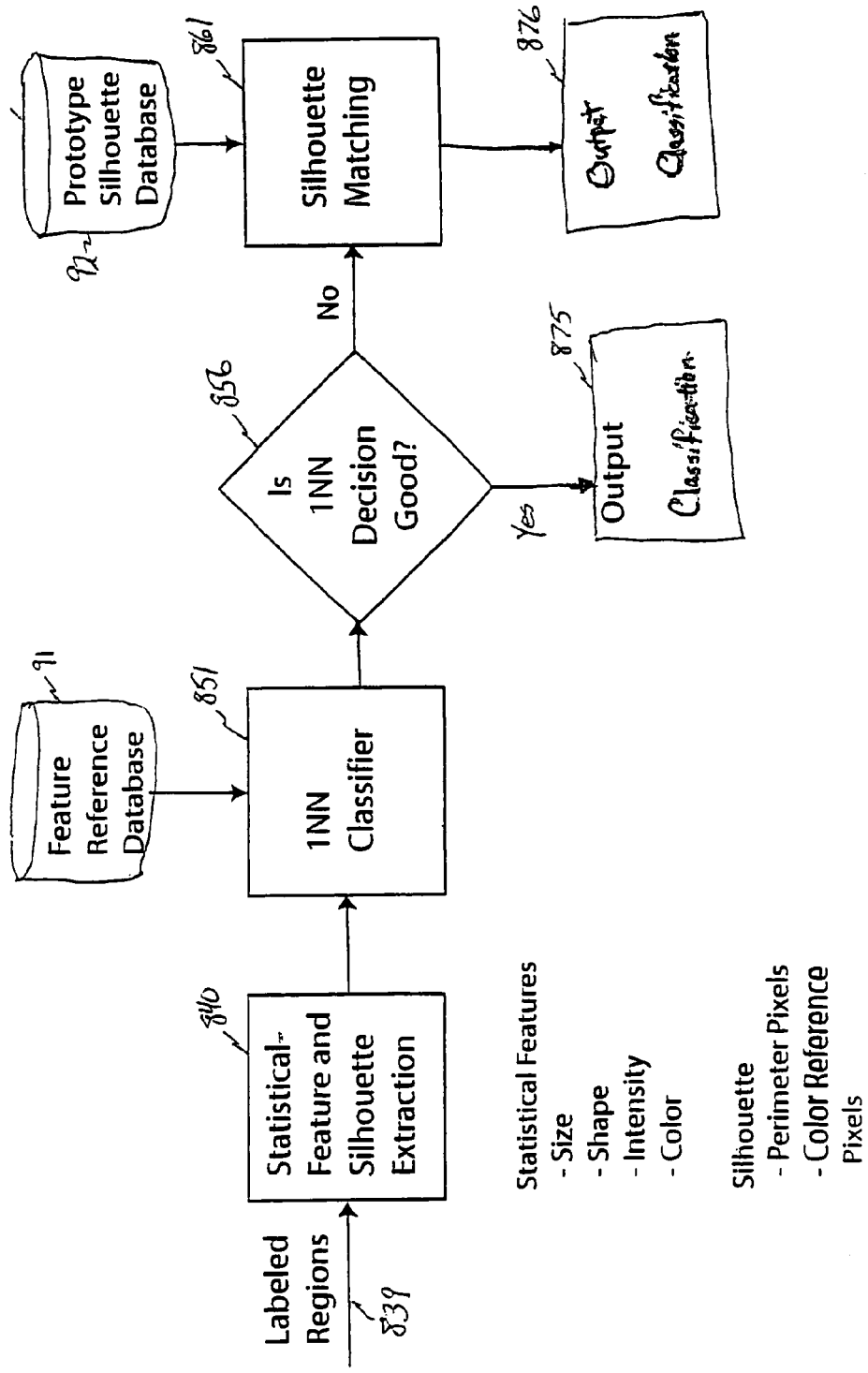
FIG. 8E is a flowchart of a method 806 according to some embodiments of the invention.

FIG. 8E is a flowchart of a method 806 of an arthropod classification process used as an alternative or supplement to that of FIG. 8D according to some embodiments of the invention. At block 840, some embodiments of method 806 include extracting statistical features (e.g., size, shape, perimeter length, intensity, color—e.g., histogram information) and or extracting silhouette data (e.g., perimeter pixels (the outline), and/or color-reference pixels). At block 851, some embodiments of method 806 include performing a 1NN classification using a feature-reference database 91. At branch block 856, if the 1NN decision is "good," control passes to block 875 where the classification is output; else control passes to block 861. At block 861, some embodiments of method 806 include silhouette matching using reference data from prototype silhouette database 92. At block 876, some embodiments of method 806 include outputting the resulting classification.

Figure 8F:
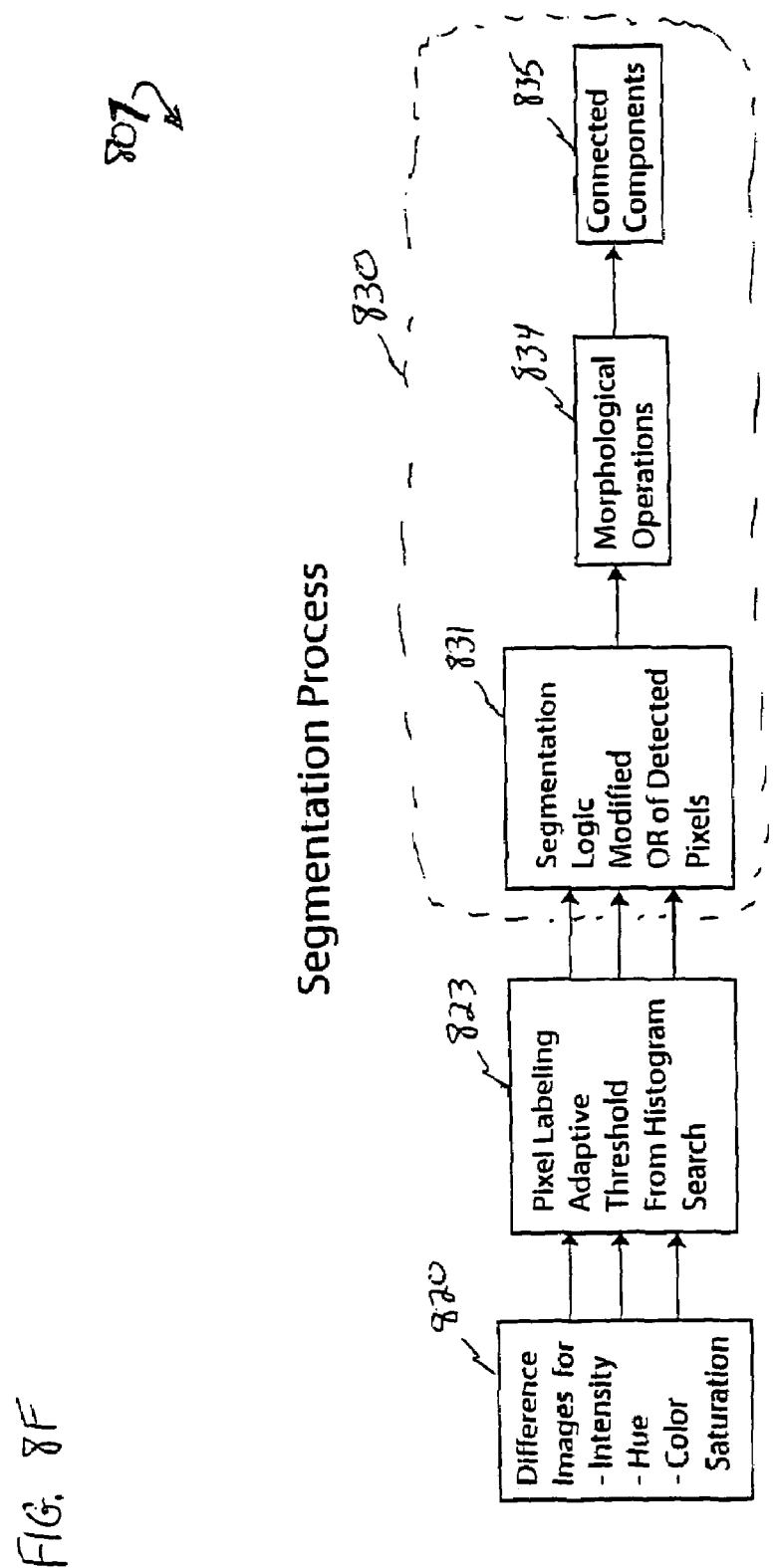
FIG. 8F is a flowchart of a method 807 according to some embodiments of the invention.

FIG. 8F is a flowchart of a method 807 that performs segmentation processing according to some embodiments of the invention. In some embodiments, data 820 is obtained from block 819 of FIG. 8C. At block 823, some embodiments of method 807 include pixel labeling using an adaptive threshold from a histogram search. Block 830 includes blocks 831, 834, and 835. At block 831, some embodiments of method 807 include applying segmentation logic using a modified OR of the detected pixels. At block 834, some embodiments of method 807 include performing morphological operations, such as filling in holes within detected objects or smoothing the edges of detected objects. At block 835 (as in 832 of FIG. 8C), some embodiments of method 807 include performing connected-components logic to obtain a labeled image.

Figure 9:
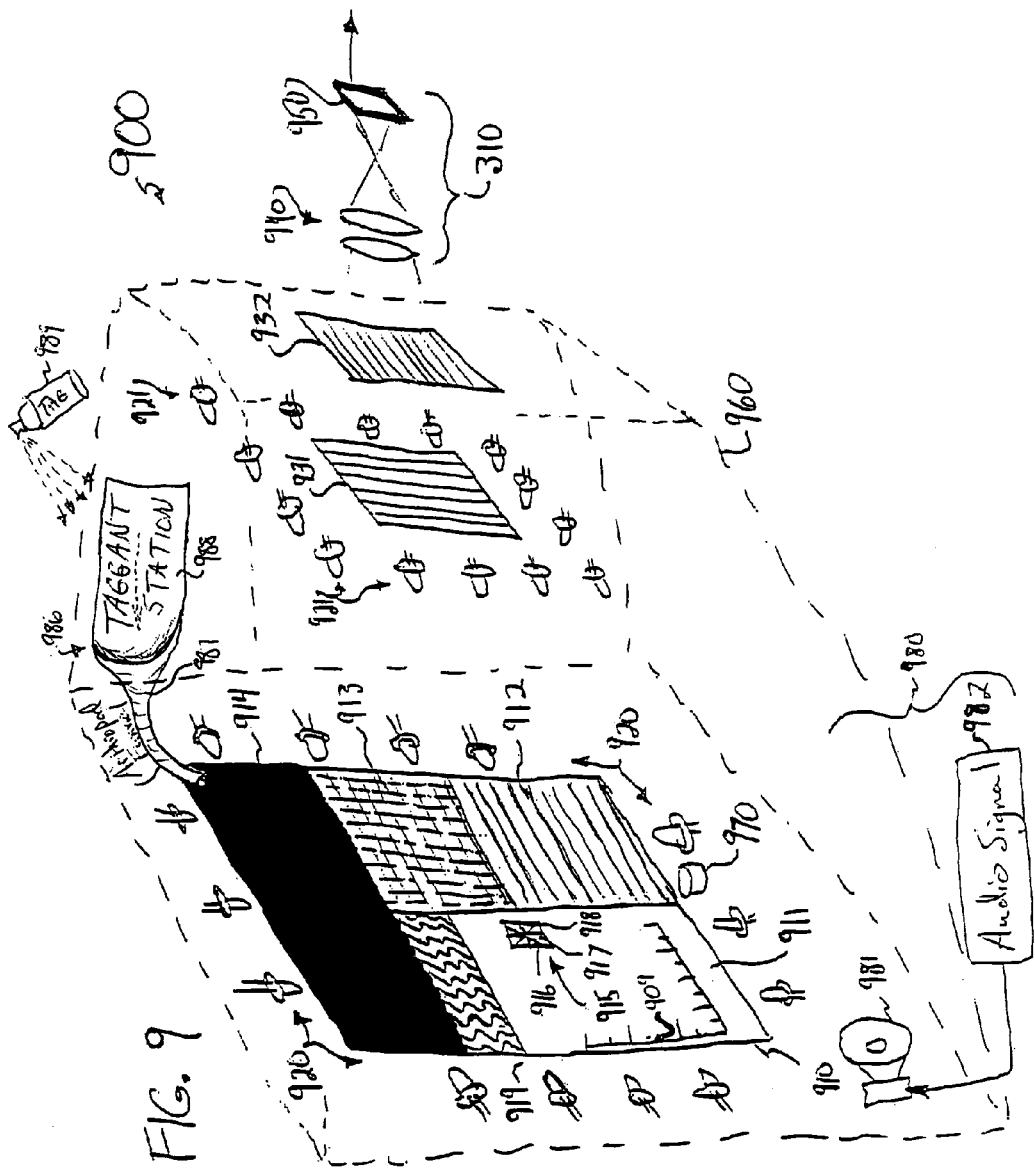
FIG. 9 is a perspective block diagram of a system 900 used to acquire an image in some embodiments of the invention.

FIG. 9 is a perspective block diagram of a system 900 used to acquire an image in some embodiments of the invention. System 900 includes, in some embodiments, a collection surface or substrate 910 having a sticky surface over at least part of its surface area, in order to capture arthropods, and having a plurality of different backgrounds (e.g., having different colors, hues, shades, and/or patterns) that enhance image quality and contrast for a variety of different arthropods, help calibrate imager color or contrast, and/or attract or repel various arthropods. For example, some embodiments include a white area 911 (useful for good image contrast with some black or darker arthropods), a yellow area 913 (useful for attracting certain arthropods), a blue area 912 and/or a black area 914 (useful for good contrast with some white or lighter arthropods), and/or an area 919 having a striped, spotted, checkered, wavy or other pattern(s) that has been empirically determined to attract (in order to capture certain varieties that the user desires to observe) or repel certain varieties of arthropods (in order to avoid capturing other varieties that the user desires not to have in her or his images). It may be that a certain color (e.g., a particular shade of green) is useful to attract the prey to the trap, but that perhaps a different color is a better background for obtaining images, and thus, in some embodiments, both colors are provided on the collection surface or within the trap. Some embodiments also include a scale 909 that is useful to adjust the size of the image to a standard metric.

Some embodiments include a calibration patch 915 (which, in some embodiments, is not sticky in order to avoid having arthropods or debris blocking portions of its image), wherein patch 915 includes a plurality of different colors, hues, or shades 916, 917, and/or 918, useful to calibrate the image obtained for later preprocessing to obtain more accurate color renditions. Some embodiments include side lighting 920 (provided, e.g., by one or more LEDs) and/or front lighting 921 (also provided, e.g., by one or more LEDs) that are used either together to obtain a well lit image without shadows, or separately (e.g., alternately) to obtain one or more images having differing lighting conditions to obtain images one of which might have better image quality than others. In other embodiments, available sunlight is used instead. Some embodiments include one or more diffusers (not shown) on, or in front of, the LEDs in order to further reduce shadows. Some embodiments include a colored filter 931 (e.g., a red or pink filter in some embodiments, to reduce contrast of those colors and/or increase the contrast of complementary colors) and/or a polarizing filter 932 (e.g., to reduce glare) (note that the horizontal-line pattern on filter 932 does not necessarily represent the color blue (such as in patch 912), but rather an exemplary polarization direction). Some embodiments include an imager 310. Some embodiments include an enclosure 960 (shown in dotted lines) to hold or support the other components of system 900. Some embodiments include a substrate or container 970 having a chemical attractant (such as a pheromone and/or kairomone) to attract a wide variety of arthropods, or to selectively attract only certain types, and/or having a chemical repellant to selectively avoid capturing certain types of arthropods. In some embodiments, the chemical attractant substrate 970 is included as a portion (i.e., unified with) background substrate 910. In other embodiments, a separate container is provided as shown in FIG. 9. In some embodiments, substrate or container 970 is made onto and sold as part of substrate 910. In other embodiments, substrate or container 970 is separately sold and then placed on or near substrate 910 in the field. In some embodiments, substrate 910 is a consumable item that is purchased separately and periodically replaced. In some embodiments, substrate 910 and calibration patch 915 are sold or delivered separately, and then either used separately within the imaging field-of-view, or stuck together as shown.

Some embodiments include standardized consumable sticky sheets 910 for trap system 900. These provide sticky coated sheets for trapping insects. In some embodiments, cards come in several sizes to accommodate standard pheromone traps, customized traps and simple sticky boards. In some embodiments, the sticky material is impregnated with various attractants such as pheromones, kairomones, plant or microbial extracts. In some embodiments, an audio device 980 (e.g., a speaker 981 connected to a source of audio signal 982) is included in trap system 900 with the sticky surface 910 to attract arthropods. In some embodiments, audio source 980 provides sounds that attract certain arthropods. In some embodiments, side light source 920 and or front light source 921 (e.g., one or more various different colors of LEDs such as infrared, red, orange, yellow, green, blue, and/or ultraviolet colors, in some embodiments) is chosen and illuminated, e.g., at night, to attract certain arthropods to the trap, as well as to provide illumination for taking the image. In some embodiments, sticky sheets 910 meet color requirements that are attractive to certain species. In some embodiments, sticky sheets 910 are made to withstand elements of an outdoor environment (e.g., sheets having sunlight resistance and cold/heat resistance).

In some embodiments, the methods and apparatus of the present invention are also used to analyze images of arthropods whose cuticles (external surface) have been tagged with diagnostic markers ("taggants") that have affinities for a specific cuticle component such as hydrocarbons (see, e.g., Bergman, D. K., J. W. Dillwith, R. K. Campbell, and R. D. Eidenbary, 1990. *Cuticular hydrocarbons of the Russian wheat aphid*. Southewestern Entomologist. 15(2): 91-99), waxes and lipids (see Lockey, K. 1988. *Lipids on the insect cuticle: Origin, composition and function*. Comp. Biochem. Physiol. 89B(4): 595-645., 1988). In various embodiments, the markers are fluorescent materials, other materials (for example, tissue stains or afterglow phosphors) or radioactive materials. Chemical or topographical variations of the arthropod cuticle among species are used to discriminate insect populations. For example, there are variations in cuticular hydrocarbons between different Russian wheat-aphid populations (Bergman et al. 1990, cited above). An extensive review of literature on markers to tag insects is provided by Southwood, 1978 (Southwood, T. R. E. 1978. Ecological Methods. Chapman and Hall. London. 524 p.). Taggants with affinity for specific cuticle components can be applied to trapped arthropods or arthropods placed on a detection surface. Digital images are taken and analyzed for specific spectra from the tagged cuticle components. One use for this is in forensic entomology, i.e., the identification of insects and other arthropods that infest decomposing remains, in order to aid criminal investigations.

In some embodiments, the method of the present invention is also used to examine digital pictures of manually-prepared tissue sections (e.g., slices of arthropods or other organisms, including, in some embodiments, sections of human or other mammalian, avian, piscine, reptilian, or other animal or plant tissues) that have been labeled with monoclonal-antibody or DNA-specific-sequence taggants using well-known labeling techniques such as described in the above references. For example, a tissue sample is obtained and prepared and a selective taggant is applied (such as one or more different tissue stains, and/or monoclonal-antibody or DNA-specific-sequence taggant), and a digital photograph is taken. In some embodiments, a microscope is used to obtain a greatly enlarged image of suitable resolution. The image-analysis methods described herein are then used to locate and isolate areas of interest in the image (in some embodiments, a human-user interface is provided to enhance the identification of areas of interest), and the methods of the invention then utilize, for example, color histograms or color patterns of each area of interest, in order to identify the type of organism, or to identify an indication of some pathology such as cancer or bacterial infection.

As shown in FIG. 9, some embodiments further include an optional taggant station 986, for example including a surface 988 across which the arthropods would be expected to walk, and a funnel 987 leading to black surface 914. An arthropod walking across or passing through taggant station 986 would pick up taggant on some portion of its body, for example, on its feet, much like a child walking through mud. In some embodiments, the taggant is specifically targeted to selectively attach (or selectively not attach) to one type of arthropod (a targeted taggant), while other embodiments use a taggant that non-selectively attaches to any arthropod passing through (a non-selective taggant). In some embodiments, the LEDs 920 near the black surface 914 include LEDs that emit ultraviolet or "blacklight" such as are available from Nichia America Corporation. In some embodiments, a tagged arthropod, upon exiting taggant station 986 would end up stuck to sticky black surface 914, and photographed. For example, in some embodiments, a first, normal-light, image is obtained using one set of LEDs 920 or ambient light, and a second, blacklight, image is obtained of the same scene using UV emitting ones of the LEDs 920, and showing, for example, fluorescently re-emitted light from taggant on the tips of the feet of the arthropod. Analysis of the two images is then done in a combined fashion, using features obtained of the arthropod from the first image and from the second image, for example obtaining colors or color patterns from the first image and other information such as outline information, e.g., the positions of the ends of the limbs, from the second image, and then performing the recognition methods of the present invention on all of the information.

Thus, in some embodiments, the present invention includes acquiring two or more images of the same scene (using either the same or different imagers), and providing different lighting (such as different wavelengths (e.g., UV, visible, and/or infrared), different polarizations or filters, and/or different source directions) for each of the plurality of images. In some such embodiments, taggants are used, for example to provide fluorescence for the UV image, while in other embodiments, no taggant is used and the two images obtain different color, fluorescence, or polarization information of the specimens in their natural state. For example, a first image can be obtained in normal light of a red-green-blue spectrum (e.g., using red, green and blue LEDs for illumination, and an RGB imager), and then a second image of the same scene is obtained using the same RGB imager, but with only UV LEDs providing illumination and the imager obtaining light from the fluorescing specimen or the taggants attached thereto. In some embodiments, further images are also obtained, e.g., using different polarizing filters. Since the same imager in the same position is used, corresponding pixel locations from the different images provide different information about the same area of each specimen. The additional images are, in some embodiments, treated as additional color values, such that a first hue-saturation-intensity set of values for each pixel is obtained from the RGB visible-light image, and a second hue-saturation-intensity set of values for each pixel is obtained from an UV-light/fluorescing or phosphor-afterglow image. In some embodiments, histograms or color patterns of these additional colors provide additional inputs to the identification portions of the object-recognition portions of the method and apparatus for the invention described herein.

In some embodiments, the targeted taggant 989 is sprayed on from an aerosol can, and when on surface 988, will selectively either stick or not stick to a particular set of arthropod types. At the targeted taggant station 988, for example, only a small set of species, or even one specific species or one sex of arthropod would pick up some of the targeted taggant. Targeted taggants include chemical markers, taggants, radioisotopes, afterglow phosphors, and substances with photo/thermal-chemical effects such as fluorescence, to which are attached antibodies or DNA snippets or other chemical keys specific to the set of species, or one specific species or one sex of arthropod of interest. For example, arthropods have cuticles that have wax coatings. Different arthropods have different waxes. Antibodies exist that stick to certain of these waxes and not to others. The term "taggant" is used to label the technology associated with the chemical tagging of marks, inks or toners or similar substances such that "tagged" objects can be distinguished from "untagged" objects. In some embodiments, the taggant effect may be readily observable such as the application of materials that change colors with slight temperature changes or when viewed at varying angles or when illuminated by "black light" or flashed with a short pulse of bright light. Taggants can involve a number of photo-chemical effects such as; absorbing energy at one wavelength and emitting energy at another, absorbing energy at particular wave-lengths, temporal effects when illuminated with pulsed energy, etc. Taggants can also include radioisotopes that can be detected with detectors for radioactivity such as Geiger counters.

For example, in some embodiments, a species-specific fluorescent taggant 989 is placed on surface 988 of taggant station 986. When an individual of that specific species walks across surface, it picks up some of the taggant 989 on its feet, travels through optional funnel 987 and becomes ensnared on sticky black surface 914. Ultraviolet LEDS 920 emit UV light that is absorbed by the taggant and re-emitted at a longer wavelength (such as yellow or green) that is readily detected by imager 310. Individuals of other species would not pick up the taggant (for example, because their different waxes do not have an affinity for the taggant), and if these untagged individuals end up on black surface 914, they would not fluoresce. This difference provides another distinguishing feature that is used by the software to distinguish and identify individuals from a specified set of arthropods (such as one species).

In some embodiments, the taggant station 986 is sold as a consumable. These preconfigured taggant stations 986 can then be sold to users for more specific identification uses.

In some embodiments, a preconditioned sheet 910 includes the taggant station 988 as one part of the sheet, such that, for example, the taggant surface 988 is surrounded by black surface 914. These preconfigured taggant sheets 910 can then be sold to users for more specific identification uses.

In some embodiments, trap system 900 also includes one or more color filters 932 and/or polarizing filters 931 to condition the light for obtaining higher-quality or better-contrast images, and a lens system 940 and imaging electronics (such as a CCD or CMOS detector array and the driving circuitry) is suitable resolution to obtain images with sufficient quality for the automatic image processing of the present invention.

FIG. 10A is a representation of a calibration surface 915 used in some embodiments of the invention. In some embodiments, calibration surface 915 is included as a small portion of an overall collection and imaging surface 900 as shown in FIG. 9. Some embodiments include a grid of squares, each having a different color, hue, saturation, and/or intensities 916, 917, 918. Since the predetermined colors are of known values, an image of patch 915 can be used to calibrate the colors, hues, saturations, and/or intensities of an associated collection image of arthropods. Some embodiments include a printed card containing a standard or particular combination of hue and saturation for each of the following colors: red, blue and green, or yellow, magenta, and cyan. An image of this card (as part of a field image of collected arthropods) is used and compared to a standard to adjust the color settings on various imaging devices such as scanners, digital video cameras and digital still-frame cameras, so that different imaging devices and different lighting conditions can be calibrated to produce arthropod images equivalent in color.

FIG. 10B is a graph of an example calibration function 1010 used in some embodiments of the invention. For example, for certain imaging hardware under certain lighting conditions, a curve 1011 is derived from image information correlated to patch 915. The correction function is then derived to change the pixel information for the entire image to a standard (e.g., linear) curve 1012. In addition to the being able to reproduce identical pigmentation from card to card, the card is, in some embodiments, printed on paper, plastic or other material, where the pigments are uniformly applied, with reflective glare minimized, and the texture of the material's surface minimized relative to the spatial resolution of the cameras. In some cases, depending on the resolution or magnification of the imaging devices, the paper for the calibration card is of a quality that does not have detectable strands or chips of wood fibers. In some embodiments, the calibration card is not limited to just the visible portion of the light spectrum. In some embodiments, system 1070 (See FIG. 10H described below) uses imaging devices 310 (and calibration cards 915) that obtain and/or calibrate image information using light beyond the visible spectrum to look for distinct color patterns of arthropods in the near ultraviolet or near infrared, or for tagged or fluorescent molecular markers on the arthropod's surfaces. In some embodiments, LEDs 920 and/or 921 (see FIG. 9) emit light that is at least partially in the ultraviolet or infrared spectra.

FIG. 10C shows a collecting device 1020 adapted to vacuum devices to sample insects. In some embodiments, device 1020 includes an inlet opening 1021 through which air is drawn and large enough to admit arthropods of interest and optionally small enough to keep out larger animals such as bees or hummingbirds, a chamber 1029, a perforated substrate 910 on an inner surface through which air is drawn into manifold 1022 and vacuum passage 1023 connected to vacuum pump or fan 1024. In some embodiments, perforated substrate 910 has holes 1025 and a sticky surface to hold the collected arthropods, while in other embodiments, the vacuum alone is enough to hold the collected arthropods long enough to obtain the desired image using imaging device 310.

FIG. 10D is a perspective view of a sample-cleaning system 1030 used in some embodiments. Some embodiments include sets of sieves (e.g., tilted sieve 1031 with large openings, tilted sieve 1033 with medium openings, and tilted sieve 1035 with fine openings) and/or blower(s) 1037 to separate arthropods from non-arthropod material, and/or to separate different types of arthropods from one another. In some embodiments, the source material is deposited into the open top. The size- and/or weight-sorted arthropods and other objects are then obtained from spigots 1032, 1034, 1036 and 1038.

FIG. 10E is a perspective view of a sample-processing unit 1040 used in some embodiments. In some embodiments, sample processing unit 1040 includes a vessel or container 1042 (with a closable opening 1041) in which to place samples of arthropods prior to acquiring their image. In some embodiments, container 1042 includes a means of immobilizing or killing the arthropods. Immobilizing methods include using ether or ethyl acetate, or cold temperature. In some embodiments, container 1042 also contains a plaster-of-Paris (hemi-hydrated calcium sulfate) substrate 1043 to hold or absorb any volatile liquids that are used to kill or immobilize the arthropods. There are several variations (different embodiments) for immobilizing the arthropods. In some embodiments, container 1042 has a separate compartment for solids that would prevent arthropod mobility. In some embodiments, ammonium carbonate, ice, and/or dry ice, are placed in this compartment to kill, render immobile, or knock out arthropods. In some embodiments, container 1042 could also be fitted with one or more regulator valves 1044 that can be screwed onto a $CO_2$ cartridge 1045. A controlled quantity of $CO_2$ is released into the container to render immobile or knock out the arthropods.

FIG. 10F is a perspective view of a set of scanner lids 1050 used in some embodiments. In some embodiments, set 1050 includes scanner lids in various standard colors (e.g., lid 1051 with a black background, lid 1051 with a blue background, and lid 1053 with a yellow background, and/or a lid with a white background) are provided to cover the scanner surface, if such is used to obtain images of the arthropods. For example, a sample of arthropods are deposited on the glass scanner surface and covered with one or another of the set of lids 1050 to obtain one or more images with different backgrounds to improve contrast. In some embodiments, set of lids 1050 are constructed out of a paper product or plastic with a matte surface to reflect light without a specular (mirror-like) reflection. Some embodiments include several optimized colors to allow for the selection of a background color that maximizes the difference in hue and saturation between the expected insects and their background. Studies with scanners indicate that, in some embodiments, a lid about five centimeters high may be the optimum height.

FIG. 10G is a block diagram of an example on-line arthropod-identification service 1070. In some embodiments, one or more users 87 upload (transmit) one or more images 1071 of unknown arthropods or other objects to a commercial and/or non-profit website hosted by system 320 (see FIG. 3). In some embodiments, the images are optionally accompanied by other information such as the place, environment and time of the collection, and optionally including billing information such as credit-card data (to pay for the identification service) that is entered through a secure interface and stored to database 1079. In system 320, automated software analyzes and classifies the objects found, and returns an identification, and optionally also sends other relevant information (such as control methods and substances, and/or image information to help the user confirm the machine-made classification) on the identified species. In other embodiments, images of unknowns are sent to the automated identification service provided by system 320 via mail, email or facsimile machine (fax). In some embodiments, the source image needs to conform to certain image formats, standardized lighting and camera settings, pixel resolutions, etc. In some embodiments, the image is pre-processed to obtain condensed image information, such as histogram and silhouette information, which is transmitted and analyzed by proprietary software (using reference database 200 or 1060) at a centralized location, which returns the identification and/or other information. In some embodiments, the system 320 stores the identifications made and the information such as place, environment and time of the collection, into a centralized results-and-analysis database 250, where various further analysis and data-aggregation functions can be performed.

In some embodiments, the following method is used with FIG. 10G: establishing a network connection, transmitting image information wherein the image information includes image information data regarding one or more arthropods, analyzing the image information and generating classification information regarding identified arthropods, and returning the classification information. In other embodiments, images of other organisms or their parts (e.g., plants, fish, feathers from birds, shed skins of snakes, X-rays of human patients or other pathology or microscopy images, etc.), or of non-living items (e.g., rocks, crystals, fossils, antiques, or human-made items) other than arthropods are transmitted, analyzed, and the identification or classification returned. In some embodiments, payment information is solicited from the user 87, and collected into database 1079, in order to charge the user for the service(s) provided. In some embodiments, different payment amounts are requested based on how much classification and analysis information is requested (e.g., just an automated classification might have a low cost, or additionally a human confirmation of the identification at a higher cost, and/or information as to control methods, or image data returned might have different cost rates.)

FIG. 10H shows a diagram of an example reference database structure 1060 for key arthropods. Some embodiments include one or more different reference databases of important arthropods for classification. In some embodiments, each database is tailored for particular agricultural crops (e.g., for field use) and/or commodities (e.g., for use in grain elevators or other commodity-storage facilities), or other specialized or identified environments. In some embodiments, each record 1061 includes a plurality of fields, for example species filed 1062, genus field 1063, silhouette data field 1064, hue and saturation data field 1065, etc. In some embodiments, each record 1061 further includes a data field 1068 describing methods that can be used to control that particular arthropod, and data field 1069 having image data for that particular arthropod, for example in GIF or JPEG format, or a pointer (such as a URL) to a GIF or JPEG image.

In some embodiments, as shown in the lower portion of FIG. 10H, each database 1060 contains a plurality of records

1091, 1092, etc., that include a sufficient representation of the variation in appearance (e.g., record 1091 that includes a plurality of silhouette fields 1095, hue-saturation histogram fields 1096, and other identification fields 1097 for the arthropod type identified in species field 1093 and genus field 1094) of the important and common arthropods for a particular crop or environment. In some embodiments, each database 1060 includes information 1098 as to control methods and compounds (e.g., insecticides) for the identified arthropods, and/or a set of arthropod images 1099 that provide interested parties with images of arthropods from the image database. In some embodiments, rather than holding the images and other auxiliary information directly, database 1060 includes pointers to internet web pages having the desired information. This helps the user by correlating the identification made by the system 320 to images, control methods, or other information about particular arthropods. Images are useful for researchers and educators. Some embodiments provide access to this database information, or to certain parts thereof, as part of a business method implemented to be available (optionally for a fee) over the internet.

FIG. 10I and FIG. 10J show first and second portions of a diagram of an example reference database structure record 1080 showing exemplary data, typical of some embodiments, for one key arthropod, a particular weevil. The comments following the double slash marks "//" in each field are typically not included in each record but are shown here for clarity. In some embodiments, each record 1080 includes data such as, in FIG. 10I:

FIELD 01—CLASS STRING (e.g., "WEEVIL");
FIELD 02—SUBCLASS STRING (e.g., "WEEVIL SIDE VIEW");
FIELD 03—CLASS NUMBER (e.g., "1");
FIELD 04—SUBCLASS NUMBER (e.g., "1");
FIELD 05—AREA OF ARTHROPOD (e.g., "1292");
FIELD 06—PERIMETER (e.g., "202");
FIELD 07—LENGTH (e.g., "57.922");
FIELD 08—WIDTH (e.g., "34.461");
FIELD 09—CIRCULAR MATCH FEATURE (e.g., "0.398");
FIELD 10—RECTANGULAR MATCH FEATURE (e.g., "0.647");
FIELD 11—ELONGATION (MAJOR TO MINOR AXIS) (e.g., "1.681");
FIELD 12—TWELVE VALUES OF THE SHAPE HISTOGRAM (e.g., twelve bins);
FIELD 13—AVERAGE GRAY LEVEL (e.g., "—66");
FIELD 14—SIXTY-FOUR VALUES OF THE INTENSITY HISTOGRAM; and in FIG. 10J:
FIELD 15-32 by 32 COLOR-SATURATION MATRIX (e.g., typically mostly zeros with groups of peaks corresponding to the hues and saturations of the main colors); and
FIELD 16—COLLECTION ID (e.g., character string such as "08032 CBW 0000").

FIG. 10K and FIG. 10L show first and second portions of a diagram of an example reference statistical-feature database definition 1081 for key arthropods. Each field in the database definition 1081 corresponds to the same field in database structure 1080, and provides a further explanation of those fields. In some embodiments, database structure 1080 is used in the process explained in FIG. 8A above, and in particular in statistical classifier 850 and syntactic classifier/silhouette matcher 860, and/or in the "match outline geometry" block 130 of FIG. 1.

FIG. 10M and FIG. 10N show first and second portions of an example definition of reference color-silhouette database 1082 for key arthropods. In some embodiments, database 1082 is used in the "match color geometry" block 140 of FIG. 1.

Figure 11:
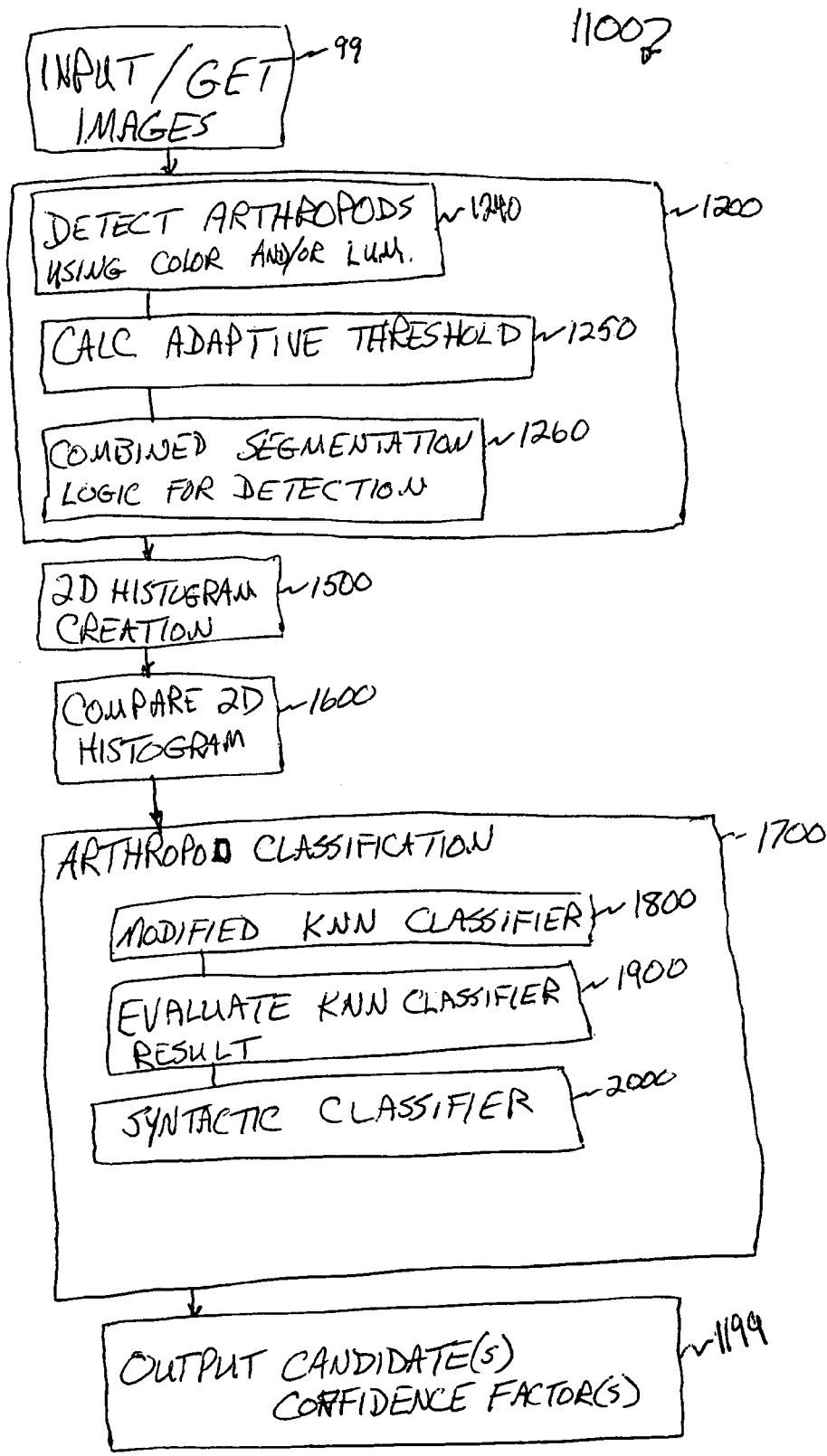
FIG. 11 is a flowchart of a method 1100 according to some embodiments of the invention.

FIG. 11 is a flowchart of a method 1100 according to some embodiments of the invention. At block 99, the image is taken, acquired, or input to the classification computer. In some embodiments, block 1200 includes the operation of detecting arthropods using color and/or luminescence 1240, the operation of calculating one or more adaptive thresholds 1250, and combined segmentation logic for detection 1260, each of which is described further in regard to FIG. 12 below. Block 1500 includes the operation of creating a 2D histogram, which is described further in regard to FIG. 15 below. Block 1600 includes the operation of comparing the 2D histogram, which is described further in regard to FIG. 16 below.

Block 1700, which is described further in regard to FIG. 17 below, includes the arthropod-classification operations of applying a modified KNN 1800, which is described further in regard to FIG. 18 below, evaluating the KNN result 1900, which is described further in regard to FIG. 19 below, and applying a syntactic classifier 2000, which is described further in regard to FIG. 20 below. Block 1199 represents the operation of outputting one or more candidates, and optionally also outputting a confidence for each candidate.

Figure 12:
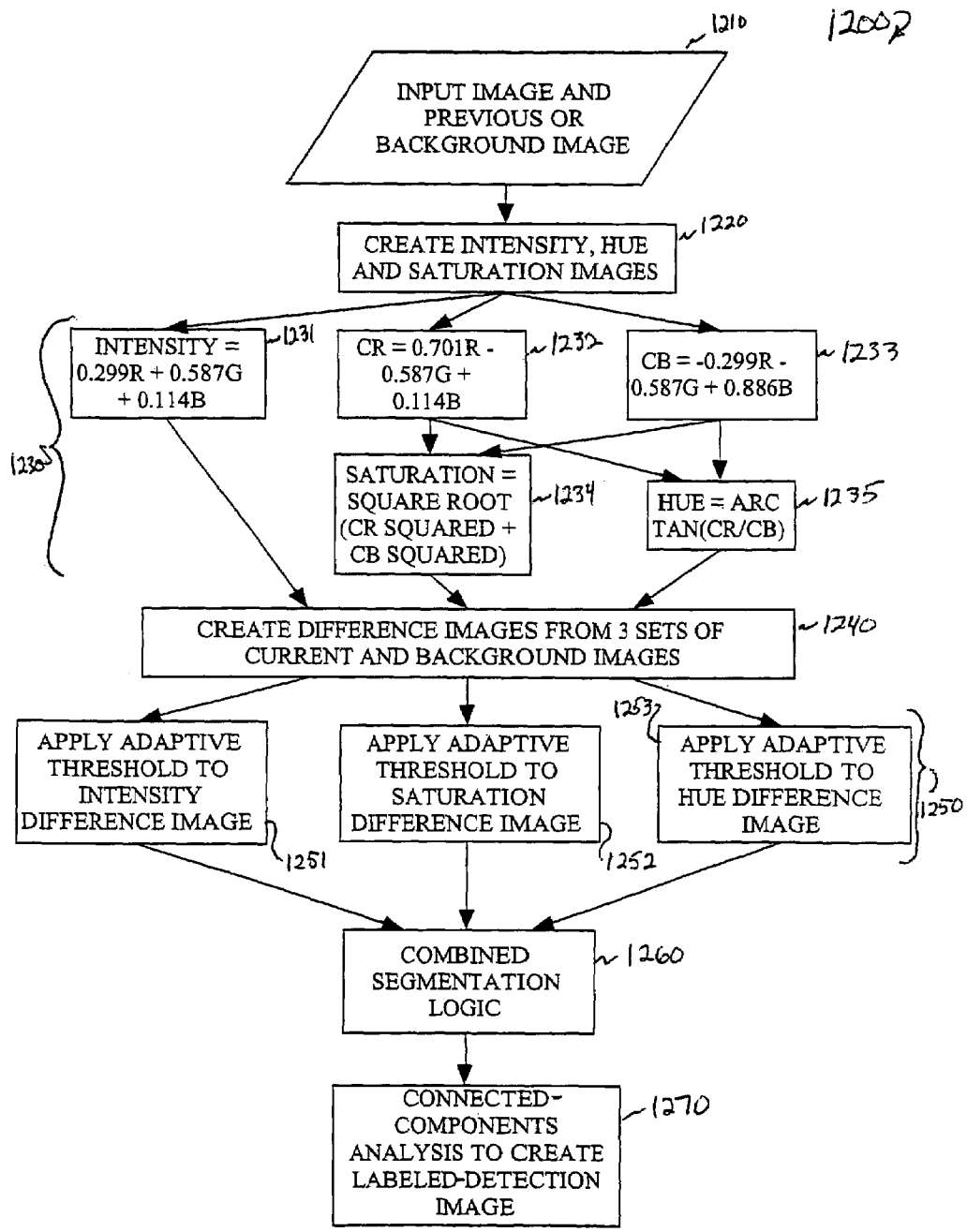
FIG. 12 is a flowchart of a method 1200 according to some embodiments of the invention.

FIG. 12 is a flowchart of a method 1200 according to some embodiments of the invention. In some embodiments, method 1200 includes the function of inputting 1210 the image of interest (the one to be analyzed) as well as an earlier image of the same substrate of a representation of the background image (e.g., a yellow image if the original substrate were yellow). The next function of creating 1220 intensity, hue, and saturation images based on the image of interest and the earlier or background image, as well as on formulae 1230 wherein, in some embodiments for each pixel in each image, formula 1231: INTENSITY=0.299×RED+0.587×GREEN+0.114×BLUE formula 1232: CR=0.701×RED+0.587×GREEN+0.114×BLUE formula 1233: CB=−0.299×RED+0.587×GREEN+0.886×BLUE formula 1234: SATURATION=SQUARE ROOT(CR SQUARED+CB SQUARED)

formula 1235: HUE=ARCTAN(CR/CB).

Next, the function of creating 1240 difference images from the three sets (intensity, hue, and saturation) of current and background images is performed. Next, the function of creating and applying 1250 (one such embodiment is further described in FIG. 13 below) adaptive thresholds (i.e., function 1251 of applying adaptive threshold to the intensity difference image, function 1252 of applying adaptive threshold to the saturation difference image, function 1253 of applying adaptive threshold to the hue difference image). Next, the function of applying 1260 (one such embodiment is further described in FIG. 14 below) combined-segmentation logic is performed. Then, the function of applying 1270 connected-components analysis is performed to create a labeled-detection image (i.e., for each pixel, examining neighboring pixels in each of a plurality of directions to determine which pixels are "connected" (i.e., form part of the same detected object—called a "detection"—in the image). In some embodiments, the background pixels are set to a value (e.g., zero) and the other pixels (e.g., possible arthropods) are set to another value (e.g., 255). Then the first "255" pixel (e.g., the left-most and top-most) is processed (e.g., its value is set to one, and its neighbor pixels and their neighbors, if 255, are also set to one. Then the next "255" pixel (e.g., the left-most and top-most of the remaining pixels) is processed (e.g., its value is set to two, and its neighbor pixels and their neighbors, if 255, are also set to two. Then the next "255" pixel (e.g., the left-most and top-most of the remaining pixels) is processed (e.g., its value is set to three, and its neighbor pixels and their neighbors, if 255, are also set to three, and so on. In some embodiments, each pixel of the labeled-detection image can be represented by a 16-bit word. In this way, up to 65,535 groups of pixels can be identified as "detections" or separate detected objects. In other embodiments, other values can be used, depending on the number of objects to be identified.

Figure 13:
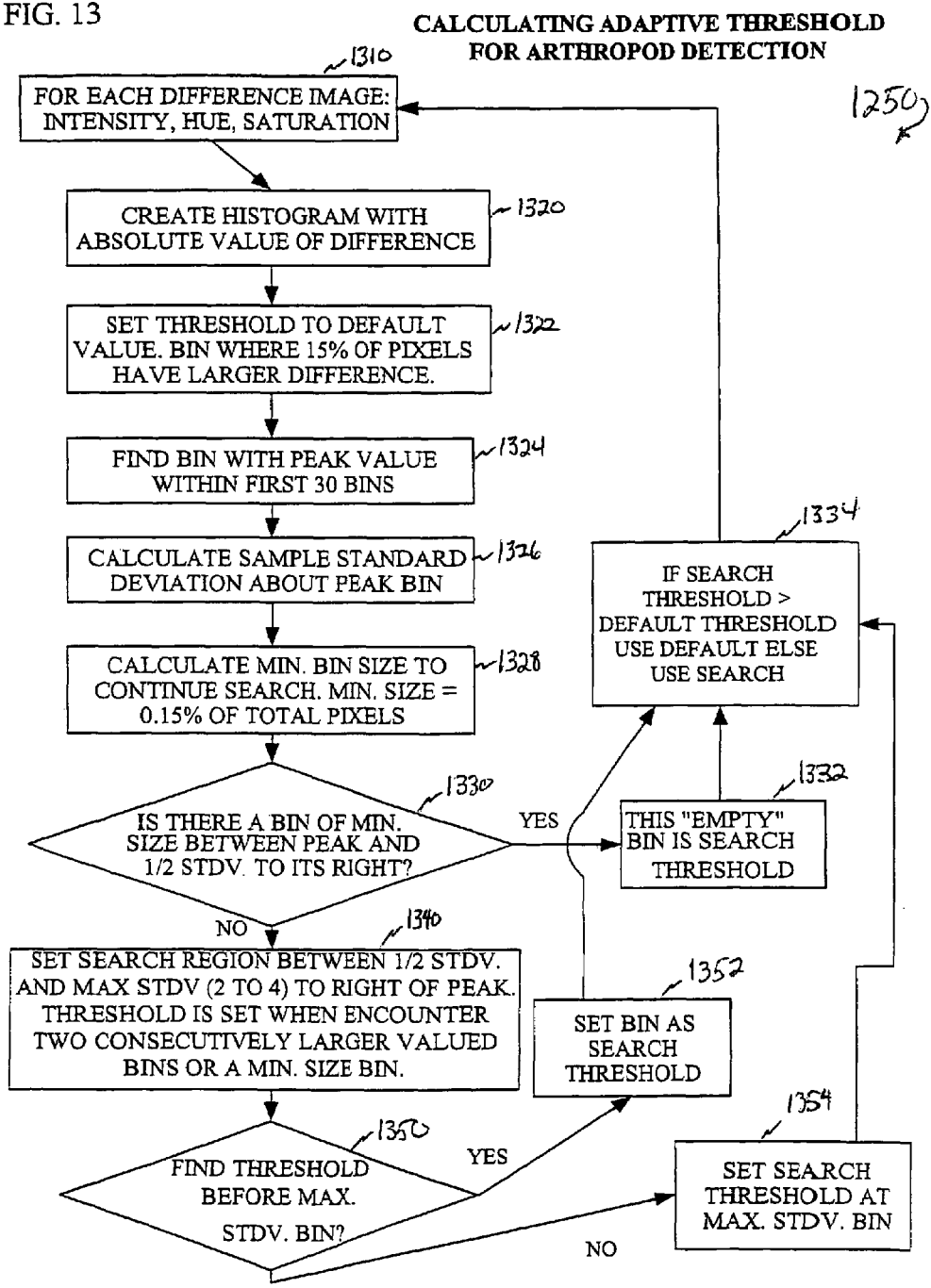
FIG. 13 is a flowchart of a method 1250 according to some embodiments of the invention.

FIG. 13 is a flowchart of a method 1250 according to some embodiments of the invention. At block 1310, the function of method 1250 is started for each of the intensity, hue, and saturation images. At block 1320, the function of creating a histogram with the absolute value of the difference between the entire image (or substantially the entire image) of interest and the corresponding prior or background image is performed. For example, the histogram might have 256 "bins;" one bin (counter value) for each possible absolute value of the difference value between corresponding pixel values of the two images. Bin 0 is a counter that would have the number of pixels that have zero difference (a count of the pixels that have the same value in the prior image and the image of interest); bin 1 would have the number of pixels with a difference of plus or minus 1, bin 2 would count the pixels that have a difference of plus or minus 2, and so on. At block 1322, the function of setting the threshold to a default value, and selecting as a threshold bin if 15% of the pixels have a larger difference (e.g., taking as an initial assumption that 15% or fewer pixels will be of an arthropod or other object), is performed. At block 1324, the function of finding the bin with the peak value within the first 30 bins (the bins that count the zero difference to the twenty-nine difference) is performed. At block 1326, the function of calculating the positive standard deviation about the peak bin (e.g., for a standard deviation of one and four, to determine a search range) is performed. At block 1328, the function of calculating the minimum bin size to continue the search (e.g., in some embodiments, a minimum bin size or value would include at least 0.15% of the total pixels) is performed. At block 1330, a branch is made based on whether there is a bin of the minimum size between the peak and ½ standard deviation to its right (bins with larger differences). If yes, then at block 1332 the value in this "empty" bin is used to set the search threshold, and at block 1334, if the search threshold is greater than the default threshold, then the default threshold is used; else the search threshold is used. If at branch 1330, there is no bin of minimum size between the peak and ½ standard deviation to its right, then block 1340 is performed, where the search region is set to between a bin at ½ standard deviation and a bin at some maximum standard deviation (e.g., a value between two and four standard deviations) to the right of peak. The threshold is set when the function encounters two consecutively larger-valued bins, or a minimum-sized bin. If at branch 1350, the threshold was found before the maximum-standard deviation bin, then the search threshold is set at that bin, and the process goes to block 1334. If at branch 1350, the threshold was not found before the maximum-standard-deviation bin, then the search threshold is set at the maximum-standard-deviation bin, and the process goes to block 1334. This process then iterates until an appropriate threshold is found (e.g., because sufficient convergence is seen), for each of intensity, hue, and saturation difference images.

Figure 14:
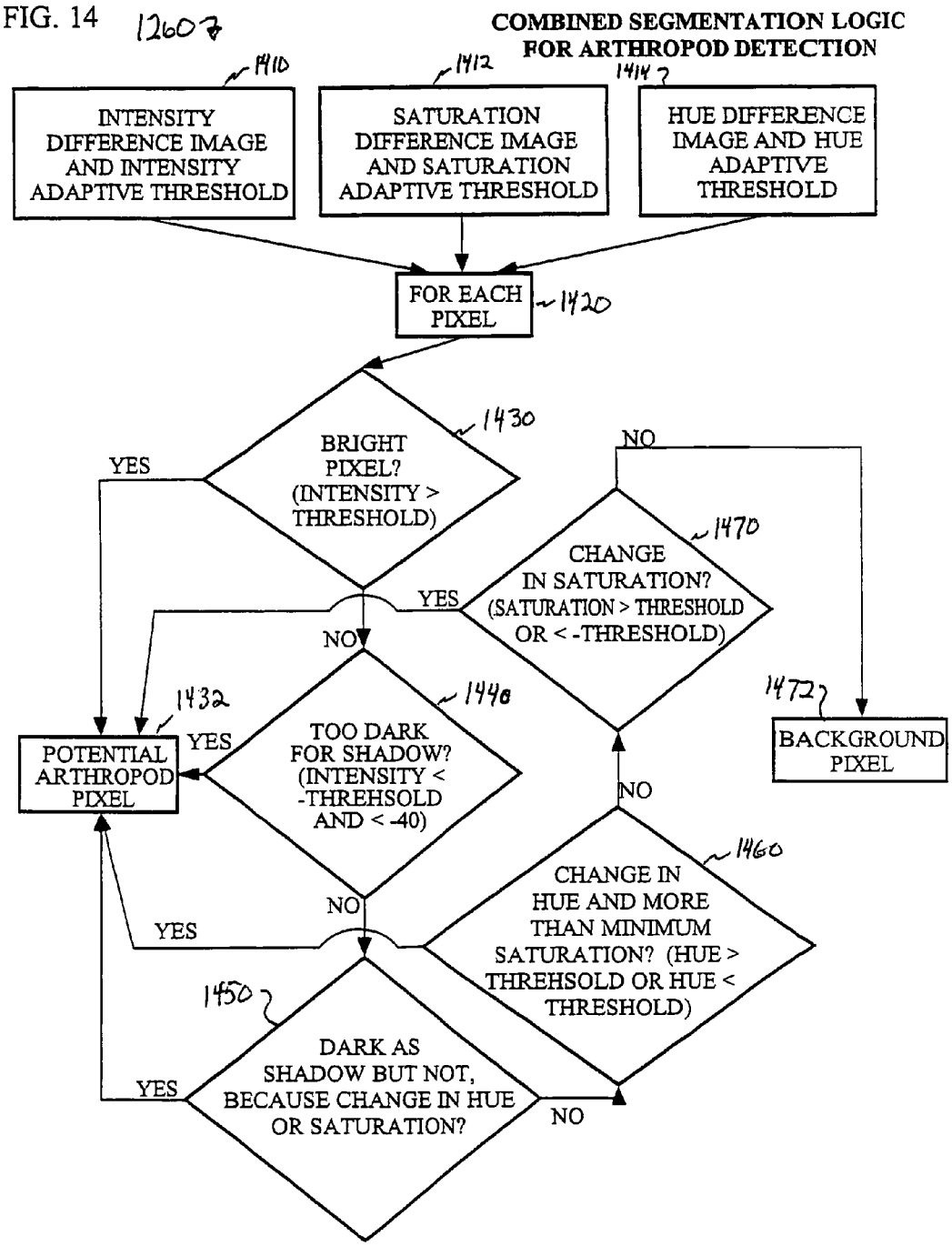
FIG. 14 is a flowchart of a method 1260 according to some embodiments of the invention.

FIG. 14 is a flowchart of a method 1260 according to some embodiments of the invention. In some embodiments, method 1260 is used for the intensity difference image with entry at block 1410, for the saturation difference image with entry at block 1412, and for the hue difference image with entry at block 1414. Block 1420 represents a common launch point for each image pixel of each type. If, at branch block 1430, the pixel is determined to be a "bright" pixel (wherein the intensity>threshold value), then at block 1432 that pixel is marked as a potential arthropod pixel (or as "not background" if other than arthropods are being examined). Else, if at block 1430, the pixel is not "bright" then if at branch block 1440, the pixel is determined to be "too dark for shadow" pixel (wherein the intensity<−threshold value and <−40), then at block 1432 that pixel is marked as a potential arthropod pixel. Else, if at block 1440, the pixel is not "too dark for shadow" then if at branch block 1450, the pixel is determined to be "dark as shadow, but not" pixel (wherein there is a change in hue or saturation), then at block 1432 that pixel is marked as a potential arthropod pixel. Else, if at block 1450, the pixel is not "dark as shadow, but not" then if at branch block 1460, the pixel is determined to have "a change in hue and more than minimum saturation" (wherein the hue>threshold value or hue<−threshold), then at block 1432 that pixel is marked as a potential arthropod pixel. Else, if at block 1460, the pixel is not "change in hue and more than minimum saturation" then if at branch block 1470, the pixel is determined to have a "change in saturation" (wherein the saturation>threshold value or saturation<−threshold), then at block 1432 that pixel is marked as a potential arthropod pixel. Else at block 1472 the pixel is marked as a "background" pixel.

Figure 15:
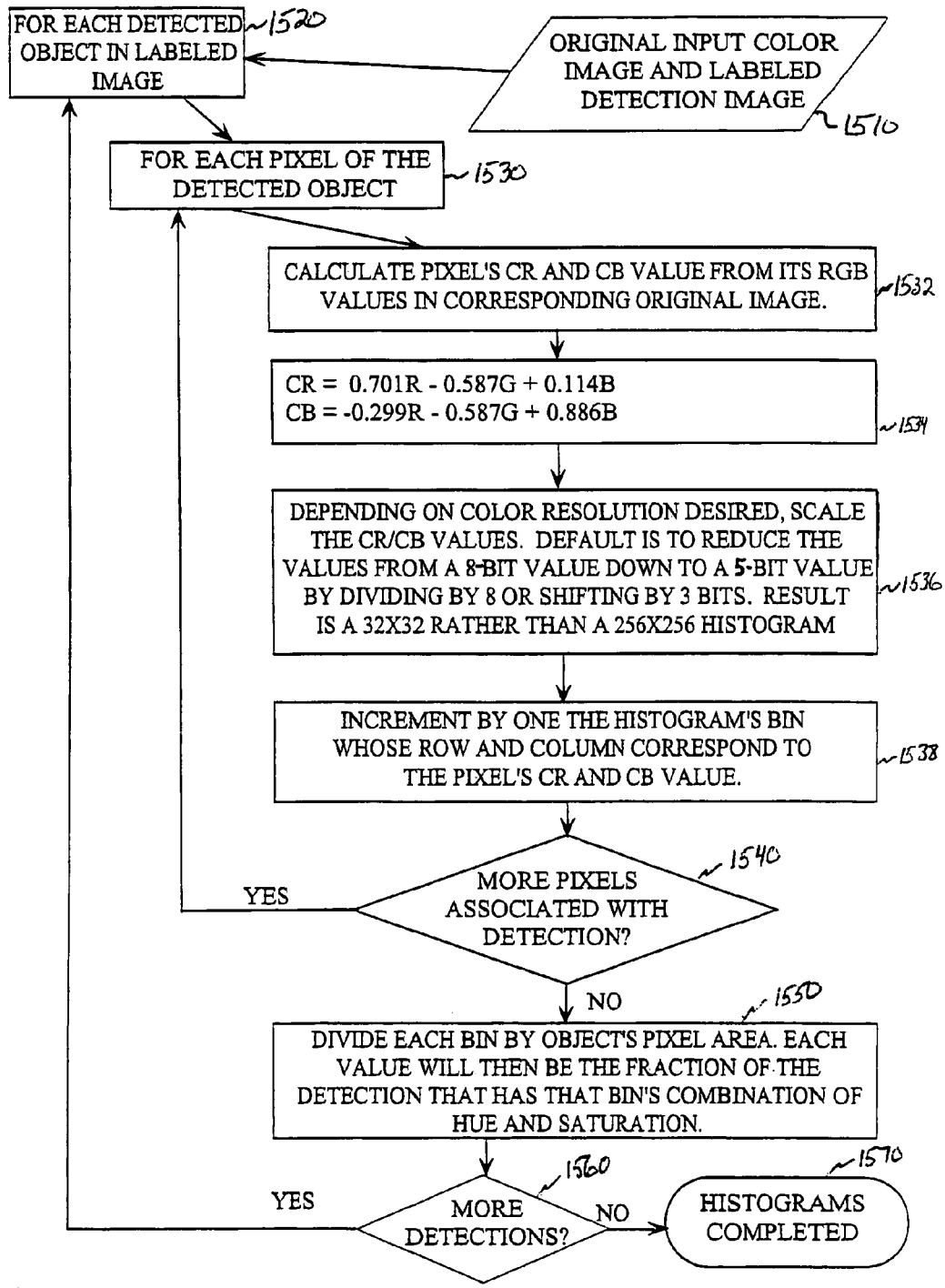
FIG. 15 is a flowchart of a method 1500 according to some embodiments of the invention.

FIG. 15 is a flowchart of a method 1500 for creation of a 2D color hue-versus-saturation histogram for arthropod or other object classification, according to some embodiments of the invention. In some embodiments, method 1500 starts at block 1510 with input of the original image (or the original as color-corrected by a method using FIG. 10A and FIG. 10B) and a labeled-detection image. At block 1520, for each detected object ("detection") in the labeled-detection image, the method passes control to block 1530; where for each pixel of the detected object the method goes to block 1532. At block 1532, some embodiments of the method include calculating the pixel's CR and CB value from its RGB values in the corresponding original image pixel using the formulae of block 1534: $CR=0.701R-0.587G+0.114B$, and $CB=-0.299R-0.587G+0.886B$. At block 1536, depending on color resolution desired, the method optionally includes scaling the CR/CB values. In some embodiments, the default is to reduce the values from an 8-bit value down to a 5-bit value by dividing by 8 (or shifting the value right by three bits to delete/ignore those three low-order bits). The result is then a 32×32 rather than a 256×256 histogram. At block 1538, some embodiments of the method include incrementing by one the histogram's bin whose row and column correspond to the pixel's CR and CB values. If at branch block 1540, there are more pixels in the detection to process, then control returns to block 1530 for the next pixel in this detection. Else, if at branch block 1540, there are no more pixels in this detection to process, then some embodiments of the method include dividing each bin of the histogram by the detection's area (by the number of pixels in this object). Each value will then be the fraction of the detection that has that bin's combination of hue and saturation. Then, if at branch block 1560, there are more detections (detected objects) in the image to process, then control returns to block 1520 for the next detection in this image. Else, at block 1570, the histograms are complete, and an identification process (such as described in FIG. 16-20) is started.

Figure 16:
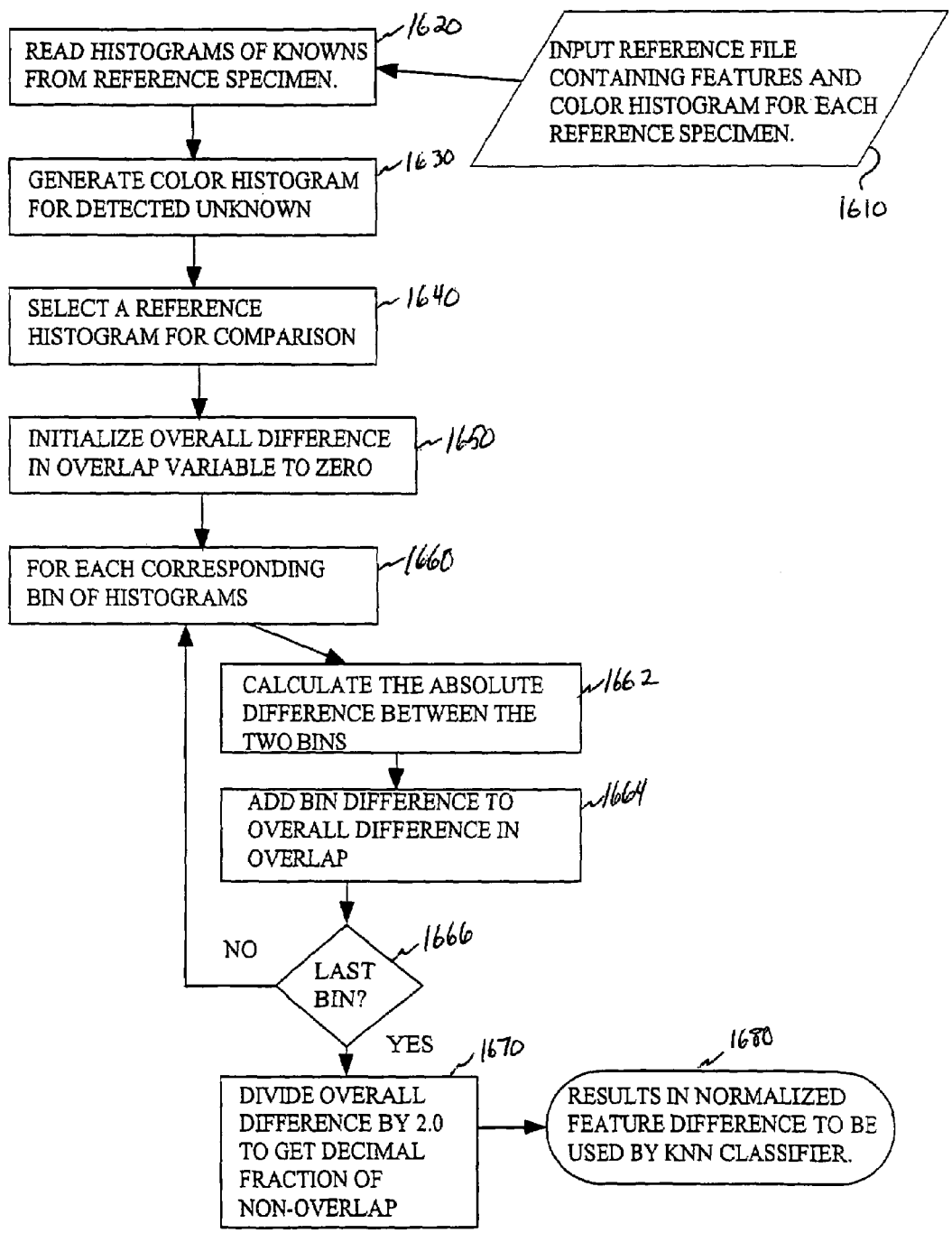
FIG. 16 is a flowchart of a method 1600 according to some embodiments of the invention.

FIG. 16 is a flowchart of a method 1600 for comparing a 2D color hue/saturation histogram for an unknown with the histogram of a reference, according to some embodiments of the invention. In some embodiments, method 1600 starts at block 1610 with input of a reference-specimen file containing features and color histogram for each reference specimen (i.e., from a database of previously analyzed and identified arthropod specimens). In some embodiments, at block 1620, the method reads histograms of the "knowns" (known specimens) from the reference-specimen file. In some embodiments, at block 1630, a color histogram of the unknown detection is generated (or, in some embodiments, is obtained as an output of method 1500 of FIG. 15). At block 1640, one of the reference histograms is selected for comparison. At block 1650, some embodiments of the method include initializing an overall difference in an overlap variable to zero. At block 1660, the method for each corresponding bin of histograms, goes to block 1662. At block 1662, some embodiments of the method include calculating the absolute difference between the two bins. At block 1664, some embodiments of the method include adding the bin difference to the overall difference in overlap. If, at block 1664, this is not the last bin, then the method goes to block 1660 to process the next bin; else at block 1670, some embodiments of the method include dividing the overall difference by 2.0 to get a decimal fraction of non-overlap. At ending block 1680, the results in the normalized feature difference are next to be used by a KNN (K-nearest-neighbor) classifier, such as described in FIG. 17, in some embodiments.

Figure 17:
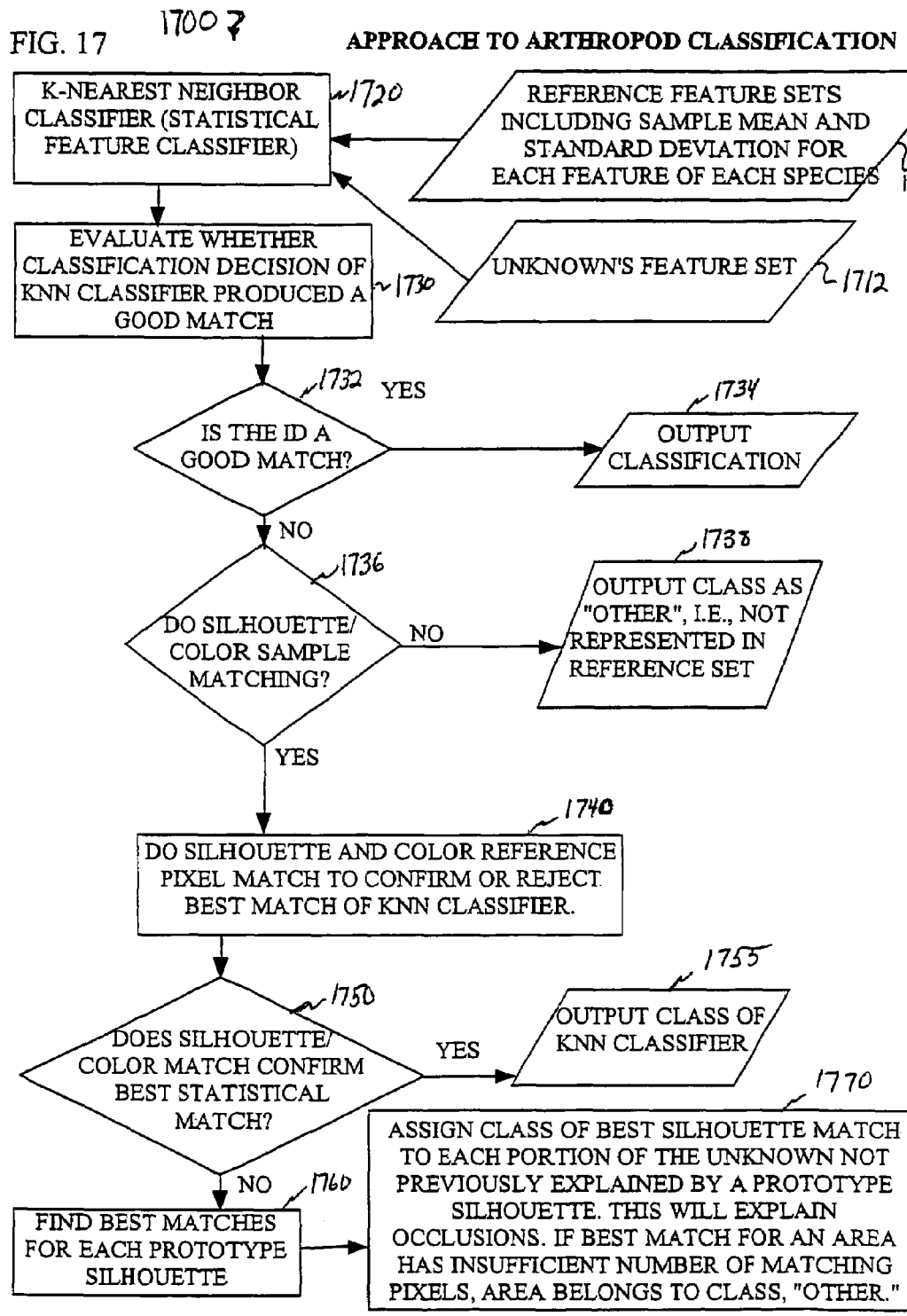
FIG. 17 is a flowchart of a method 1700 according to some embodiments of the invention.

FIG. 17 is a flowchart of a method 1700 having a K-nearest-neighbor classifier (statistical-feature classifier) approach to arthropod classification, according to some embodiments of the invention. Block 1710 represents the input of one or more reference feature sets, including, in some embodiments, a sample mean and standard deviation for each feature of each species, and block 1712 represents the input of the unknown's feature set, these inputs going to the starting point of block 1720. At block 1730, some embodiments of the method include evaluating whether a classification decision of KNN classifier produced a good match. If, at block 1732, this is a good match, then at block 1734, this classification is output or stored in a database of generated identifications or classifications. Else, from branch block 1736 if the method is not to do silhouette/color sample matching, then at block 1738, an output or database entry of "other" classification is indicated, i.e., the unknown is indicated as not represented in reference set. Else, at block 1740, a determination is made of whether the silhouette and color-reference pixel(s) match (e.g., in some embodiments, as in FIG. 20 described below), in order to confirm or reject the best match of the KNN classifier. At branch block 1750, if the silhouette/color match does confirm the best statistical match, then at block 1755, some embodiments of the method include outputting identification or class of the KNN classifier (or storing it into a database); else the match is not confirmed, and at block 1760, some embodiments of the method include finding the best matches for each prototype silhouette. Then, at block 1770, some embodiments of the method include assigning the class of the best silhouette match to each portion of the unknown not previously explained by a prototype silhouette. This will explain occlusions. If the best match for an area has an insufficient number of matching pixels, then that area belongs to the class "other."

Figure 18:
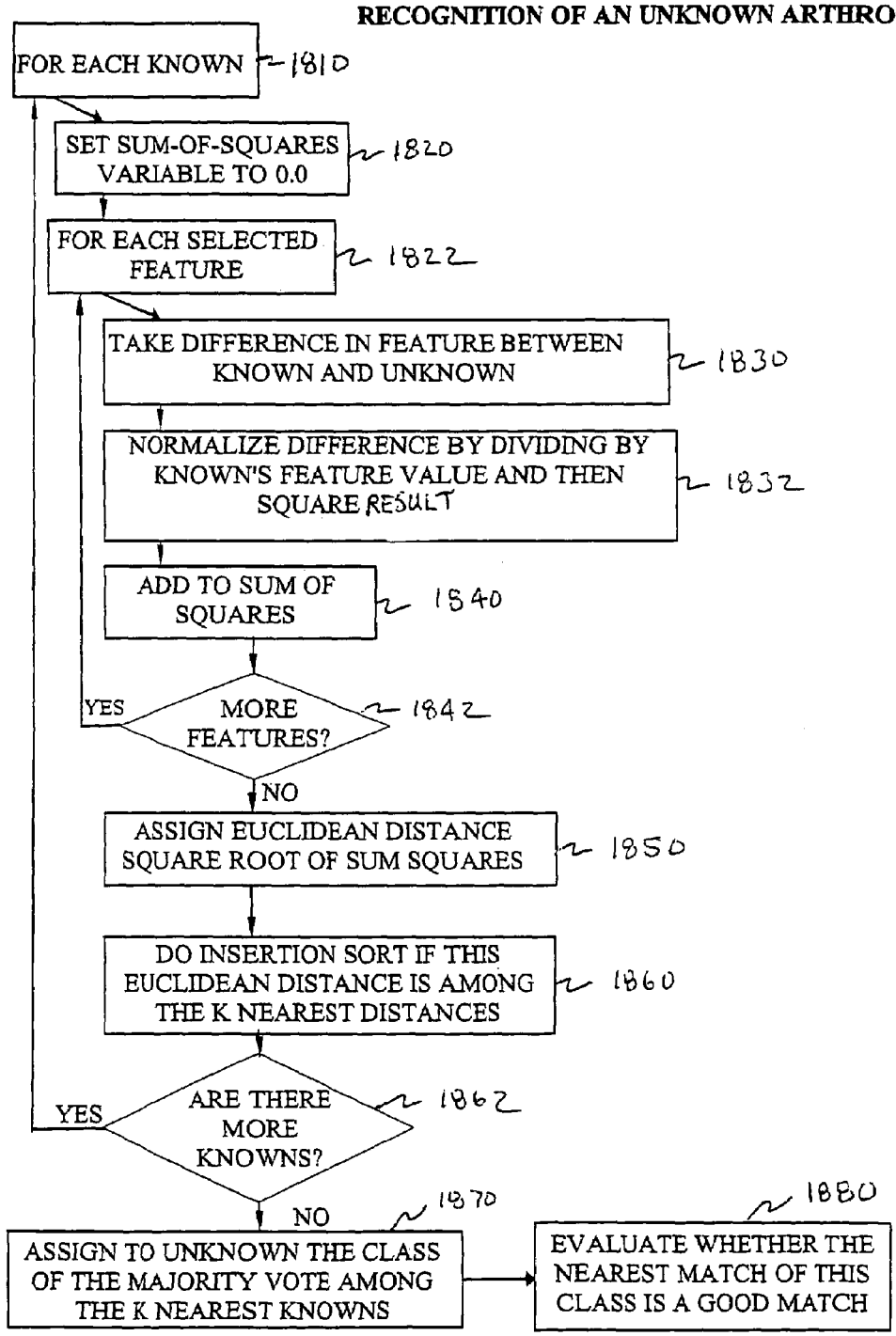
FIG. 18 is a flowchart of a method 1800 according to some embodiments of the invention.

FIG. 18 is a flowchart of a method 1800 providing a modified KNN classifier for arthropod identification, according to some embodiments of the invention. In some embodiments, method 1800 starts at block 1810 for each known of one or more reference feature sets. At block 1820, some embodiments of the method include setting a sum-of-squares variable to zero and goes to block 1822. From block 1822 for each selected feature, the method goes to block 1830. At block 1830, some embodiments of the method include taking a difference between the feature of the known and the feature of the unknown. At block 1832, some embodiments of the method include normalizing the difference by dividing the difference by the known's feature value and then squaring the quotient. At block 1840, some embodiments of the method include adding the result to a sum-of-squares variable. If from block 1842 there are more features, the method returns to block 1822; else the method goes to block 1850. At block 1850, some embodiments of the method include assigning a Euclidean distance for this feature as the square root of the sum of squares. At block 1860, if this Euclidean distance is among the K nearest distances, then some embodiments of the method include performing an insertion sort of this Euclidean distance into the list of the nearest Euclidean distances. If at branch block 1862, there are more knowns, then the method returns to block 1810; else at block 1870, some embodiments of the method include assigning the classification of the majority vote among the K nearest knowns to the unknown. At block 1880, some embodiments of the method include evaluating whether the nearest match of this class is a good match as describe below for FIG. 19, (and/or assigns a confidence factor to the match).

Figure 19:
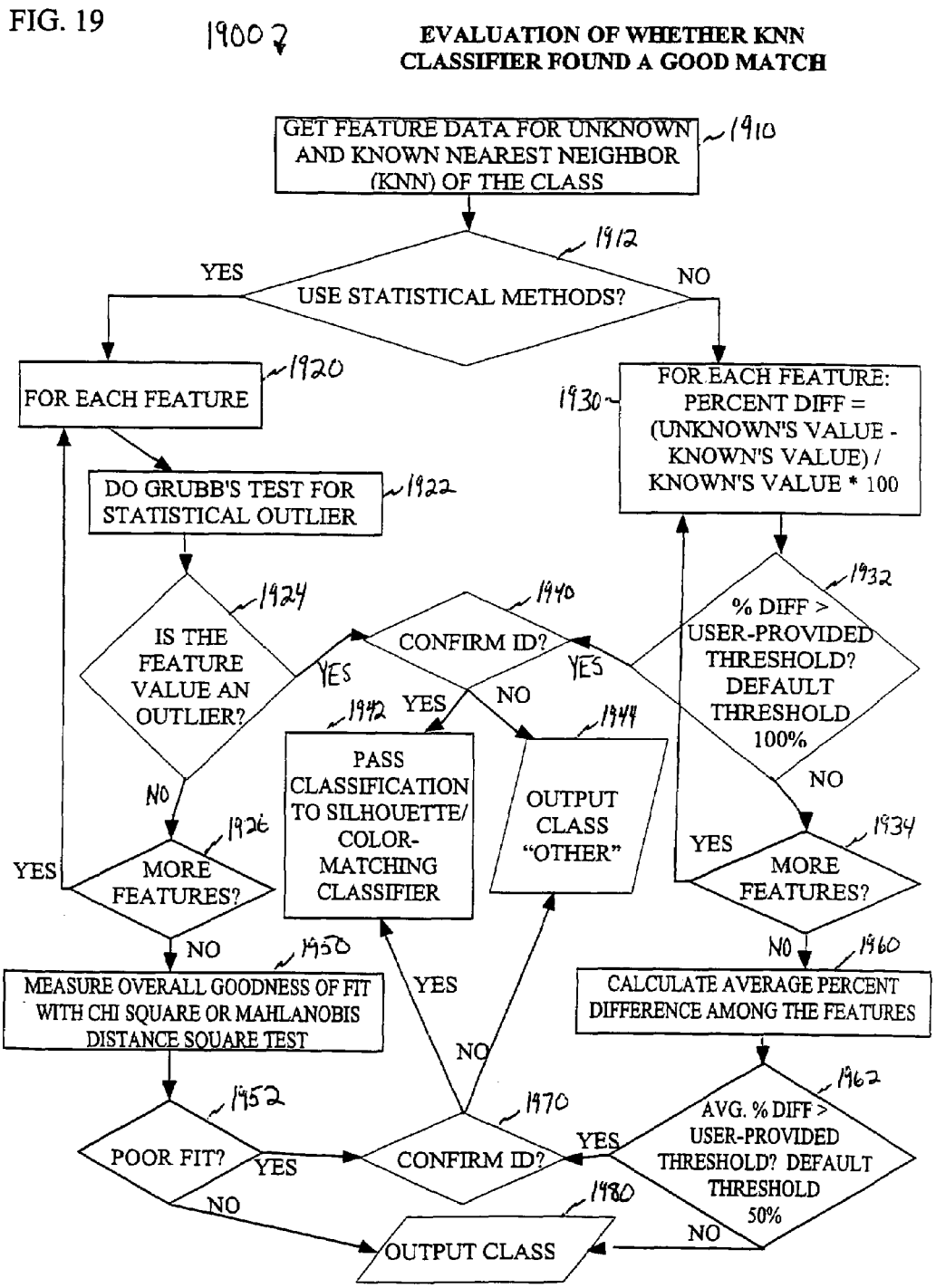
FIG. 19 is a flowchart of a method 1900 according to some embodiments of the invention.

FIG. 19 is a flowchart of a method 1900 that provides an evaluation of whether KNN classifier found a good match, according to some embodiments of the invention. At block 1910, some embodiments of the method include getting the feature data for the unknown and the known nearest neighbor (KNN) of the classification. At branch block 1912, if the method is to use statistical methods, control goes to block 1920; else control goes to block 1930. From block 1920, for each feature, the method goes to block 1922. At block 1922, some embodiments of the method include performing a Grubbs' test for a statistical outlier (Grubbs' test calculates a ratio called Z, where Z is equal to the difference between the unknown's feature value and the mean value of the reference specimens of the class that best matches the unknown, divided by the standard deviation among the reference specimens of the best matching class. The mean and standard deviation also include the unknown. If Z exceeds a critical value for a given confidence level, the decision of the 1NN classifier can be rejected.). At branch block 1924, if the feature value is an outlier, then control passes to block 1940; else control passes to branch block 1926, where if more features are to be examined, control returns to block 1920. Else, if there are no more features, control passes to block 1950 and some embodiments of the method include measuring overall "goodness of fit" with a chi-squared test or other additional multivariate outlier test such as the Mahlanobis distance-squared test. Then, at branch block 1952, if the fit is good, control passes to block 1980 and some embodiments of the method include outputting the classification; but if the fit is poor, then control passes to block 1970. At branch block 1970 (and at branch block 1940), if the identification needs to be confirmed, then control passes to block 1942, and some embodiments of the method include passing the classification to the silhouette/color-matching classifier of FIG. 20; else the method passes control to block 1944 and some embodiments of the method include outputting a classification of "other."

If, from block 1912, it is decided not to use statistical methods, control passes to block 1930. At block 1930, for each feature, some embodiments of the method include calculating a percentage difference as ((unknown's value−known's value)*100/known's value) and control passes to block 1932. At branch block 1932, if the percentage difference exceeds a user-provided threshold (where the default threshold is 100%), then control passes to block 1940 described above; else control passes to branch block 1934, where if more features are to be examined, control returns to block 1930. Else, if there are no more features, control passes to block 1960 and the method calculates an average percent difference among the features and control passes to block 1962. Then, at branch block 1962, if the fit is good, control passes to block 1980 and the classification is output; but if the fit is poor, then control passes to block 1970 described above.

Figure 20:
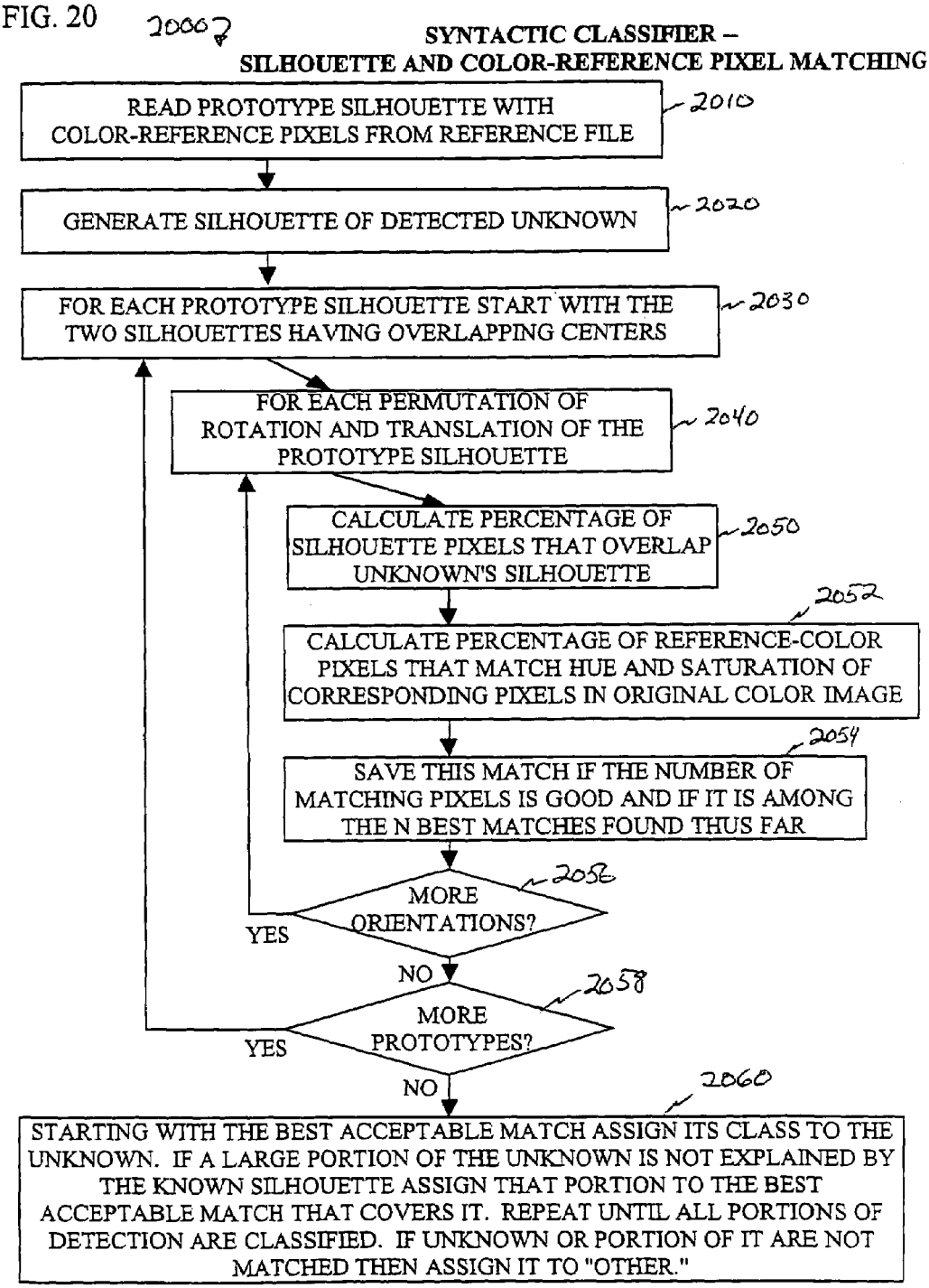
FIG. 20 is a flowchart of a method 2000 according to some embodiments of the invention.

FIG. 20 is a flowchart of a syntactic classifier method 2000 that provides silhouette and/or color-reference-pixel matching according to some embodiments of the invention. In some embodiments, silhouette matching finds a "center-of-mass" point of the unknown silhouette that is then placed in the position of the "center-of-mass" point of the reference silhouette. The unknown silhouette is then matched to the reference, rotating (e.g., using a linear transform) incrementally between each matching operation (and optionally translating the center-of-mass point) until the orientations of the unknown silhouette and the reference silhouette most closely match. In some embodiments, color-reference-pixel matching then takes a known starting point (e.g., a point at the head of the arthropod) and examines a pixel at a predetermined X and Y offset (or equivalently at a predetermined angle and distance) to check for a match of the hue and/or saturation of that pixel or area on the unknown to the hue/saturation of the corresponding pixel or area of the reference image (i.e., in some embodiments, the reference database stores characteristic "spotprints" of the reference images, wherein at each pixel of a characteristic set of one or more given X and Y offsets, arthropods can be distinguished by the hue and saturation found there). Thus, rather than matching the entire color pattern, a relatively small subset of important or distinguishing offsets, hues, and saturations are matched. Some embodiments combine the matching of silhouette and of hue/saturation spots after each rotation and/or translation of the unknown silhouette (or equivalently, in other embodiments, the prototype silhouette is rotated).

In some embodiments of method 2000, block 2010 includes reading from a reference file a set of one or more reference "spotprints" (each spotprint having a prototype silhouette and a set of characteristic color-reference pixels (CRP), e.g., in some embodiments, each CRP specifying X offset, Y offset, hue, and saturation). At block 2020, the method generates a silhouette of the detected unknown object ("detection"). From block 2030, for each prototype silhouette, the method starts by translating the silhouette of the unknown detection so the center of the detection silhouette overlaps the center of the prototype silhouette and passes control to block 2040. For each permutation of rotation and translation of the prototype silhouette, at block 2040, the method passes control to block 2050. At block 2050, some embodiments of the method include calculating percentage of silhouette pixels that overlap (in some embodiments, to within some given tolerance) the unknown's silhouette and control is passed to block 2052. At block 2052, some embodiments of the method include calculating percentage of reference-color pixels that match hue and saturation of corresponding pixels in original color image and control is passed to block 2054. At block 2054, some embodiments of the method include saving this match if the number of matching pixels is good and if it is among the n best matches found thus far and control is passed to block 2056. At branch block 2056, if more orientations are to be tested, then control returns to block 2040; else control passes to block 2058. At branch block 2058, if more prototype silhouettes are to be tested, then control returns to block 2030; else control passes to block 2060. At block 2060, starting with the best acceptable match, some embodiments of the method include assigning the class of that best match to the unknown. If a large portion of the unknown is not explained by the known silhouette, some embodiments of the method include assigning that portion to the best acceptable match that covers it. Some embodiments repeat block 2060 until all portions of detection are classified. If the unknown or portions of it are not matched then some embodiments of the method include assigning that unknown or portion thereof to classification "other."

Figure 21:
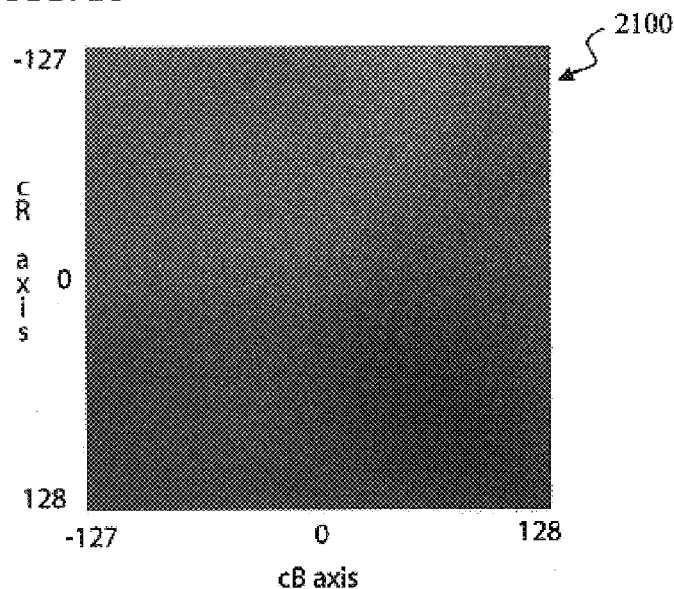
FIG. 21 shows a portion of YCbCr space.

FIG. 21 shows a portion of YCbCr space where the luminosity, Y, is kept at a constant gray level of 128 across the entire space. The x-axis or columns represent the Cb axis where values range from −127 on the left most portion of the image to 128 on the right side of the image (as labeled). The y-axis or rows represent the Cr axis where the values range from −127 at the top of the image to 128 at the bottom of the image. Note that the hue changes as an angle around the center or origin (0,0) of the YCbCr color space and the color becomes more saturated the further you are from the center or origin of the YCbCr color space. The central pixel of the image or origin of the YCbCr color space is a point with no hue or saturation and if it were large enough to see it would appear as a gray spot with an intensity value of Y, which in this case is a value of 128.

Figure 22:
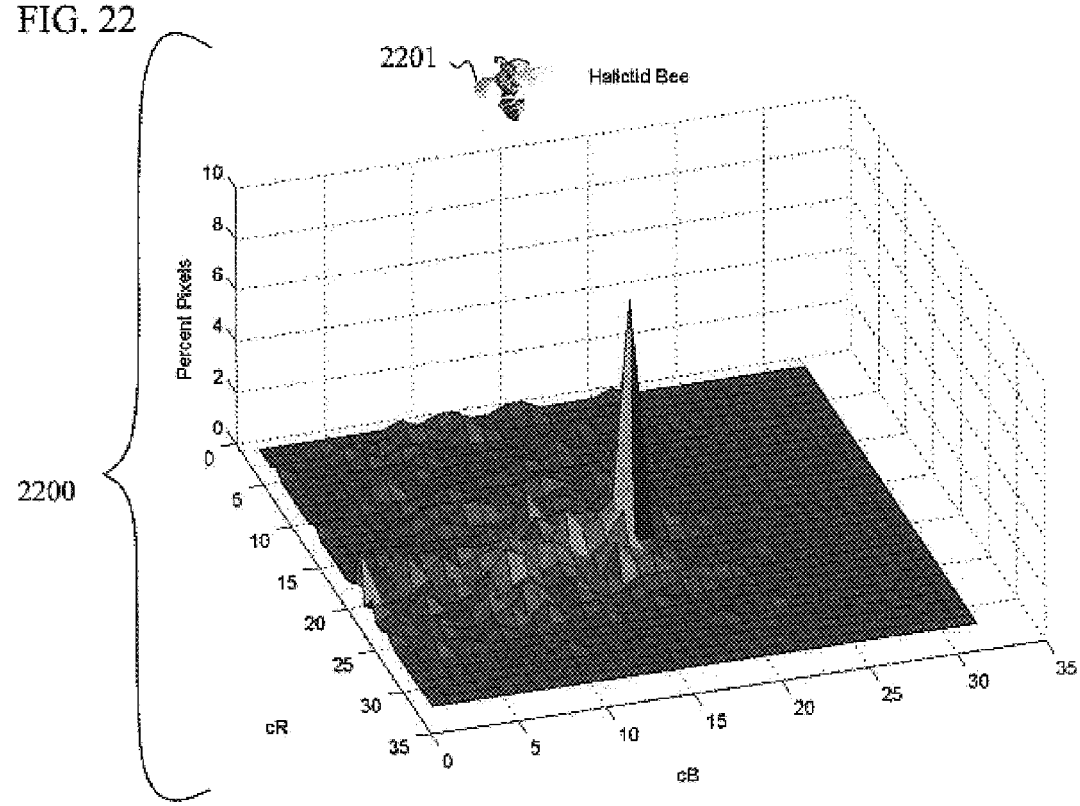
FIG. 22 shows 2D hue/color saturation histogram for a halictid bee.

FIG. 22 shows 2D hue/color saturation histogram for a halictid bee. The image of the bee from which the data is derived appears in the upper portion of this figure. Note that the peak in the center of the Cb/Cr histogram corresponds to very low color saturation, which in this case, are the black stripes on the bee's abdomen and the darker areas along the edge of the thorax and head. The ridge or peaks radiating out from the central peak (heading left from the center of the surface), which is parallel to the Cb axis and is approximately between the Cr values of 15 and 22, represents the yellow stripes of the abdomen and what is visible of the yellow legs. The metallic green color of the head and thorax is represented by the scattered smaller peaks that lie in the region that is less than 20 Cb and less than 15 Cr (upper left hand quarter of the matrix). The further the region is from the center of the space, the more saturated the color. For example, the ridge representing yellow indicates that a portion of it near the central peak is a very light yellow (lots of white, nearly white) while the area near the left edge of the histogram represents the brighter yellow colors. The bee from which this image was generated was also used for one of our demonstrations and also is the left-most bee in the dorsal training image of FIG. 26.

Figure 23:
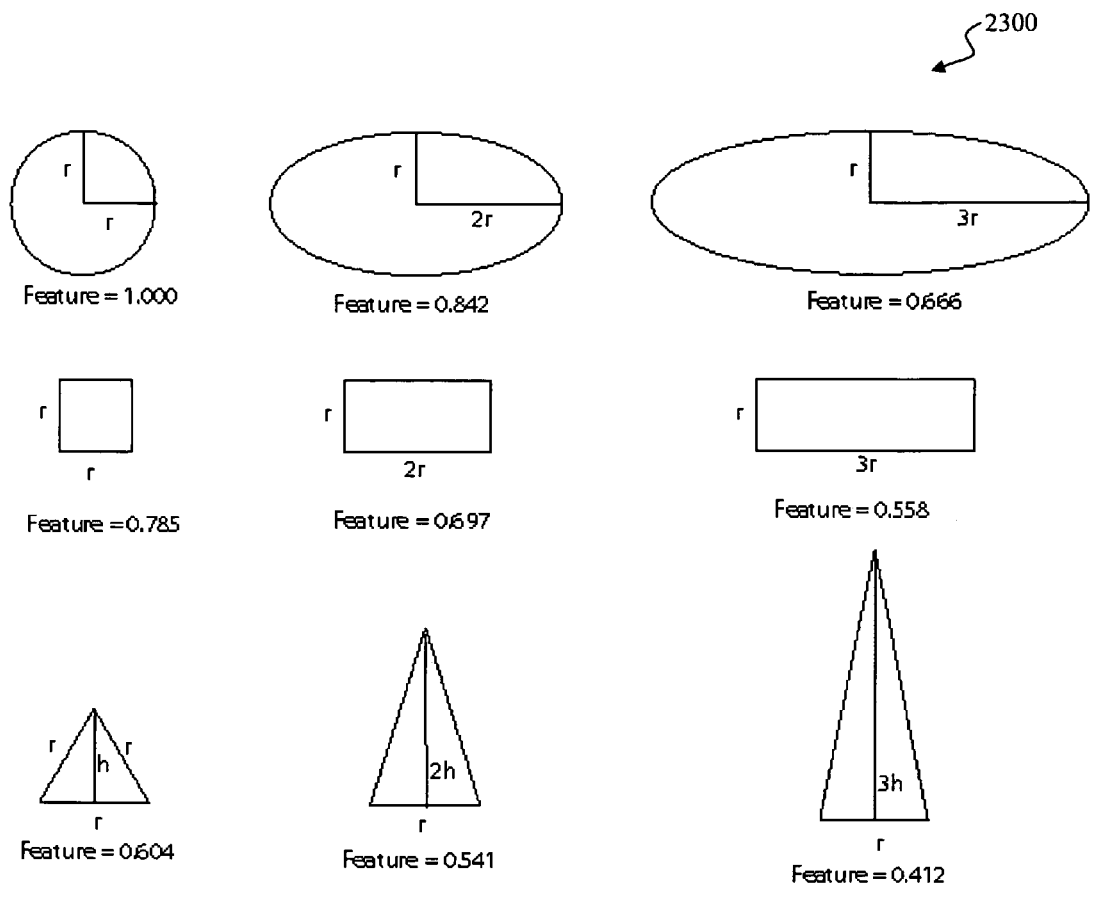
FIG. 23 shows values of the circular fit/compactness feature for three classes of geometric shapes.

FIG. 23 shows values of the circular fit/compactness feature for three classes of geometric shapes. Note that the metric decreases as the shape becomes less circular (down the columns) or less compact by elongating or stretching the shape (across the rows).

Figure 24:
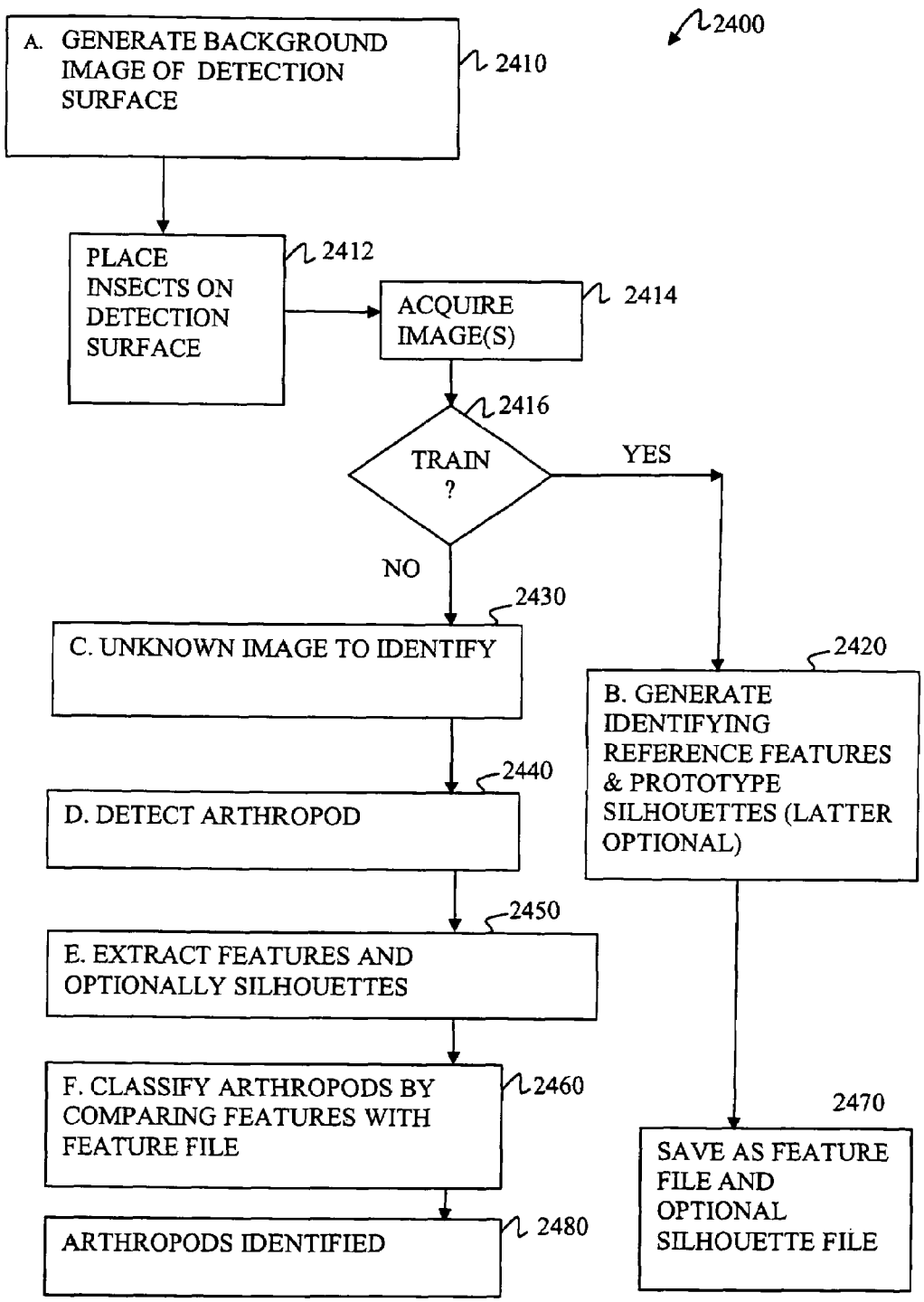
FIG. 24 shows a flowchart 2400 of the general description of the operation of the system.

FIG. 24 shows a flowchart of the general description of a method of operation 2400 of some embodiments the system. At block 2410, some embodiments of the invention include generating a background image of a detection surface (e.g., by obtaining an initial or earlier image of the actual collection surface, or by generating a synthetic image based on a specification or assumption of what the background image should be, for example, when using a standardized, pre-printed background). At block 2412, some embodiments of the invention include placing insects or other arthropods (or other objects to be identified) on the collection surface (e.g., by using a sticky surface and attracting the arthropods to the surface where they land and become stuck, or by using a net or other collection mechanism to catch the arthropods, then immobilizing the arthropods and placing them on a scanner surface). At block

2414, some embodiments of the invention include acquiring one or more images. If at branch block 2416, it is desired to perform a training operation, control is passed to block 2420; else control is passed to block 2430. At block 2420, some embodiments of the invention include generating characteristic or identifying features and/or silhouettes of the objects (for example, in some embodiments, these objects include arthropods that have been pre-identified or classified by an expert entomologist), and control is passed to block 2470. At block 2470, some embodiments of the invention include saving the data regarding the pre-identified objects into a feature file and optionally into a silhouette file. If at branch block 2416, it was desired to perform an identification-of-unknown(s) operation, control was passed to block 2430. At block 2430, some embodiments of the invention include analyzing the unknown image and passing control to block 2440. At block 2440, some embodiments of the invention include detecting an object (e.g., the unknown arthropod to be identified) and passing control to block 2450. At block 2450, some embodiments of the invention include extracting features and optionally the silhouette of the unknown object (e.g., arthropod) and passing control to block 2460. At block 2460, some embodiments of the invention include classifying the unknown arthropod by comparing its features with reference data from the feature file generated in an earlier training operation (block 2420) and passing control to block 2480. At block 2460, some embodiments of the invention also include saving information as to the unknown (e.g., its place and time of collection, the silhouette and/or color-reference pixels, the classification that was determined, etc.) into a classified-unknown-arthropods section of a results file and then passing control to block 2480. At block 2480, the arthropod classification or identification have been made, and some embodiments of the invention include outputting or transmitting a report (e.g., to governmental or commercial organizations, or to the user who requested the identification service).

FIG. 25 and FIG. 26 show two images used for generating the identifying reference features. ScanDorsalTraining.bmp (FIG. 25) has the dorsal view of eleven insects while ScanVentralTraining.bmp (FIG. 26) has the ventral view of the same eleven individuals. The top row has two flies of a syrphid species with yellow longitudinal stripes on its thorax; the second row has two asparagus beetles and a second species of syrphid fly; the third row has three halictid bees; the fourth row contains a blow fly; and the bottom row has two multicolored Asiatic Ladybird beetles.

FIG. 27A and FIG. 27B show two test images of the same ten insect individuals. ScanDorsalTest.bmp (FIG. 27A) contains the test insects with their dorsal side exposed to the scanner while ScanVentralTest.bmp—(FIG. 27B) has the ventral view of the insects. The top row includes two syrphid flies of the species with a yellow stripped thorax. The second row has a halictid bee and a second species of syrphid fly (right). The third row contains a blow fly (left) and a halictid bee (right). The fourth row has two multicolored Asiatic ladybird beetles. Bottom row includes two asparagus beetles.

FIG. 28A and FIG. 28B show the test case containing dorsal views of ten garden insects (FIG. 28A, as in FIG. 27A) and the successful detection and recognition of these insects (FIG. 28B). A portion of the abdomen of the top left most insect, a syrphid fly, was detected as a separate object, as was a portion of the right wing of the syrphid fly colored in blue. These two detections were rejected during connected components analysis as too small. Objects were rejected if they were less than half the area of our smallest reference specimen, the asparagus beetle.

FIG. 29A and FIG. 29B show the test case containing ventral views of ten garden insects (FIG. 29A, as in FIG. 27B) and the successful detection and recognition of these insects (FIG. 29B).

FIG. 30A and FIG. 30B show a test image of insects in clutter (FIG. 30A) and the output results image with the correct detection and identification of the objects (FIG. 30B). The plant material has been automatically labeled red to indicate it belongs to the class of objects that are not of interest, and which is called OTHER. Note that the syrphid fly at the top of the image is missing its abdomen and the asparagus beetle at the bottom of the image has lost its head and thorax.

FIG. 31 shows an image that simulates a snapshot from a previous sampling period. It will be used as a background image to compare with a more recently collected sample image. The image contains an asparagus beetle (top), a multicolored Asiatic ladybird beetle (middle) and a green ash seed (bottom).

Figure 32A:
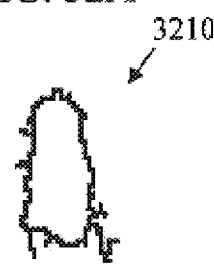
FIG. 32A is an image of the syrphid fly species with a striped thorax.
Figure 32B:
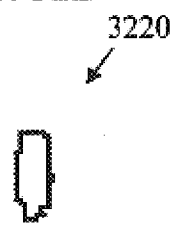
FIG. 32B is an image of an asparagus beetle.
Figure 32C:
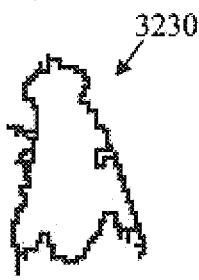
FIG. 32C is an image of a second species of syrphid fly with no stripes on the thorax.
Figure 32D:
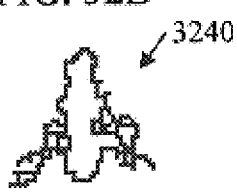
FIG. 32D is an image of a halictid bee.
Figure 32E:
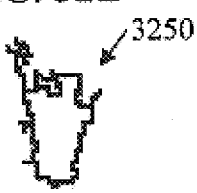
FIG. 32E is an image of a blow fly.
Figure 32F:
FIG. 32F is an image of a multicolored Asiatic ladybird beetle.

FIG. 32A-32F show prototype silhouettes for garden insects. FIG. 32A shows the syrphid fly species with a striped thorax, FIG. 32B shows an asparagus beetle and FIG. 32C shows a second species of syrphid fly with no stripes on the thorax. FIG. 32D shows a halictid bee, FIG. 32E shows a blow fly and FIG. 32F shows a multicolored Asiatic ladybird beetle.

Figure 33:
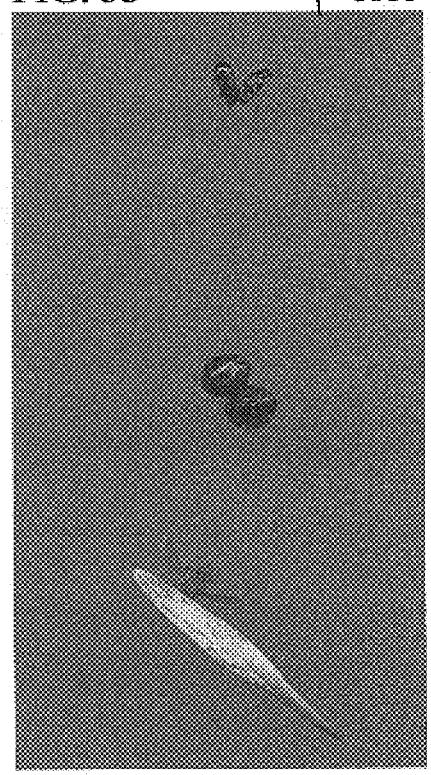
FIG. 33 is a test image of insects being overlapped by other insects or clutter.

FIG. 33 shows a test image of insects being overlapped by other insects or clutter called Occ2A.bmp. Two asparagus beetles are abutting one another (top) while two multicolored Asiatic ladybird beetles touch one another in the middle of the image. Approximately half of a halictid bee is occluded by an ash seed (bottom).

Figure 34:
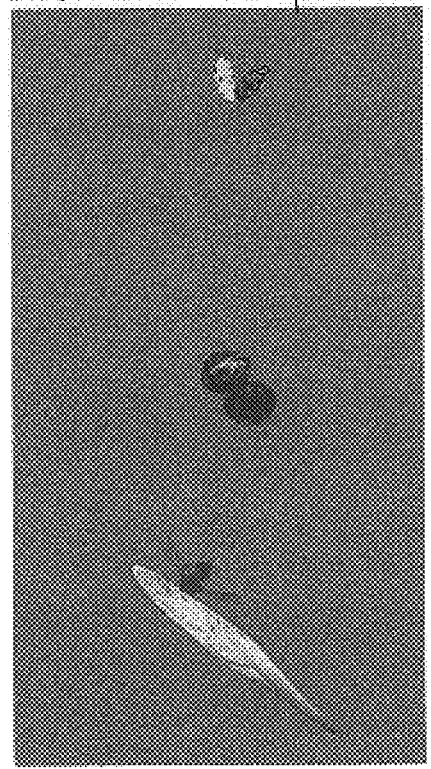
FIG. 34 is an image after successful detection and classification in the case of occlusion.

FIG. 34—Successful detection and classification in the case of occlusion when the object doing the occluding can be subtracted from the current image by taking the difference between the current image and a previous image that contains the occluding object. The second asparagus beetle (top left), the second ladybug (lower middle) and the halictid bee (bottom) were detected and correctly identified by the nearest neighbor classifier. The identification of the halictid bee was also confirmed by the silhouette matching routine.

Figure 35A:
FIG. 35A is the silhouette of the occluded bee.
Figure 35B:
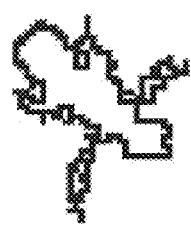
FIG. 35B shows the silhouette of the halictid bee prototype.
Figure 35C:
FIG. 35C shows an occluded halictid bee's silhouette matched best with a prototype silhouette of a halictid bee.

FIGS. 35A-35C show silhouette matching. The occluded halictid bee's silhouette matched best with a prototype silhouette of a halictid bee as shown in FIG. 35C. The silhouette of the known is colored blue while the unknown's silhouette is red. Where they overlap the pixels should appear purplish. The image of FIG. 35A the left is the silhouette of the occluded bee, while the silhouette of the halictid bee prototype is presented in FIG. 35B.

Figure 36:
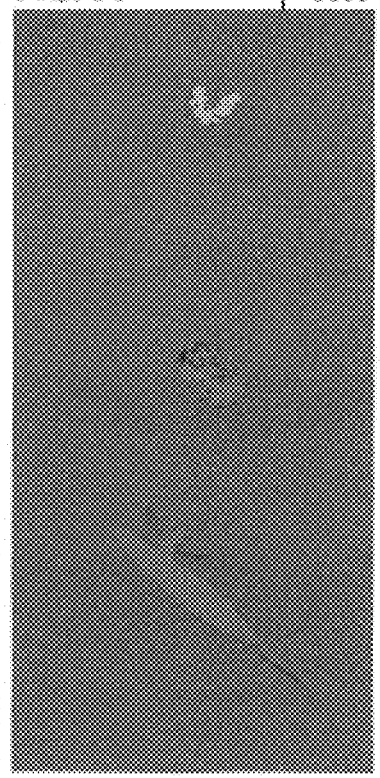
FIG. 36 is an image showing color coding of best matches for three cases of occlusion.

FIG. 36 shows color coding of the best matches for three cases of occlusion when there was no background image with information about previously collected insects. In this case the BugClassify program estimated the background image. The color coding indicates that according to the nearest neighbor classifier the pair of asparagus beetles (at the top) best matched a blow fly while the pair of ladybug beetles (in the middle) and the ash seed with a halictid bee (at the bottom) matched the syrphid fly species with the striped thorax. However, the matching metric of the nearest neighbor classifier indicated that none of these matches were good matches.

Figure 37A:
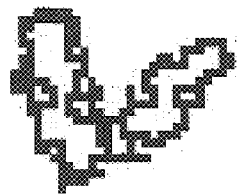
FIG. 37A shows silhouette matching results for occlusion of two asparagus beetles.
Figure 37B:
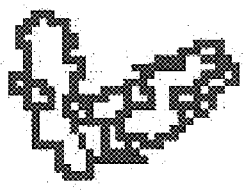
FIG. 37B shows silhouette matching results for occlusion of two asparagus beetles.
Figure 37C:
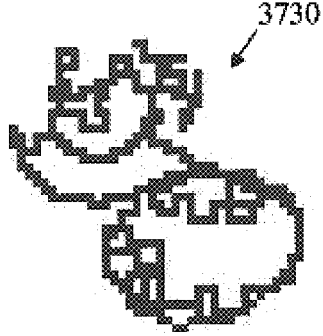
FIG. 37C shows silhouette matching results for occlusion of two ladybird beetles.
Figure 37D:
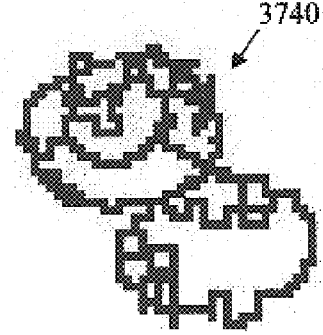
FIG. 37D shows silhouette matching results for occlusion of two ladybird beetles.
Figure 37E:
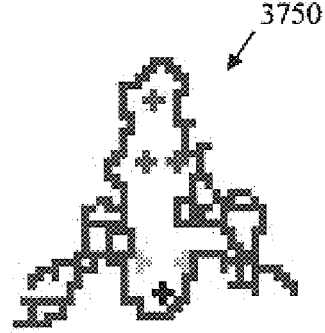
FIG. 37E shows prototype silhouette and spotprints for a halictid bee.
Figure 37F:
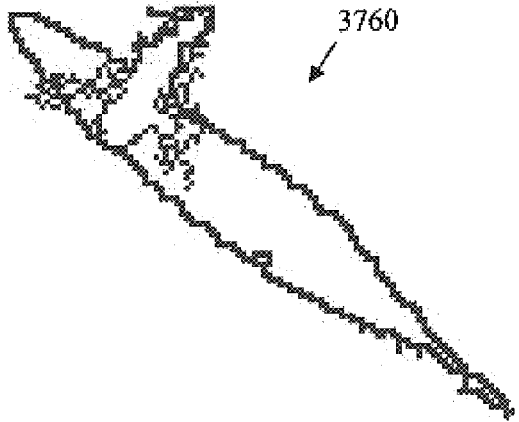
FIG. 37F shows silhouette matching results for a halictid bee occluded by an ash seed.

FIGS. 37A-37F show silhouette matching results for three cases of occlusion. Each row represents the results of a different pair of occluded objects: two asparagus beetles (FIGS. 37A-37B on the top row), two ladybird beetles (FIGS. 37C-37D on the middle row), and a halictid bee occluded by an ash seed (FIGS. 37E-37F on the bottom row). In the case of the beetles, silhouette matching detected and identified each one.

The best match among each pair of beetles is shown by the image on the left while the second beetle was the next best match (image on the right). For the case of the occluded halictid bee (FIGS. 37E-37F on the bottom row) the prototype silhouette and representations of the additional sample pixels for color are displayed on the lower left image (FIG. 37E, which shows a prototype silhouette (shown in blue) and spotprints (the green and black crosses and the yellow sideways Ts) for a halictid bee). These reference sample colors indicate green on the head and thorax and the yellow and black stripes of the abdomen. The best overall silhouette match (including the color match) for the bee is shown in the lower right image (FIG. 37F).

Figure 38A:
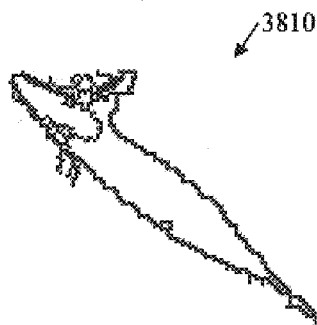
FIG. 38A shows a spurious correlation of the silhouette matches for the occluded bee.
Figure 38B:
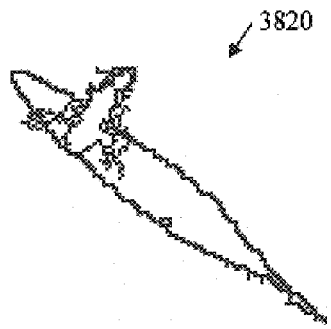
FIG. 38B shows the correct correlation of the silhouette matches for the occluded bee.
Figure 38C:
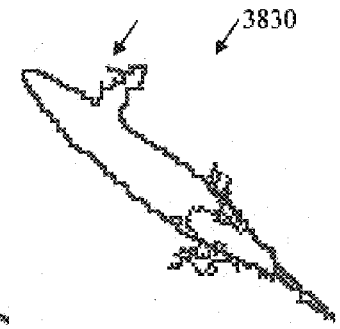
FIG. 38C shows a spurious correlation of the silhouette matches for the occluded bee.

FIGS. 38A-38C show three of the best silhouette matches for the occluded bee. In all three cases the prototype silhouette was a halictid bee. The spurious correlations of the images FIG. 38C on the right and FIG. 38A on the left were actually slightly better than the correct match (FIG. 38B, the middle image) in terms of the number of silhouette pixels that were matched. However, the correct match was better overall because three of the six color pixels matched the original image's color, while those of the other two correlations did not match the color of the seed and were rejected.

Figure 39:
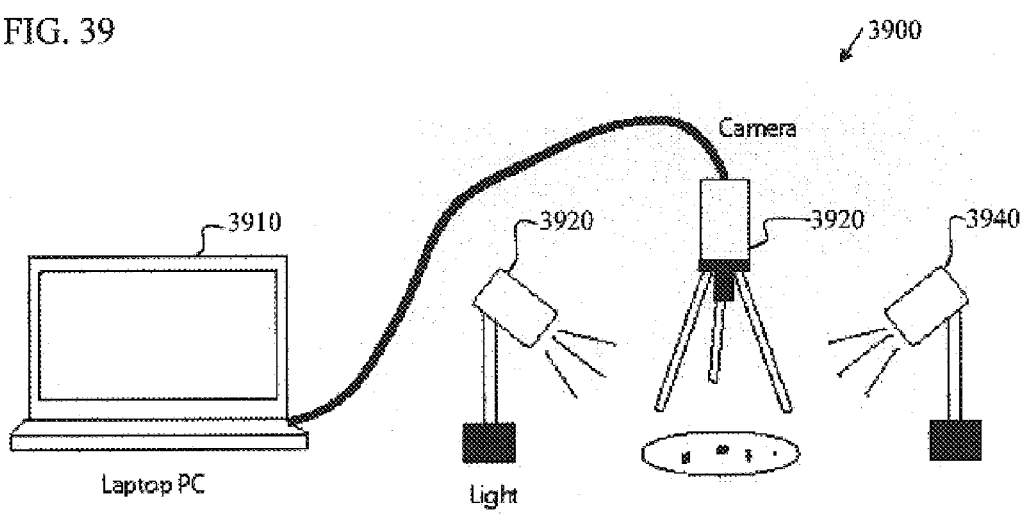
FIG. 39 shows equipment setup used in some embodiments for testing.

FIG. 39 shows equipment setup used in some embodiments for testing the concept of automated detection and identification of arthropods using a digital color camera as part of the system.

Figure 40:
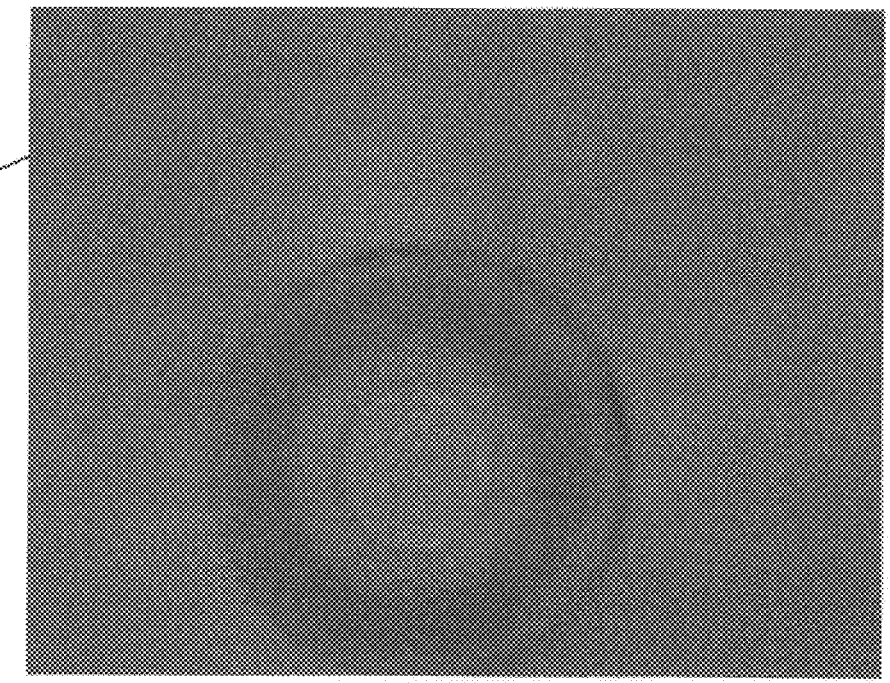
FIG. 40 shows a detection surface before weevils are "collected" or placed.

FIG. 40 is an image of a detection surface before weevils are "collected" or placed for identification on it.

Figure 41:
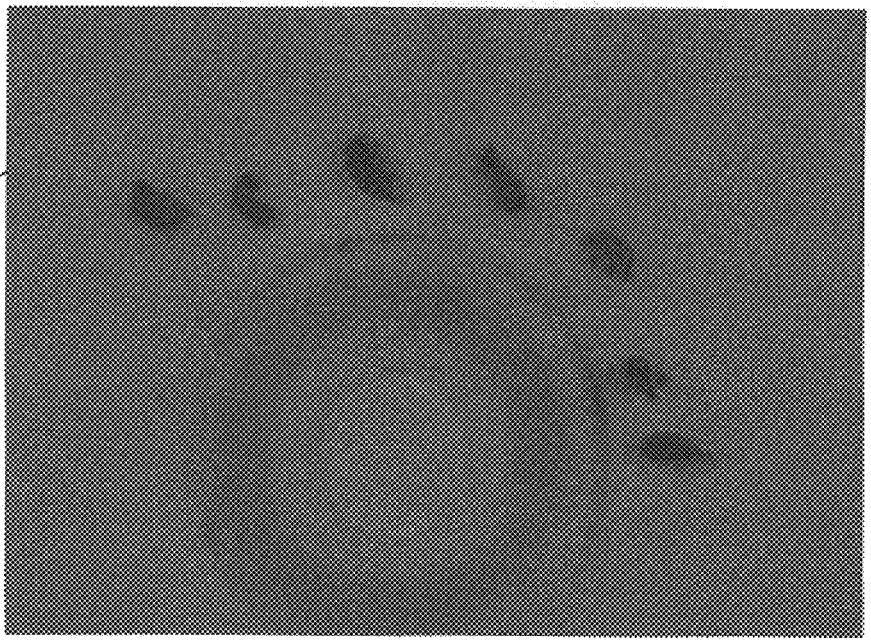
FIG. 41 shows an image of seven boll weevils used for training the classifier.

FIG. 41 is an image of seven boll weevils used for training the classifier. From left to right: weevil on its side, weevil on its side, weevil partially on its side and back, weevil on its back, weevil on its side, weevil sitting on its posterior and a weevil on its abdomen.

Figure 42:
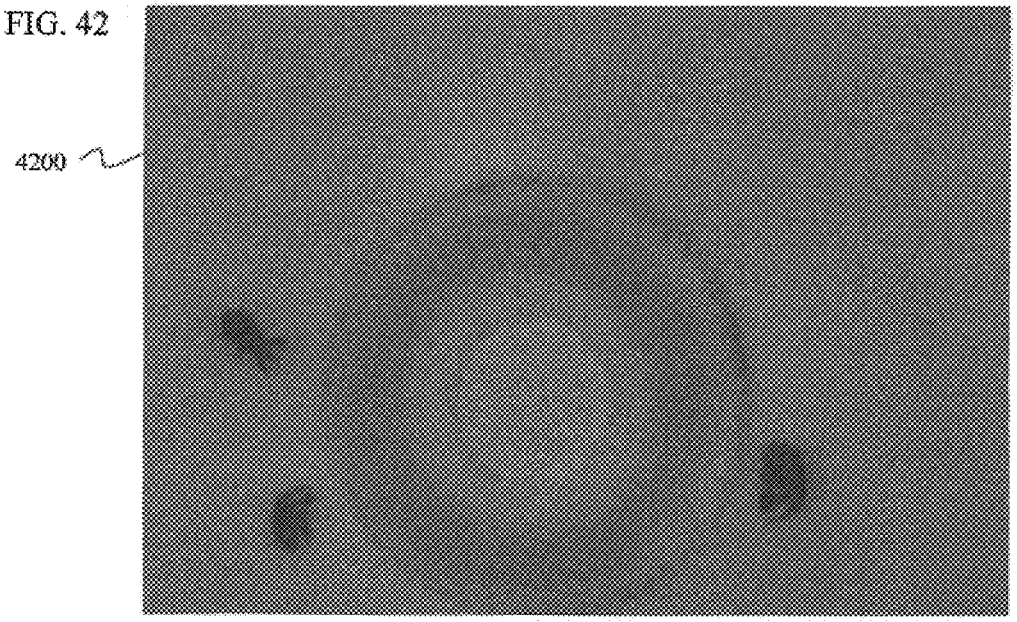
FIG. 42 shows an image of detection surface after simulated collection of three weevils.

FIG. 42 is an image of a detection surface after three weevils were "collected" by a detection device that is based on the described system and software. This was the first of two test images. It is called wst0.bmp.

Figure 43:
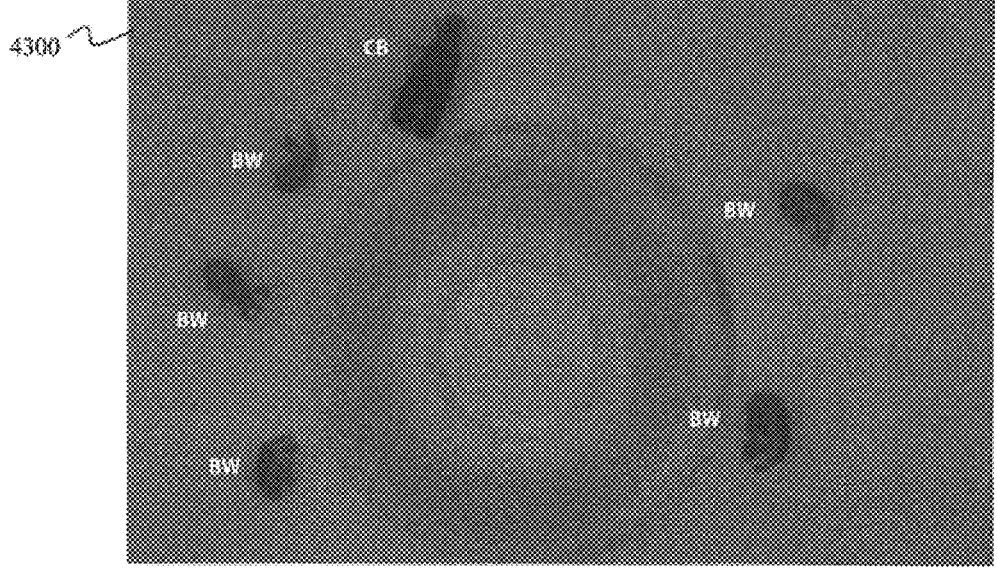
FIG. 43 shows an image of detection surface after "collecting" three additional insects.

FIG. 43 is an image of a second test image, wst1.bmp. Detection area after three additional insects, two more boll weevils and a cantharid beetle, were "collected." In this picture each insect is identified by a label to its left, BW for boll weevil and CB for cantharid beetle.

Figure 44:
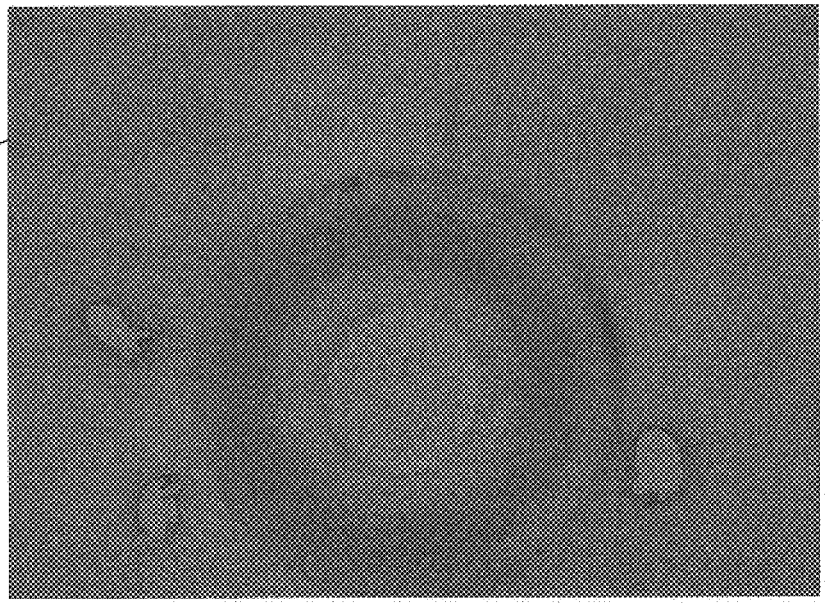
FIG. 44 shows an image output following processing.

FIG. 44 is an image output following processing. Three weevils were detected, classified and counted. Detected regions that were classified as a boll weevil are colored green. Had there been any insects classified as OTHER than boll weevils, they would have been colored red by the software. See FIG. 45 for an example of how an insect other than a boll weevil was color coded in this experiment.

Figure 45:
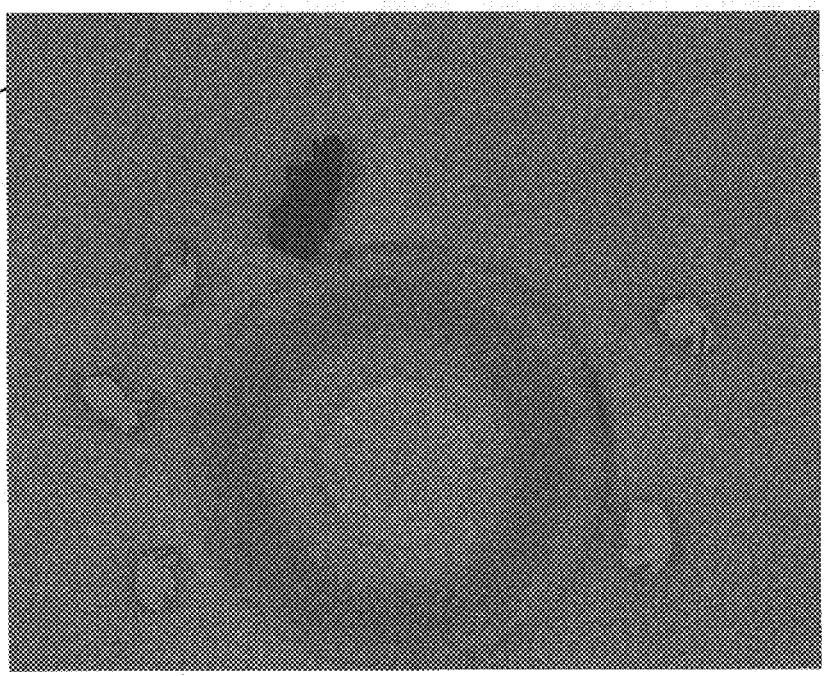
FIG. 45 shows an image output following processing.

FIG. 45 shows an image output following processing. Five boll weevils and one non-boll weevil were detected. Detected regions that were classified as a boll weevil are colored green and detected regions that were classified as non-boll weevil are colored red by the software.

Figure 46:
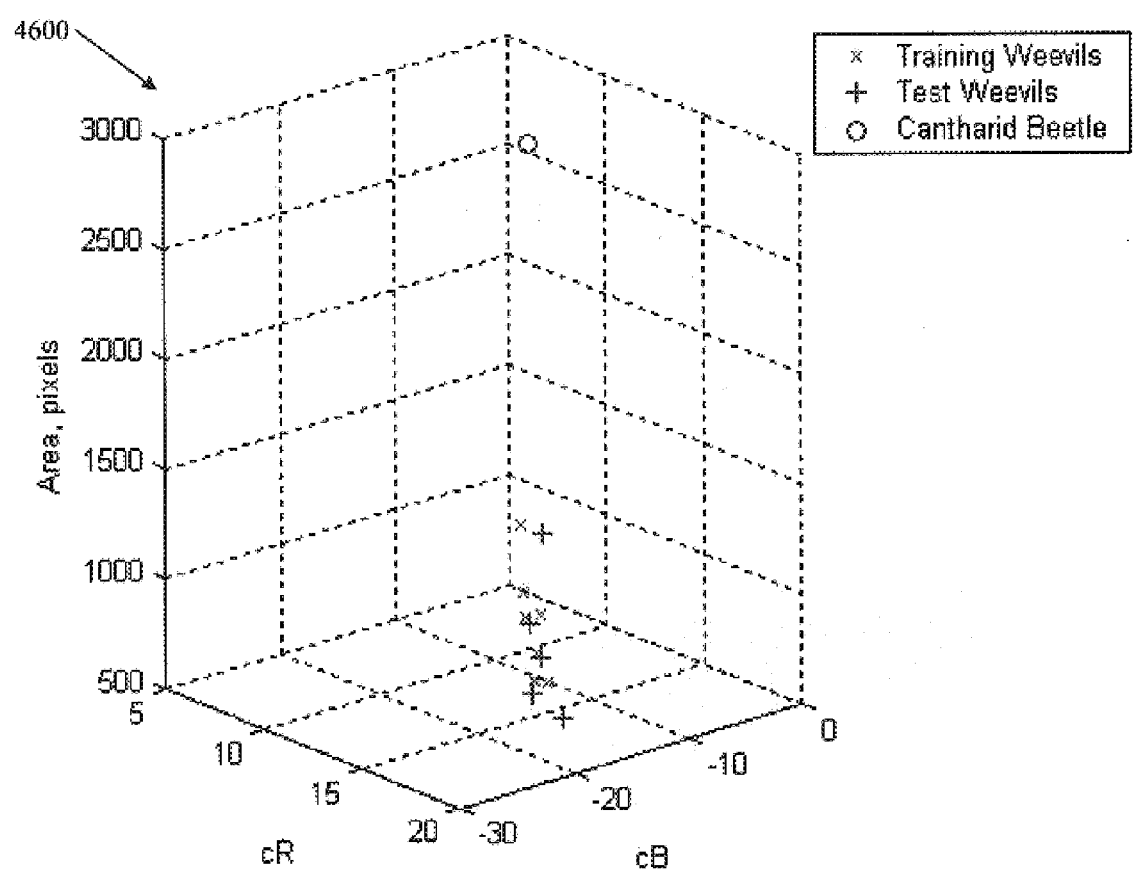
FIG. 46 is a graph of histograms showing distribution of the reference boll weevils (training weevils), unknown or test weevils and the cantharid beetle.

FIG. 46 shows a distribution of the reference boll weevils (training weevils), unknown or test weevils and the cantharid beetle in a three dimensional feature space where the dimensions or features are total area (z-axis) and the two parameters that characterize the insects color, Cr (red saturation, y-axis) and Cb (blue saturation, x-axis). Note that each of the unknown boll weevils is relatively close in feature space to a reference specimen of a boll weevil, while the cantharid beetle is a significant distance away from the reference weevils. For total area the cantharid is 9.2 standard deviations away from the average area of the reference weevils, 3.1 standard deviations away from the average weevil's Cr value and 4.2 standard deviations from the average Cb value of the reference weevils. Based on Grubbs' test for outliers using the area feature, the cantharid can be rejected as belonging to the boll weevil population with a probability of error that is less than 1%. Based on the Cb feature the Grubbs' test rejects the cantharid as a boll weevil with a probability of error that is less than 2.5%. The Grubbs' test indicates that if the cantharid is rejected as a weevil based on its Cr value only, there is a probability of error a little over 10%.

In some embodiments, a suite of image-processing and pattern-recognition algorithms implemented in software that enable the detection and classification of arthropods with minimal human involvement and provide robust results under varying and complex conditions such as: arthropods among extraneous objects, arthropods in varying positions and orientations, overlapping specimens or occlusion, incomplete or damaged specimens, and image artifacts such as shadows and glare. In some embodiments, both the detection and classification process take advantage of color information, namely hue and color saturation, in addition to luminance or the intensity of reflected light. In some embodiments, classification includes two levels of processing: 1) an initial statistical-feature-matching classifier for quick results on its own or to act as a screening function to pass on more complex classification problems to a second level classifier; and 2) a computationally more complex syntactic classifier that deals with difficult problems including clutter, incomplete specimens and occlusion. The statistical-based classifier extracts a hue and saturation histogram, measurable size, shape, luminance and/or other color features and compares them to the same types of features similarly extracted from reference specimens. This classifier provides a quick and efficient means of arthropod classification and is able to assign a confidence level or metric to its classification decisions. In some embodiments, if the confidence measure of the statistical classifier is deemed low compared to user defined thresholds, the statistical classifier passes the final decision to the second level classifier. The second level classifier searches for structural details of the arthropod, normally the arthropod's silhouette, and spatially relates these structures to the location of patterns of color on the arthropod.

The extensive use of color information for both detection and classification, luminance for classification and the two tier classification approach enable a practical systems for the automatic detection and classification of insects in the field or in laboratory settings where there is little control over what is in the camera's field of view and how objects are arranged in that field of view.

The present invention integrates highly automated systems, which include devices, processes, software and graphics, to acquire, process and display images for the detection and classification of arthropods. Moreover, the present invention is able to detect and classify insects and other arthropods under conditions that make counting and classifying difficult such as: 1) the presence of objects that could be mistaken for arthropods, which can be referred to as clutter; 2) the presence of artifacts such as shadows; 3) the presence of overlapping or occluding objects; and 4) incomplete insects due to injury or damage.

In some embodiments, the present invention's image-processing system performs both the automatic detection and classification of unknown arthropods. It performs despite the presence of clutter, occlusions, shadows, and the arthropods' appearing in a variety of positions and orientations. Thus, the present invention doesn't require a highly controlled environment where the only objects that can be detected are arthropods, and it will classify insects/arthropods regardless of their position and orientation. This means it can be used for a wide range of field applications. The present invention also uses color information in innovative ways in both the detection and classification processes. The aspects of color used in some embodiments are both hue (the dominant color or wavelengths) and color saturation (the purity of the color). In addition to color, some embodiments use luminance or relative light intensity.

In some embodiments, the present invention includes a classifier that differs from those of the other applications in a key way: it uses a two stage approach to detection and classification. The method for the first level of classification is a classifier that uses statistical features (feature classifier). This classifier can be used alone for applications where the user knows in advance that arthropod classification will be relatively easy (no clutter, no overlapping arthropods, and each species is very distinct in appearance) or if the user is concerned more with processing speed than accuracy. Otherwise, the statistical-feature-based classifier acts to screen out unlikely classes for an unknown so the second more computationally demanding classifier will not take as much time to generate an answer. The second-level classifier is referred to as a syntactic pattern or structural pattern recognition method.

In some embodiments, the system includes a database for the first level classifier. The database includes numerical data for classification that are taken from known reference specimens of arthropods. The reference specimens reflect the diversity in form and appearance of different populations and species as well as represent the different positions and orientations that specimens can take. When the system is used to classify unknown specimens the first level classifier compares quantitative measurements of size, shape, luminance and color features from each unknown with those from the reference specimens (database). This classifier allows the user to use all of the available features or select a subset of them based on the advice of human taxonomic experts. An experienced human taxonomist is more likely to develop a more reliable and robust approach to classifying arthropods than a computer program. The human insect taxonomists have a better way to assign taxonomic importance to various features and can readily adjust the classifier to very specific situations which an artificial intelligence approach is unlikely to do.

In some embodiments, a second level classifier does syntactic or structural pattern recognition. Statistical-feature-based classifiers identify objects in a strictly quantitative way and tend to overlook the interrelationships among the components of a pattern (Tou, J. T., and R. C. Gonzalez. 1974. *Pattern Recognition Principles*. Addison-Wesley Publishing. pp. 377). Syntactic classifiers look to see if the pattern of an unknown matches a known case by having the same essential components or features and that these components are linked or arranged in an identical way. Some embodiments do this by using an innovative approach to extending a "silhouette matching" method by including color information. In silhouette matching, the classifier translates, rotates and scales the 2D silhouette of a known object over the silhouette of the unknown until it finds the best match. It repeats this process for each possible known and then assigns the unknown to the class of the prototype or reference silhouette that had the best overall match. In some embodiments, this method is extended by including sample points in addition to those along the edge or silhouette of the object. The additional sample points are in fixed positions relative to the silhouette. Each point inside the silhouette contains color information for that pixel or pixel neighborhood. The sample points are chosen to capture any distinctive color patterns that an arthropod may have. In this way the present invention examines the interrelationship between the general shape of the insect and its color by checking whether the unknown has the right colors in specific places relative to the silhouette. The best match should not only have many of the pixels from both the known and unknown silhouette overlap or be a short distance away, but the colors of the internal reference points must also closely match. The extended silhouette matching classifier is superior to the statistical classifier in that it can often find a correct match when only a portion of the arthropod can be seen while a statistical-feature classifier will normally fail to fine the correct class under such conditions.

Because the present invention is practical, robust, accurate and time saving, it reduces the cost of sampling arthropod populations and frees zoologists, ecologists and pest-management professionals to work on more productive tasks. In addition, the present invention technology has very broad application to object detection in general.

Conceptual Description of Process, Devices and Algorithms for Automated Detection and Classification of Arthropods First, a general description of the present invention is provided. This includes the general system configuration, general description of the operation of the system, its devices and algorithms. Then the actual applied use of the present invention is demonstrated for three embodiments in detecting and classifying arthropods. Demonstrations simulate the detection and classification of insects in situations similar to the following: 1) insects placed on a surface for automatic classification in an ecology laboratory where students need to classify and count insects; 2) at customs facilities, ports of entry or any other areas where introduction of certain arthropods are being prevented; 3) where a pest management scout has emptied the contents of his collection net/tool on a surface for automatic classification and counting; and 4) insects stuck to a sticky, colored surface of a trap that may or may not be baited with an attractant, such as a pheromone, and which is used to monitor insects in the field.

General System Configurations:

The present invention's automated arthropod classification system, at its core, includes a detection surface where the arthropods to be classified are found, an imaging device (scanner, digital camera or video camera) to collect their images, and a computer with software to operate the imaging device, process and analyze the images and to present the results. One embodiment of a simple system would be a scanner 621 or digital camera 611 that communicates directly with the user's computer 699 using a cable 631 such as a USB (Universal Serial Bus) connector or wireless communications link 639, as shown in FIG. 6. The user's computer is also referred to as the host computer since it hosts the software to control the imaging device and process the images for the classification of arthropods. Thus, from the user's computer, one can: 1) control the settings for the scanner or camera; 2) request an image immediately from the imaging device or else schedule the automatic periodic collection of images; 3) automatically process the images to detect and classify the arthropods; and 4) examine the collected images and review the results of the automated detection and classification.

Alternatively, in some embodiments, the imaging device can transmit images to the host computer and receive instructions from the host computer via a dialup modem connection, internet connection or a wireless communication device.

Some embodiments that use a camera also include an illumination device to facilitate the acquisition of images of the surface (detection surface 624) where the arthropods to be detected are found.

More complex embodiments will rely on multiple imaging devices connected via a network (wired and/or wireless) to the user's computer. The scheduling of the sampling and the processing of the images would still be done from the user's host computer. An even more advanced embodiment of an arthropod-sampling system, in some embodiments, includes many independent arthropod-detection units sending back the images and processed results to the user's computer. Each arthropod-detection unit would include a trap or detection surface, illumination device, camera, camera lenses and filters, processor and communication device. Each unit in addition to collecting an image would do the detection and classification processing with its own processor or CPU (central processing unit) and then send compressed images and the results of processing to the user's computer/host computer for review. The user could adjust settings for the individual cameras, schedule the sampling times and set the processing parameters for each of the units from the host computer, as well as review the results from the units.

In some embodiments, the host computer includes the following off-the-shelf, commercially available software:

1. Operating system.
2. Software to initiate image collection via an imaging device.
3. Microsoft Paint—examine input, intermediate and final result images.
4. Microsoft Notebook—examine output text file and edit input text file for some embodiment, sometimes called the feature file.
5. Starbase's CodeWright—another text editor, to develop the C code for applications of some embodiments and to examine output text files and examine and edit the feature files.
6. Microsoft Visual C++—to develop and compile some embodiments' executable programs, such as BugClassify.exe.

In some embodiments, the present invention software includes:

1. BugClassify.exe—executable software used to train a system's statistical classifier and to process images for the detection and classification of arthropods.
2. MakeSilh.exe—executable software integrated with a main program BugClassify.exe—executable software that takes a segmented image or labeled image of the detected arthropods, and generates an image containing the silhouette of each detected object (also called a "detection"). This is used for research and development using silhouettes for arthropod classification.
3. GetSilhCode.exe—executable software that extracts a compressed representation of an object's silhouette, called the chain code, and inserts the chain code into a special silhouette file. This is used to develop prototype silhouette files and to do studies with silhouette files.
4. TransSilh.exe—executable software that does silhouette matching in place of BugClassify.exe when doing silhouette-matching studies.

In some embodiments, the imaging device (scanner, digital camera) includes software to adjust camera or scanner settings such as brightness, spatial resolution (dots per inch) and color resolution (number of bits of color) as well as request the collection of an image.

Specific configurations of some embodiments for the demonstrations described here appear in their respective sections.

General Description of the Operation of the System

This section describes an embodiment to configure a system to detect and classify insects that are on a detection surface 624. The insects may have been collected by sampling insects from a habitat, for example by using a sweeping net or other sampling device. The person places the insects on the detection surface 624 of the system and has the insects automatically classified and counted. The described embodiment also works when the insects that are to be detected and counted were trapped after they flew or crawled onto a sticky detection surface 624 in the field.

One embodiment of a system follows and is summarized in a flowchart 2400 (see FIG. 24):

A. Generation of a background image.
   B. Generation of arthropod-identifying reference features and prototype silhouettes.
   C. Acquisition of images of the unknown arthropods to be detected.
   D. Arthropod detection.
   E. Feature extraction.
   F. Classification of arthropods.

A. Generation of a Background Image

Normally, the first function is to collect a background image of the detection surface 624 prior to placing insects on it. The scanner or camera acquires an image of this surface without any objects on it. This reference image aids in the detection of the arthropods and other objects that will eventually appear on the surface. The background is used to look for changes in the quantity, hue and color saturation of the reflected light due to the presence of the arthropods. FIG. 40 from Experiment 3 shows an example of a background image.

Although it is advantageous to include a background image or previous image as input for accurate insect detection, a system doesn't require it. As an alternative, software has the option of estimating what the background or detection surface 624 would look like in terms of color and luminance in the absence of any arthropods. The terminology used here follows the RGB color model (Weeks, A. R. 1996. *Fundamentals of Electronic Image Processing*. Wiley-IEEE Press. pp. 576). Software can calculate the median R (red), G (green), B (blue) and gray-level values as well as their standard deviations from among all the pixels, and then use these values as estimates of the background detection surface 624. This is valid at least as long as most of the detection surface's area is visible and the one or more various background areas of detection surface 624 itself are each relatively uniform in color and luminosity (which each is, by design, in some embodiments). An estimated background image is created by using the original RGB values of each pixel, provided that they are within a specified number or fraction of a standard deviation of the median RGB values. Otherwise, if any of the pixel's RGB values differ significantly from their median values, it may be part of an object, and its RGB values are replaced with the median values. Alternatively, all the pixels of the estimated background image can use the median RGB values.

After acquiring the background or reference image, there may be a need to enhance the image before any further processing can be done. This could also be true for the images containing the insects to be counted and classified. Image enhancement to correct for distortions or noise is an optional feature in some embodiments.

If the angle formed by the camera's line of sight and the detection surface or insect(s) deviates from the perpendicular, there can be significant distortion due to perspective. It is possible that in some applications, particularly where a person may wish to examine the images, perspective distortion is unacceptable. In this case, the present invention can map each pixel's value via geometric transformation to a different coordinate system (different row and column) that corresponds to a top-down or perpendicular view. During calibration, the present invention measures the real-world coordinates of four points in the distorted image space. With these four points the present invention can solve for the coefficients that will permit software to map pixels in the image into a normal view (Russ, J. C. 1995. *The image processing handbook*. 2nd edition. CRC Press. pp. 674). Gaps or missing values in the transformed image can be filled in through interpolation.

Image enhancement may also be needed if there is a significant amount of noise in the image. Two basic approaches can be used to filter out noise: temporal or spatial smoothing. When a sequence of images can be collected over a short period of time, an enhanced image can be created by replacing the value at each pixel location with either the arithmetic average or median of that pixel from among the replicated images. The resulting smoothed image will be enhanced and have little noise, provided that the scene does not change between images and that the noise is nearly random over time at each pixel. Using the arithmetic average for each pixel is desirable in most cases, as it requires fewer computations than calculating the median.

When it is not practical to collect several images to reduce noise, a spatial filter can be applied. In this case the pixel of concern is replaced with the arithmetic average of its value and those of its neighbors. Alternatively, the pixel can be replaced with the median of the values in its neighborhood. While the arithmetic average is computationally quicker than calculating the median, the median is sometimes desirable as it is less likely to blur the image along contrasting areas or boundaries within the image.

Although the above noise-filtering techniques are standard image-processing techniques, some embodiments have two modifications to these approaches to noise reduction. To preserve as much of the original image information as possible in the case of spatial averaging, some embodiments use the original pixel value except when the difference between the averaged value and original is large. When there seems to be a significant difference, some embodiments use the averaged or median value. In this way, the original information is retained except for cases where noise may have caused a questionable value. In some embodiments, a second approach deals with the averaging of color. Even though the previously described filtering methods work well for black-and-white images or the luminance portion of a color image, in some image formats or color models just averaging each color component can lead to unintended or distorted color. For example in the RGB format, if one takes the average of a reddish colored pixel (R=248, G=8, B=112) and greenish pixel (R=8, G=248, B=112) it would result in a gray pixel (R=128, G=128, B=112). This may not be what was intended. The two input pixels had high color saturation and the resulting average has a very low saturation. One way color distortion can be avoided when smoothing the image values is to use the color components of the pixel with the median luminance value.

B. Generation of Identifying Reference Features and Prototype Silhouette

Before some embodiments can identify unknown arthropods, there must be a set of features and silhouettes (optional) from known or identified arthropods which can be compared with the features and silhouettes of the unknown arthropods. This section describes the features and silhouettes. At the end of this section is a list and description of the commands and functions that some embodiments use to generate the reference features and prototype silhouettes.

Some embodiments use a collection of statistical Identifying Reference Features extracted in advance from known arthropods or reference specimens. A set of each of these Identifying Reference Features is taken from each reference specimen and they are used by the system's statistical classifier to identify the unknown arthropods. A plurality of such feature sets are collected, in some embodiments, from specimens of each arthropod species that the system is expected to encounter or required to recognize. This insures that the system includes representatives of the natural variation among individuals of a species and the different orientations in which the arthropods may appear. In some embodiments, the sets of reference features are stored in the computer's memory as a file which is called a feature file.

In some embodiments, features are extracted from images of identified arthropods by the same processes (functions C, D and E) as described below, for the classification of unknown arthropods. These features become part of a database of known arthropods. In some embodiments, features characterize each reference arthropod and fall into one of four types of information:

1. Size: This set of features includes: a) total area; b) perimeter; c) the length of the major axis (body length); d) the length of the minor axis (body width); and e) the minimum rectangular area that bounds the detected or labeled area.
2. Shape: This set of features includes: a) the ratio of the total area to the minimum bounding rectangular area (measure of how rectangular the object is); b) 4(pi) times the total area divided by the perimeter square (a measure of how circular and compact the object is); and c) height to width ratio or major axis to minor axis ratio (a measure of elongation).
3. Luminance: Information on the brightness or relative intensity of the reflected light from the arthropod is currently described by two features: a) the average luminance or gray-level value of each pixel of the detection relative to its background; and b) the coefficient of variability in the relative gray-level values among the detection's pixels. The coefficient of variability is the statistical standard deviation divided by the mean and expressed as a percentage. Some embodiments use a histogram of the luminance values of the arthropod's pixels as a way of characterizing its reflectivity.
4. Color: In some embodiments, a Color Feature or 2D hue/color saturation histogram provides a simple and practical way to summarize the colors of arthropods. This Color Feature invention is an improvement for object identification and is derived from the standard color format called the YCbCr color model (Weeks 1996) which is used in video and television.

In some embodiments, the color feature (feature vector) is used to provide a simple, powerful and practical way to summarize the color of an arthropod or insect that is independent of rotation in the image as well as scale. The color information associated with each pixel of the arthropod is translated in to YCbCr color space where Y represents the pixel's luminance or brightness and Cr and Cb represent the color saturation level for red and blue, respectively (Weeks 1996). The hue, for a point in the CbCr space, is represented by the angle formed by the x-axis and a line from that point to the center of the space. The distance from the point to the center of the color space represents the level of saturation for that point. The center of the space has no color and represents the gray-scale value or luminance of the pixel.

FIG. 21 illustrates an example of a portion of a YCbCr color space where Y is kept at a constant gray-level value. In some embodiments, using this concept of the YCbCr color space, the software routine, BugClassify.exe, is programmed to generate a 2D histogram where the rows represent the Cr value and the columns the value of Cb. Each bin of the histogram contains the percentage of the pixels associated with the arthropod that have that combination of Cr and Cb or that combination of hue and color saturation. FIG. 22 graphically shows an example of the 2D hue/saturation color histogram generated from an image of one colorful insect (halictid bee). This figure also illustrates how the 2D histogram represents quantitatively and qualitatively the metallic green, yellow and black color of the halictid bee.

In some embodiments, the Cr and Cb values of each image pixel are represented by an eight-bit value. Therefore, it would be natural to have a histogram with 256 columns and 256 rows. However, most of the bins will be empty (contain a zero, as there were no pixels with that combination of Cr and Cb). To avoid a sparse matrix, that is a histogram with most of the elements having a value of zero, some embodiments generally use only the upper 5 bits of each Cr and Cb value. This saves memory space and reduces the time or number of calculations needed to classify insects when a comparison is made of the matrix of each unknown insect with the matrices of the reference insects. Thus, the size of the matrix can be altered to allow for varying color resolutions.

The size and shape of the CbCr color space changes with luminance. Therefore, the lighting conditions for collecting images of the reference insects and the unknowns (i.e., insects to be detected and classified) are kept as nearly identical as possible to insure a valid match. In some embodiments, several other color space models are used for a 2D hue/saturation color histogram, such as the HIS, YIQ, HLS, HSV, CMY or L*u*v* color models. The L*u*v* color model would be a good candidate if illumination complicates some embodiment's color-matching approach. Ong et al. (Ong, S. H., N. C. Yeo, K. H. Lee, Y. V. Venkatesh, and D. M. Cao. 2002. "Segmentation of color images using a two-stage self-organizing network." *Image and Vision Computing* 20(4), pp. 279-289) used the L*u*v* color space to determine the dominant colors in images for segmentation (labeling the pixels making up an object). They found by using the L*u*v* color space, the influence of illumination on colors was greatly reduced.

Color histograms have been used in the past for segmentation and for characterizing images so that an image can be matched quickly with another in an image database. For example, Chai et al. (Chai, D., and A. Bouzerdoum. 2000. "A Bayesian approach to skin color classification in YCbCr color space." *IEEE Region Ten Conference*, (TENCON'2000), Kuala Lumpur, Malaysia, vol. II, pp. 421-424, September 2000) used a 2D color histogram based on YCbCr color space to segment human faces in images. They used the 2D color histogram to create a conditional probability density function for skin color which was then used to decide whether individual pixels in an image belonged to human skin. The inventors believe the present invention's 2D hue/saturation color histogram is the first application of a 2D color histogram as a feature for the identification of objects within an image. A 1D color histogram was used by Di Ruberto et al. (Di Ruberto, C., A. Dempster, S. Khan, and B. Jarra. 2002. "Analysis of infected blood cell images using morphological operators." *Image and Vision Computing* 20(2), pp. 133-146) as a feature to distinguish red blood cells from other blood cells. They mapped the pixels of reference red blood cells to a 1D color histogram where the elements of the histogram represented 256 colors taken from an HSV color space. This reference histogram then was matched with 1D color histograms extracted from unidentified blood cells. A 2D color histogram should be more effective at distinguishing subtle color differences among different insect species than just a 1D color histogram.

Some embodiments have the option of applying a second level of classification in addition to the statistical-feature classifier. Some embodiments optionally generate a second computer file called the "prototype silhouette file" for the syntactic-silhouette-matching classifier. The silhouette file contains numerical information that encodes the 2D silhouette pattern along with color reference points for each of the known reference specimens. The encoded form of the silhouette is referred to as a chain code (Ballard, D. H., and C. M. Brown. 1982. *Computer Vision*. Prentice-Hall, Inc. pp. 523). Chain code saves a great deal of computer memory compared to listing the x and y position of each pixel making up the silhouette of the arthropod reference. A graphic example of the content of one of these prototype silhouette files is given in FIG. 32 and an example prototype silhouette illustrating the color reference points in addition to the silhouette is given in FIG. 37.

Prior to extracting the reference features and/or the prototype silhouettes, some embodiments are configured in one of two ways:

Configuration 1

A. Imaging device: scanner.

B. Detection surface: scanning surface of scanner.

C. Computer:

1. DOS operating system.

2. Software to operate scanner.

3. Microsoft Paint—used in some embodiments to examine input, intermediate and final result images.

4. Microsoft Notebook—used in some embodiments to examine output text file and edit the input text file, called the feature file.

5. Starbase's CodeWright—to develop the C code for applications and to examine output text files and examine and edit the feature files.

6. BugClassify.exe—executable software used in some embodiments to train the system's statistical classifiers and to process images for the detection and classification of arthropods.

7. MakeSilh.exe—executable software integrated with the main program BugClassify.exe of some embodiments. This software takes a segmented image or labeled image of the detected arthropods and generates an image containing the silhouette of each detected object. This is used for research and development with silhouettes for arthropod classification.

8. GetSilhCode.exe—executable software that extracts a compressed representation of an object's silhouette called the chain code and inserts the chain code into a special silhouette file. Some embodiments use this to develop prototype silhouette files and to do studies with silhouette files.

9. TransSilh.exe—executable software that does silhouette matching in place of BugClassify.exe when classification of arthropods by silhouette matching is required.

Configuration 2

A. Imaging device: Digital camera.
B. Detection surface: Sticky surface where insects are trapped.
C. Computer:
   1. DOS operating system.
   2. Software to initiate image collection via an imaging device.
   3. Microsoft Paint—examine input, intermediate and final result images.
   4. Microsoft Notebook—See above.
   5. Starbase's CodeWright—See above.
   6. BugClassify.exe—See above.
   7. MakeSilh.exe—See above.
   8. GetSilhCode.exe—See above.
   9. TransSilh.exe—See above.

In other embodiments, Windows, Linux, Unix, or other suitable operating system may be used. Other image manipulation and text programs may also be used.

To operate the system, the user executes the following procedure to extract the features and create the feature file.

The user places classified reference specimens on the surface of the imaging device, acquires images of the specimens using the imaging device and saves these images as files in the computer's memory. Using the software that comes with the scanner or camera, the user clicks on the capture image button. Once the image is captured the user presses the save function. The software requests a file name and image format. The user types in a file name of the user's choice for the image and then must select the bitmap format, BMP, for the image file before hitting the save button. The reference features are generated by executing the invention's detection and classification software, called BugClassify.exe, in what is referred to as the "training mode," with the image of the known prototypes or reference insects as input. In the "training mode" the software executes in exactly the same manner as in the "detection/classification mode" until the last function, classification. Instead of trying to classify the insects, in the "training mode" the software saves the feature set associated with each known insect to a file called the feature file (Identifying Reference Feature file).

To execute the program, BugClassify.exe, to generate the reference feature file the user must bring up a DOS window in a Microsoft Window's operating system. There are several ways to invoke BugClassify on the command line in order to create a feature file, four of which are shown here:

```
BugClassify input_reference_image_filename input_
    background_image_filename Trainingmode
``` or

```
BugClassify input_reference_image_filename input_
    background_image_filename feature_filename—
    train
``` or

```
BugClassify input_reference_image_filename esti-
    matebackground trainingmode
``` or

```
BugClassify input_reference_image_filename output_
    background_estimate filename trainingmode—
    background
```

On the command line, BugClassify must be typed in, followed by at least three arguments or character strings. Those arguments that are shown in italics indicate names that the user chooses. Those words that are not in italics are key words that BugClassify recognizes. Optional arguments that follow the first three always start with a dash to identify them as optional parameters. The first argument is always the name of the image file, that is, either the image containing the reference arthropods for training or the unknown arthropods to be counted and classified. The second file is always an image that shows what the background looked like before arthropods were placed on the surface or the image from the last sampling period. If the user does not have a background image, she or he can substitute a file name with the string, "estimatebackground" (third example above). This informs BugClassify that there is no background image and that it must estimate one from the input image; by default BugClassify will save this estimated background image to a file called BackgroundImg.bmp. Alternatively, if the user wants a different name for the estimated background image, he or she types this filename as this second argument, and anywhere after the third argument they must enter the optional argument "-background" to indicate that a background image must be calculated (see fourth example above). The third argument is the name of the feature file to be used during detection and classification. Since a feature file is not present at the time of training, one needs to be created. This can be done in one of two ways, as shown in the first and second examples above. A feature file can be generated by typing the string "trainingmode" as the third argument (see first, third and fourth examples above). This tells BugClassify to use the input image as an image containing reference specimens. By default BugClassify will save the feature sets to a file called, TrainFile.txt. If the user wishes a different name for this feature file, she or he should use the name that is wanted as the third argument, but must also add the optional string, "-train", anywhere after this third argument (as in second example above). The optional string, "-train", tells BugClassify to execute in the "trainingmode."

Once the feature file is generated it must be edited by the user by adding the species name and species code number to each reference insect's set of features. This allows the classifier to assign the species name or classification associated with the feature set that best matches the features of the unknown. To edit the feature file, the user opens the file with any text-editing program, Microsoft Notebook for example, and types two lines before each set of features (there is a blank line between each feature set). The first line must contain the name of the species as a character string. The second line is a number to represent the species.

Additional functions are necessary to generate a prototype silhouette file if the user plans on using the second-level classifier, syntactic-silhouette matching, in addition to the statistical-feature classifier. First the user takes one of two intermediate output images to create a silhouette file of the reference specimens. These two intermediate images were generated when BugClassify made the reference feature file. The intermediate images are: an image of the segmented detections (binary image where the background is black and the pixels of the detected objects are white) called, SegmentedImg.bmp, or a labeled image of the detections (image where the background is black or zero in value and the pixels of each detected object are assigned a positive value unique to each detection), called LabelImg.bmp. Either of these two files is input for a command called MakeSilh.exe. The user types the following command line in a DOS window to generate the silhouette image:

MakeSilh LabelImg SilhouetteImageName or

MakeSilh SegmentedImg SilhouetteImageName

The second argument for MakeSilh.exe is the output silhouette file and it is shown in italics above to indicate that the user chooses the name of this file. The next function takes the silhouette image of the reference specimens and generates a chain-code representation of each of the silhouettes. This is done by entering the following command line in a DOS shell:

GetSilhCode SilhouetteImageName SilhouetteFilename.

The first argument to GetSilhCode is the name of the silhouette image that was generated by MakeSilh and the second argument is the name the user chooses for the prototype silhouette-chain-code file. The chain-code file is manually edited next. The species code number is added as a line before each of the chain codes. Also the color reference points must be appended to each chain code. First the user appends the number of reference points followed by information on each of the color reference pixels. For each pixel, its x and y coordinates are entered, its hue, and its saturation value. A space is typed between each value. In some embodiments, the reference points are selected and their x and y position and their RGB values obtained by viewing the reference specimens in the original raw image with Adobe's Photoshop Version 7.0. Photoshop provides the x and y value and the RGB values of each pixel pointed to by the cursor. The RGB values are manually converted to hue and saturation values by the equations given in Section D, Arthropod detection (below).

When the software is executed to detect, classify and count arthropods, this reference feature file and the optional prototype silhouette-chain-code file are included as input to the software along with the raw images.

C. Acquisition of Images of the Unknown Arthropods to be Detected

The scanner or camera acquires one or more images of the arthropods to be detected and classified on the detection surface 624.

D. Arthropod Detection

This function involves labeling those pixels from the acquired arthropod images that appear different from the corresponding pixels of the background image and are thus likely to belong to an arthropod or clutter. The system looks for differences in luminance, hue and color saturation between the corresponding pixels. Where a pixel is moderately darker than the background the pixel may represent a shadow and it is not labeled as part of an object unless there are other indications that it is an object and not a shadow, such as a change in hue. The labeled pixels are then connected into continuous regions or blobs by a standard image-processing technique, connected-components analysis (such as described by Ballard and Brown, 1982). As part of connected-component analysis, labeled regions that are too small in area are discarded. This function removes much of the false detections associated with noise and other artifacts.

The background image and the image with the unknown arthropods are collected normally in a bitmap format where each pixel has 8-bit values for the R, G and B color components. The RGB components are transformed to create separate intensity, hue and saturation images by first transforming them to the three components of the YCbCr color model. The equations for these transformations are as follows:

$$Y=0.299R+0.587G+0.114B$$

$$Cr=0.701R-0.587G+0.114B$$

$$Cb=-0.299R-0.587G+0.886B$$

where Y is the luminance or intensity of the pixel and Cr and Cb are color components of the YCbCr color model. Hue and saturation are then derived from Cr and Cb by the following formulas:

$$\text{Saturation}=\text{square root }(Cr^2+Cb^2)$$

$$\text{Hue}=\arc\tan(Cr/Cb)$$

In some embodiments, hue is not defined when the saturation level is zero. Zero saturation means there is no color information and that the color appears as a grayscale value which can range from black to white.

Once intensity, hue and saturation images have been calculated for the current and previous images, a difference image can be generated for each image type. The previous image's luminosity values are subtracted from those of the current image to generate an absolute intensity difference image. The same procedure is applied to the hue and color saturation images.

A threshold is applied to each of these three difference images. Differences greater than the threshold are labeled as significant and may be part of an arthropod, while those pixels with values less than or equal to the threshold are labeled as background pixels. This process of separating the background pixels from the objects to be detected is referred to as segmentation.

The threshold applied to each of the three difference image types is not a fixed value. It is adaptively calculated for each image type. A histogram is created for each difference image and from it a default threshold is calculated by assigning the threshold to the difference value where only a small percentage of the pixels exceed this value. Setting the default threshold to the value where 15 percent of the pixels exceed the threshold generally works well. Next, an attempt is made to improve upon the default threshold by searching the histogram for a better threshold. An inflection point is sought where the value in the histogram bin levels off or increases after having declined over the previous bins. The first function is to start at the zero-difference bin, and search for the peak in frequency by examining the bins of larger difference. From the peak difference, difference values in larger-numbered bins are then searched for an inflection point or until an empty bin is encountered. This inflection point becomes the threshold unless it is considerably larger than the default threshold, in which case the threshold is assigned the default value.

A final detection or segmentation image is created by combining the results of the three thresholded difference images. A logical-OR operation is performed, of the three binary difference images, except where the intensity difference indicates the pixel could belong to a shadow, i.e., when the current pixel-intensity value is somewhat darker than the intensity of the background or previous image. When the intensity difference falls within the range of values that are characteristic of a shadow, the software labels the pixel as shadowed background unless the hue has significantly changed or the saturation of color has significantly increased. In the latter case, the pixel is assigned to the detected object.

Arthropod detection need not be limited to just the processing of color imagery. While color images offer more information for detecting and recognizing arthropods, a black-and-white camera is cheaper and thus may be preferable for situations where it is known the arthropods will be easy to detect and classify. Detection for black-and-white imagery would be the same as described above but the algorithms would be utilizing only the luminosity or intensity image component and not the hue and saturation images.

Following segmentation or the labeling of individual pixels, the labeled pixels must be grouped into regions, objects or blobs that correspond to the arthropods. This can be done by the standard connected-components algorithm. The algorithm scans pixels from the top row moving from left to right across each pixel row until it encounters the pixel at the right-most column of the bottom row. The input to the algorithm is the binary segmented image described in the previous paragraphs. The output will be grouped pixels where each grouped non-background region is labeled with its own unique non-zero identifying number while the background pixels are set to be zero. This output image is referred to as the labeled image.

As the algorithm scans through the segmented image it stops at each non-background pixel of the segmented image and assigns the corresponding pixel of the output label image a non-zero number. If the pixel does not have a labeled neighbor directly above it or to its left the count of the number of labeled regions is incremented by one and this value is assigned as the label number for this new region. If the segmented pixel has a labeled neighbor above it, the algorithm assigns the region label number of that neighbor as they are both members of the same continuous region. If the neighbor above the segmented pixel doesn't belong to a region but the neighbor to the left belongs to a labeled region, the pixel is assigned the label number of its left neighbor, as they are connected to the same blob. If both the upper and left neighbor have a label number but they are different, the pixel is given the upper pixel's label number, as it has precedence, and a record is kept that these two labeled regions are connected and thus equivalent. During a second pass of the output image these two equivalent regions will be merged.

After scanning through the segmentation image and assigning numbers to all the labeled regions a second pass is made through the output image. Wherever a non-zero label value is encountered that is equivalent to a previously labeled region it is changed to the previous region's value. The count of the total number of labeled regions must also be adjusted by subtracting out the redundant or equivalent region.

While scanning the labeled image during the second pass a count is kept of the total number of pixels in each labeled region. Once this is done any regions can be removed that are deemed to be too small by setting their pixel values in the labeled output image to zero and decrementing the region count by one. The minimum pixel area for a labeled region can be altered by the user, depending on the size of the arthropods of interest.

In some embodiments, the present invention implements the case of "four connectivity." Four connectivity defines that a pixel is part of a common region if any of the following four neighbors has also been labeled: the pixel above the pixel of concern (same column, preceding row); the pixel below the pixel of concern (same column, next row); the left neighbor (same row, preceding column); and the right neighbor (same row, next column). It is also possible to execute connected-components analysis with "eight connectivity." In eight connectivity, in addition to lumping non-background pixels with their neighbor above, below, to the right and to the left, the algorithm also looks at the neighboring pixels above and to the left and right, as well as pixels below and to the left and right (the four diagonal neighbors). Eight connectivity takes more computational time and may not yield significantly better results.

Within the labeled regions corresponding to the detected arthropods there may be holes that the process considered to belong to the background. Good examples would be the missing portions of the two detected ladybird beetles which were caused by glare and are shown in FIG. 8 (image on right). These holes can be filled in by applying connected components an additional time. Prior to executing connected-components analysis to label the non-background pixels, connected components can be applied to do just the opposite, label the background-pixel regions only. Any small background labeled regions belong to holes within the detected areas corresponding to the arthropods. These small background regions can then be used to fill in the segmented image before the process calls the connected-components region to label the detected arthropods. This process of filling holes within the detected regions was not done for the experiments described in this document. This function was not incorporated into the software used in these experiments.

In some embodiments, arthropod detection is done by invoking the software program called BugClassify.exe. From the computer, the user types the following command in a DOS shell:

BugClassify input_image_filename input_image_
    background_filename input_feature_filename If the user does not have a background or previous image and wants the system to estimate one, he or she needs to change the second argument to the string, "estimatebackground", or the name of the background estimate image to be created plus the additional argument, "-background", as was described in section B. The program by default discards detections that cover less than 40 pixels in area. If the user wants to change that value, he or she must add the optional argument anywhere after the third argument as follows, "-minsize" N, where N is area the user selects for the minimum detection size.

E. Feature Extraction

The detection image containing the labeled regions created by connected-components analysis is used to extract statistical features (size, shape, luminosity and color) and the silhouette (optional) for each labeled region. Scanning over each labeled region the various size and shape features are counted and calculated and the silhouette's pattern is extracted into an encoded form or chain code. The size features that are calculated are: a) total area; b) perimeter; c) the length of the major axis (body length); d) the length of the minor axis (body width); and e) the minimum rectangular area that bounds the labeled area. The shape features include: a) the ratio of the total area to the minimum bounding rectangular area (measure of how rectangular the object is); b) 4(pi) times the total area divided by the perimeter square (a measure of how circular and compact the object is); and c) height to width ratio or major axis to minor axis ratio (a measure of elongation). Features are also extracted relating to the quantity and quality of the light that is reflected from the arthropod's body. The relative intensity-of-light or luminance features are: a) the average difference in luminance between the arthropod's pixels and the corresponding pixels of the background image; and b) the coefficient of variability in the difference in luminance. In some embodiments, the quality of light or color reflected by the arthropod is captured by the 2D hue/color saturation histogram which is considered as a feature or compound feature (feature vector).

In some embodiments, the first shape feature listed above is referred to as the rectangular fit feature. It gives an idea of how rectangular in shape an arthropod is. This feature is calculated by dividing the total area of the object by the minimum sized rectangle that surrounds or encloses the object (referred to as the minimum bounding rectangle). For a perfectly rectangular shape this ratio will be 1.0, and this feature's value will become smaller as the object becomes less like a rectangle in shape.

In some embodiments, the second shape feature listed above is called the circular fit or compactness feature. It is also known as the isoperimetric quotient, which is defined as 4(pi) times the total area divided by the square of the perimeter (Russ 1995). In some embodiments, this feature is used to measure how close to a circle and how compact an arthropod's shape is. This feature is at a maximum value, 1.0, for a circle, as both the numerator and denominator are equal to $4(pi)^2 r^2$. As an object's shape deviates from a circle the value of this feature becomes smaller. Since a circle is the most compact shape, that is, it has the smallest perimeter relative to its area for an enclosed object, this feature also measures compactness. Therefore a large feature value indicates a compact object shape while a small value indicates that an object is not compact, that is, it is flatter or thinner than a shape with a larger value.

As can be ascertained from FIG. 23, if one approximates a circle with equal-sided polygons, the circular fit, or compactness, approaches that of a circle as one adds more sides (triangle, square, hexagon (not shown), and octagon (not shown) have values of 0.604, 0.785, 0.842 and 0.948, respectively). If one stretches a polygon, it becomes less compact and appears less like a circle, and the circular fit/compactness metric naturally decreases.

In some embodiments, to generate the Color Feature, for each labeled pixel of a region, the software extracts the color components Cr and Cb (which characterize its color hue and saturation, see Weeks, 1996). The Cr and Cb values from that pixel in the corresponding original input image are used in some embodiments to fill in the 2D hue/saturation color matrix that is created for each labeled region. In addition to color information some embodiments also utilize features that summarize the luminance or gray-level values associated with the insect's image, such as the average gray level.

In addition to these features for classification, other statistics for other aspects of image processing are extracted from the labeled regions. These additional statistical measures include location features such as the x,y extents of the object (x and y maximums and minimums) in the image space, the x,y position of the object's center, called the centroid, and the object's orientation (angle of major axis with respect to the x-axis). The minimum and maximum x and y coordinates describe the rectangular region where the detection is located. The centroid is the average x and y value of the pixels that make up the detection's area. It tells the program and the user (normally the centroid is listed in the text output) where the center of the detection is within the image. In some embodiments, an object's orientation refers to the angle that the major axis makes with respect to the x-axis. For example the arthropod's body may be facing up in the image, 90 degrees, or facing right parallel to the x-axis, 0 degrees.

Some embodiments provide a system that is flexible and can be customized to specific situations where arthropods need to be classified. Although some embodiments calculate many prototype features, (see previous section B or first paragraph of this section), the user may choose to use only a few for specific classifications. How many and which features are chosen to be used depends on the application. Generally, more features are used as more known arthropod species are added to a proprietary database of known arthropods. The program BugClassify by default uses four of the 11 features just described. They are the total area, the circular fitness feature, the average luminance and the Color Feature. The user can select all or a subset of these features by including the optional argument, "-featsel", on the command line followed by a list of the numerical codes for each feature. For example, in some embodiments, "-featsel 1,9,11" tells the program to use total area, the average luminance and the color feature in the statistical classifier. The numerical code for the features is the same as the order in which the features were presented in the first paragraph of this section.

F. Classification of Arthropods

The features extracted from each of the unknown arthropods (done in function E) on the detection surface 624 are compared to each of the reference set of features generated by function B. In some embodiments, each unknown is classified by the statistical-feature classifier, which is a modified version of the single nearest-neighbor algorithm (1NN) (Tou and Gonzalez, 1974). The unknown is assigned to the class belonging to the reference whose feature set is closest in the N dimensional space defined by the N features (best match). FIG. 46 shows an example of a three-dimensional feature space with the distribution of some reference specimens and unknowns in that volume. Some embodiments of the 1NN classifier differ from the standard version in the decision it makes once all the distances to the various reference specimens have been made. Rather than just assign the class of the nearest reference in feature space like a typical 1NN classifier, some embodiments of the classifier have options. The user can specify a threshold(s) which distinguishes good matches from poorer matches. If the distance in feature space to the best match is less than the threshold, then it is a good match and the classifier assigns that reference's class to the unknown. If the distance in feature space exceeds this threshold or if the difference in one of the key features is greater than the threshold for that feature, the classifier considers other alternatives. If the match is poor, some embodiments reject the detection as not belonging to any class associated with the feature sets in the input feature file and assign the unknown to the class of unidentifiable objects called OTHER, or it can request further processing with the second-level, syntactic-silhouette-matching classifier.

BugClassify.exe decides whether the best match from the 1NN classifier is a good or poor match by doing the following. The user can choose a threshold that limits how different a feature may be between the unknown and the best matching reference specimen. The threshold is expressed as the difference in the feature values divided by the value of the reference specimen. If any individual feature exceeds this threshold the match is considered poor and the unknown is either assigned to the class OTHER or the decision is passed on to the syntactic-silhouette-matching classifier. The default threshold requires a difference of 1.0 or greater (difference of 100% or more) to reject the 1NN classifier's decision. The user can alter this threshold with the optional argument, "-MaxFeatDist F", where F is a floating point value of zero or greater. While each individual feature may not indicate a poor match there can still be a poor match overall. Therefore, some embodiments include a second threshold for the overall match in feature space. If the overall Euclidean distance exceeds a threshold value, the best match is considered poor. The default value is 0.5, which is equivalent to the features' having an average difference of 50% or more. The user can change this threshold by adding the following optional argument, "-AvgFeatThrs F", where F is a floating point value that can be zero or greater. Rather than set a limit on the quality of the nearest neighbor classifier's match as a percentage difference from the best matching reference specimen, some embodiments replace these threshold metrics with actual confidence levels based on statistical tests. In some embodiments, for each feature a statistical test is conducted to see if the unknown is a statistical outlier and should not be considered as a member of the population of the best matching class. There are several such statistical tests to choose from. Some embodiments use Grubbs' test for detecting outliers. Grubbs' test calculates a ratio called Z, where Z is equal to the difference between the unknown's feature value and the mean value of the reference specimens of the class that best matches the unknown, divided by the standard deviation among the reference specimens of the best matching class. The mean and standard deviation has to also include the unknown in it. If Z exceeds a critical value for a given confidence level, some embodiments reject the decision of the 1NN classifier. The user can choose among several confidence levels. The user can choose a probability of error in rejecting the decision of the 1NN classifier of 10, 5 and 1%. If each of the features used by the 1NN classifier passes the Grubbs' test some embodiments do an additional multivariate outlier test such as the Mahlanobis d-squared test. These statistical outlier tests are described by Barnett and Lewis (1994). The mean and standard deviation of each feature for each class will be calculated at the time of training and will be added to the feature file.

In some embodiments, the user chooses whether to use the extended silhouette-matching routine when the 1NN classifier finds ambiguity (poor statistical match) by including the optional argument "-silh" followed by the name of the prototype silhouette file on the command line. The extended silhouette-matching classifier will increase the accuracy of classification by either confirming that the 1NN classifier chose the correct class or it may find: that the correct class is a different species; the detection is clutter (no portion of the detected area matches one of the prototype silhouettes adequately) and report it as the class, OTHER; that the detection is a case of overlapping specimens and it will classify each of them; or some combination of the three previous decisions. Thus, the silhouette/color matching method is useful for classifying detections when the 1NN classifier's results suggest there is some uncertainty, perhaps due to occlusion (bodies of arthropods partially covering each other), or where parts of arthropods are missing due to damage. Experiment 2B gives examples of how this process works (FIGS. 36-37).

To keep the number of reference specimens in the data base of prototype feature files to a manageable number while still retaining most of the information about the distribution of features for each class, Hart's condensed nearest-neighbor algorithm is used (Hart, P. E. 1968. "The condensed nearest neighbor rule." *IEEE Trans. Inform. Theory*. IT-14, pp. 515-516). Hart's algorithm can reduce the number of references without greatly decreasing the accuracy of the classifier.

The detection/classification results can be sent in text form either to the user's screen or to a text file. In addition, the results are graphically displayed using color, for rapid recognition by the user (see FIGS. 28 and 29). This results image is saved as a file called, ClassifyImg.bmp. Each detected region is labeled with the color that is associated with the class that has been assigned to the detection. The colors are chosen in advance and set inside the program, BugClassify.exe. Species 1 is assigned the color green, species 2 blue, species 3 yellow, etc. The species of arthropods are assigned to these color indices when the user edits the feature file and gives each reference a species classification number. It is this number that is used to assign the color code. The species number, 0, is reserved for the class OTHER and OTHER is assigned the color red.

An Experimental Demonstration of the Concepts

This section demonstrates practical applications of the inventions. Experiments 1 and 2 show that the technology can be configured in a version that uses a color scanner, connected to a host computer, to acquire arthropod images. This configuration would commonly be used indoors in laboratory and office settings to count insects and/or classify them. For indoor use a scanner may be preferable to a digital camera for acquiring arthropod images, since scanners are generally less expensive than a camera of comparable color quality and resolution. In addition, a scanner is able to image a larger area than a camera, which is beneficial for processing samples containing many arthropods. Furthermore, a scanner, unlike a digital camera system, does not need a supplemental light source to insure uniform lighting. A light source is already incorporated in the scanner, making system integration much simpler.

These first two experiments were conducted to illustrate the usefulness of the technology to a wide variety of users such as environmental science and biology teachers, ecologists, entomologists, pest management specialists and custom inspectors. These professionals can use the technology for the following: a) students in an ecology class collect insects and want to rapidly classify them. The insects are collected, killed and placed on a scanner in one of the embodiments configured for this application; b) an insect-pest specialist takes samples of insects in their habitat using sampling devices such as sweep nets, aspirators or D-Vacs (a vacuuming device), optionally kills, immobilizes or knocks them out by chemical means, and then deposits the sample on the surface of the scanner to have them automatically classified and counted; and c) a county agent who classifies arthropods as a community service or a custom's agent in charge of classifying insects in luggage rapidly kills the insect with a kit provided with the system, and places the unknown specimen on the scanner surface for classification. The system would compare the unknown insect against one of the databases of known prototype insects.

Some embodiments are designed to be highly customized for specific applications. For example, in the case that an embodiment is for a customs facility, the system would be configured in such a way that the user has in the system's database of prototype features and silhouettes, insects of relevant importance to the concerns of that particular customs office.

In another embodiment, when logged on to a host personal computer (PC), the user places insects or other arthropods on the scanning surface, acquires images of those specimens and stores them on the host computer. The user employs an embodiment of the invention's software on the host PC to detect, classify and count the arthropods that were placed on the scanner.

Experiment 3 demonstrated an alternative approach to collecting and processing images of insects and arthropods. Rather than obtaining insect images by placing them on the surface of a scanner, a digital color camera is placed near and with a view of the arthropod-collecting or -detection surface. The portability and small size of a camera as opposed to a computer scanner is appropriate for field conditions, especially as part of automatic sampling devices. A digital camera is also preferred for the hardware portion of the system when magnification via a lens is needed. Experiment 3 shows that a camera-based system can automatically detect, classify and count insects that have been caught on or in traps in the field, or after being collected have been placed on another type of detection surface.

Experiment 1: Equipment Setup. See FIG. 6.

1.—An Epson Perfection 1200U scanner communicated with a Macintosh Power Mac G4 (Mac OS X Version 1.5 operating system) via a Universal Serial Bus (USB) connection. The scanner used the TWAIN 5 software. This software allows the user to collect images and adjust image quality. The TWAIN software initially shows a preview image of the entire scanning surface. A portion or subwindow was then selected that included all of the insects/arthropods, before the final full-resolution image was requested. The resulting images were saved to a bitmap format file for further processing. The scanner has an imaging surface that is 21.6 by 27.9 centimeters in area (8½ by 11 inches) and can collect images of resolutions ranging from 50 to 9,600 dpi. The scanner can save the color as 24 or 48 bit information. A spatial resolution of 96 dpi and 24-bit color were used. To avoid crushing the insects on the scanner's glass surface with the scanner's cover or lid, a white cardboard box was used as a cover and background. The box was 19 cm wide, 28 cm long, and 5.1 cm high (7½×11×2 inches).

2.—Adobe Photoshop 7.0 software on the Macintosh was used to collect the images of insects placed on the scanner's surface. Adobe Photoshop handed off control for an image collection request to Epson's TWAIN 5 software.

3.—The image files were transferred to a Dell Dimension XPS T550 PC (Intel Pentium III processor) over the internet by attaching each image file to an email message. The image-processing software was executed on this Dell PC. The Dell utilized the second edition of the Microsoft Windows 98 operating system. Two different computers were used because in the particular embodiment employed in Experiment 1 the image-processing software only ran on a PC using a DOS shell of any of the Microsoft Windows operating systems, but the scanner was connected to and set up for a Macintosh computer. In many embodiments, the system would be configured in a manner that the scanner and processing software would all be hosted by just one computer.

Description of the Experiment and its Results

For clarity, the same sequence of functions described above in the section, GENERAL DESCRIPTION OF THE OPERATION OF THE SYSTEM, is used here to describe how this configuration of the technology worked for this experiment. The system was configured to simulate a situation where it is used to classify insects that are collected in a habitat of particular interest. For example, an ecology instructor wants to use the system to assess the abundance of certain insects in a horticultural garden at various intervals. Thus, insects from an urban Minneapolis, Minn. garden were used to simulate this example.

A. Generation of a Background Image

Normally when the system is used, the first function is to collect a background image, that is, an image of the detection surface 624 prior to placing insects on the surface. However, for applications like this, some embodiments do not need to generate a background image. This experiment demonstrated that the software does not require a background image as input. In some embodiments, the system can estimate the appearance of the detection surface without insects from the background of the image with insects. Each pixel of the estimated background used the median pixel values for the color components R, G, and B, from the test image. See explanation in "General Description of Operation of the System", function A.

B. Generation of Identifying Reference Features from Known Arthropods

In this function features were extracted from a set of images containing identified and representative insects collected in the garden. Eleven training or reference insects were used, which included 6 species:

1) two individuals of a species of syrphid fly that has yellow stripes on its thorax (Diptera: Syrphidae);

2) two asparagus beetles, *Crioceris asparagi* (Linne) (Coleoptera: Chrysomelidae);

3) one individual of a second syrphid fly species with no stripes on its thorax. It appears to mimic a honey bee (Diptera: Syrphidae);

4) three halictid bees (Hymenoptera: Halictidae);

5) one blow fly (Diptera: Calliphoridae);

6) two multicolored Asiatic ladybird beetles, *Harmonia axyridis* Pallas.

The features were generated by executing the detection and classification software, called BugClassify.exe, in what is referred to as the "training mode," with the image of the known prototypes or reference insects as input. In the "training mode" the software executes in exactly the same manner as in the "detection/classification mode" until the last function, classification. Instead of trying to classify the insects, in the "training mode" the software saves the feature set associated with each known insect to a file called the feature file (Identifying Reference Feature file). Once this file is generated it must be edited by the user by adding the species name and species code number to each reference insect's set of features. A code number of the prototype's aspect or orientation is also added. This allows the classifier to assign the species name or identity associated with the feature set that best matches the features of the unknown.

In some embodiments, the present invention is successful even at distinguishing different color forms of a single species of ladybird beetle, the multicolored Asiatic ladybird beetle.

The scanning system was used to acquire two images containing reference specimens of garden insects. These two pictures contained the same 11 individuals. In one image the insects were placed with a view of their dorsal surface while in the other they were oriented with a view of their ventral surface. In a few cases the insect's legs or wings interfered with getting a true dorsal or ventral view. In such cases, these insects had a portion of their lateral side also in view.

The two training images were collected on the Macintosh via Adobe Photoshop. In Photoshop's main window the File menu was clicked with the mouse and Import Epson Scanner Enable was selected. This brought up Epson's TWAIN 5 software which does an initial pre-scan. A subwindow was selected for the final image, color photograph was selected for the image type, 96 dpi was selected and then Scan was clicked. After each image was captured and displayed, Save As was clicked, the name of the file was entered and then the Save button was hit.

The two images were saved as two files, ScanDorsalTrain.bmp (FIG. 25) and ScanVentralTrain.bmp (FIG. 26). Bug- Classify.exe was executed with each of these images as input to generate a reference feature file. The functions were as follows:

> BugClassify ScanDorsalTrain estimatebackground
> ScanDTrain-train
>
> and
>
> BugClassify ScanVentralTrain estimatebackground
> ScanVTrain-train The two resulting feature files, ScanDTrain.txt and ScanVTrain.txt, were merged into one file, ScanTrain.txt, in the text editor, CodeWright, and the species identification for each feature set was also added in CodeWright.

Although the software BugClassify.exe calculated all the statistical features mentioned in Section E of the previous section, "General Description of the Operation of the System," only seven of the features are chosen, in this embodiment, to be saved for identification to the file, ScanTrain.txt. The seven features were:

Size-related features:
1) total area;
2) perimeter;

Shape-related features:
3) Circular fit or compactness feature—sometimes referred to as the isoperimetric quotient, defined as 4(pi) times the total area divided by the square of the perimeter (Russ 1995). This feature is used to measure how close to a circle and how compact an arthropod's shape is.
4). Rectangular fit feature—this feature calculates how close an insect is to a rectangle in shape.

Luminance features:
5) Average Intensity Difference—the average of the difference in intensity between the object and its background. As long as the lighting is controlled, keeping it nearly constant, this feature provides information about the relative amount of light that the object reflects.
6) Coefficient of Variability in Intensity Difference—the relative amount that the intensity difference varies over the object. This feature is calculated by dividing the standard deviation in the intensity difference (difference between object and background) by the mean intensity difference.

Color feature:
7) Color feature matrix—the 2D hue/saturation color histogram that was developed and which provides a simple and practical way to summarize the color of an arthropod or insect that is independent of scale and rotation in the image.

Prototype silhouettes were not extracted for this experiment, to show that the nearest-neighbor classifier works well on its own without the extended silhouette-matching method (See Section B in "General Description of the Operation of the System" for a complete listing of this embodiment's capabilities).

With the feature file, ScanTrain.txt, the system was then configured to identify unknown insects. The feature file contained the feature set from the 22 insect images shown in FIG. 25 and FIG. 26. The 22 insect images were actually a dorsal and ventral view of 11 individual insects representing 6 species.

C. Acquisition of Images of the Unknown Arthropods to be Detected

Two pictures were collected to test the ability of the equipment, process and software to detect and recognize various insects. These images simulate the actual use of the scanner-based system for detecting, identifying and counting insects. Each image used 10 insects that had not been used to train the system. The 10 insects included: 1) two syrphid flies of a species with a striped thorax; 2) one syrphid fly of the species without a striped thorax; 3) two halictid bees; 4) one blow fly; 5) two Asiatic ladybird beetles; and 6) two asparagus beetles.

The two pictures (FIG. 27A and FIG. 27B) were taken of the same 10 individual insects. The insects were first placed with their dorsal side down on the surface of the scanner. An image was captured and saved as a computer file, ScanDorsalTest.bmp (FIG. 27A). The next function was to place the same insects with their ventral side on the scanner's surface. They were scanned and this second image was saved as a computer file, ScanVentralTest.bmp (FIG. 27B). The insects in each image were placed at various angles of rotation in the 2D image space to show that the system is insensitive to rotation.

D.-F. Arthropod Detection, Feature Extraction, Classification

In this function the system labeled each pixel from the test images of the insects to be identified (FIG. 27A and FIG. 27B) that appeared different from their corresponding background images, and thus were likely to belong to an insect or clutter. The labeled pixels were then connected into continuous regions or blobs by connected-components analysis. Regions that were too small in area were discarded. Features were extracted from each detection (i.e., each detected object) and these features were then compared with the feature set of each known or reference insect via the single-nearest-neighbor classifier. Although the feature file contained the values for the seven previously described features, the classifier was instructed to use just four of the features: area, circular fit, average difference in gray level or luminance and the invention's color feature.

The first test image, ScanDorsalTest.bmp (FIG. 27A and FIG. 28A) was analyzed by running the executable software, BugClassify.exe, with this image and the feature file, ScanTrain.txt (generated in function B), as input. FIG. 28B has the output image from that process. All 10 insects were detected with no false detects. Each of the test insects matched well with a reference of the correct species so it was not necessary to assign any of them to the unknown class, OTHER. BugClassify.exe output to the computer screen a summary of the numbers counted for each species, but that is not shown here. The detected or labeled pixels associated with each of the detected insects were replaced in the output image with the color code for the species class that was assigned by the classifier. Non-detected pixels in this output image were assigned the same values as they had in the input image. The color code is as follows:

GREEN=yellow striped thorax syrphid fly;
BLUE=orange non-striped thorax syrphid fly;
YELLOW=asparagus beetle;
ORANGE OR BROWNISH RED=halictid bees;
LIGHT BLUE GREEN=blowfly;
PURPLE=Multicolored Asiatic Ladybird beetle.
RED=OTHER Here is a brief explanation of how the system identified the unknown insects. The classifier in the software calculated the percentage difference in each feature with respect to the prototype's value. Thus, the percentage difference was calculated between the unknown and known for area, shape, and luminosity, as well as the percentage difference in overlap of the two color matrices. The classifier then used each of these "normalized" features (feature is scaled by its expected value, which is the reference specimen's value) to generate an overall goodness-of-fit measure. This goodness-of-fit measure is a Euclidean distance metric, the square root of the sum of the squares of the percentage difference in each feature. The unknown was assigned to the class of the prototype with the smallest or closest value for this Euclidean distance. If, however, the best match differed by more than 40% in area, or if the contents of the two 2D hue/saturation histograms overlapped by less than 68%, or the average gray-level difference was off by more than 12%, or the overall Euclidean metric differed by more than 1.0 (fraction rather than a percentage), the conclusion was that the match was not good and that the object must be something that had not been presented to the classifier during training (a species or object not represented among the prototypes of the feature file). In this case, the unknown was assigned to a class called OTHER. These thresholds were empirically arrived at by prior testing with several sets of other types of insects and additional images of the same types of insects used in this experiment. Note that a poor match can also indicate that there is more than one arthropod and that one is occluding the other or that the individual arthropod may be damaged or unusual in some other way. These possibilities were addressed in Experiment 2B.

The processing of the second test image (FIG. 27B and FIG. 29A) also produced correct results (FIG. 29B). All the insects were detected and correctly identified without any false alarms. The inputs to this test were the input file, ScanVentralTest.bmp (FIG. 27B and FIG. 29A) and the reference file ScanTrain.txt. Note that for both test images shadows, particularly those associated with the larger flies, did not cause any problems. They were not detected or segmented along with the insect. The image-processing algorithm is able to recognize shadows and thus avoids labeling shadow pixels as being significant from the background.

To summarize Experiment 1, the validity and practicality of the invention's concepts were demonstrated. It was shown that the invention is able to detect insects within an image and avoid detecting shadows or including them with the labeled area of the insect. It was shown that it is possible to generate distinguishing features to recognize insects. It was also demonstrated, that the orientation of the insect or arthropod is not critical to its identification, provided that there is a distinct set of features associated with each position and that the insect and its position are represented among the prototypes of the feature file. Finally, it was also shown that by using the invention's image-processing algorithms, a color computer scanner and a computer system, it is possible to automate the detection and classification of insects.

Experiment 2A.

This experiment builds upon what was done in Experiment 1 and was performed to prove that the nearest-neighbor classifier is able to distinguish between the insects it has been trained to recognize and various forms of clutter that could be present in some applications. For example, if the user placed insects along with plant parts on the scanning surface. This could happen if an embodiment of the system is used by a person who is sampling insects on vegetation with a sweep net. The sampler sweeps the net over vegetation that may harbor insects, transfers the collected material that includes insects and plant parts to a device to kill the insects and then places the collected material on the scanning surface of the system. In addition, it was shown that the feature set and 1NN classifier are robust, since they can often identify incomplete arthropods, i.e., insects or arthropods with parts of their body missing from the damage caused by handling them after some of them had become dry and brittle.

Equipment setup. FIG. 6. Same setup as in Experiment 1.
1.—An Epson Perfection 1200U scanner connected to a Macintosh Power Mac G4 via a USB cable, to collect the test image.
2.—Epson's TWAIN 5 software via Adobe's Photoshop 7.0 was used to set the scanner's resolution to 96 dpi with 24-bit color resolution and to request an image.
3.—The collected images were processed with the image-processing software on a Dell personal computer with an Intel Pentium III processor running the Microsoft Windows 98 operating system.

Description of the Experiment and its Results

The same sequence of functions described above in the section, GENERAL DESCRIPTION OF THE OPERATION OF THE SYSTEM, is used here to describe how the system identified and counted several insects that were mixed with plant material (clutter). This was done to show that the system can reject objects that are not the arthropods that the classifier has been trained to recognize. The contents of a sampling tool, such as an insect net, may deposit vegetation and other debris on the detection surface besides arthropods. The insects were collected from vegetation in a Minneapolis garden.

A. Generation of a Background Image

As in Experiment 1, a background image of the scanner's surface was not collected before the insects were placed on it. The system estimated a background (see explanation in Section A of Experiment 1) from the test image.

B. Generation of Identifying Reference Features from Known Arthropods

Since this experiment worked with the same insect species imaged under the same scanner conditions as in Experiment 1, the system was already configured for this situation. The computer contained the feature file that was generated for Experiment 1. This file contained the following seven features for each reference specimen: 1) area; 2) perimeter; 3) circular or compactness shape feature; 4) rectangular shape feature; 5) average difference in luminosity between the insect and the background; 6) the relative variance in the average intensity difference; and 7) the color feature or 2D hue/saturation color histogram. This feature file contained the feature sets of the 22 insect images shown in FIGS. 25 and 26. The images were dorsal and ventral views of 11 individual insects representing 6 species. Prototype silhouettes were not generated for this experiment, to demonstrate that the 1NN classifier can recognize and reject clutter.

C. Acquisition of Images of the Unknown Arthropods to be Detected

The next function in this demonstration was the simulation of placing a mixture of insects and plant parts on the scanning surface. Seven insects mixed with plant material were dropped on the scanner's surface so they would appear in various natural and "random" orientations which might be typical of emptying insects from a sampling device. The seven insects included: one striped-thorax syrphid fly, one blow fly, two Asiatic ladybird beetles, and two asparagus beetles. The plant material or clutter that was placed on the scanner surface included: 1) one sugar maple seed (*Acer saccharum* Marsh); 2) one Amur maple seed (*Acer ginnala* Maxim); 3) one green ash seed (*Fraxinus pennsylvanica* Marsh); 4) a shoot of Korean boxwood (*Buxus harlandii* Hance); and 5) two fragments of bluegrass (*Poa pratensis* L.). As an additional challenge for the system's ability to identify arthropods, two of the insects in this test case were significantly damaged. The syrphid fly (top of FIG. 30A) was missing its abdomen and the asparagus beetle (bottom of FIG. 30A) had no head and thorax. In a real world application, damaged specimens might be expected even though precautions should be taken in the handling of the arthropods to increase the accuracy of the system.

An image was acquired (FIG. 30A) and saved as a file, as was described in Experiment 1, Section B. This image was saved as a file called ScanClutter5.bmp.

D.-F. Arthropod Detection, Feature Extraction, Classification

As indicated for Experiment 1, this function involves: 1) labeling each pixel from the test image that appeared different from the corresponding background image and thus is likely to belong to an insect or clutter; 2) connecting the labeled pixels into continuous regions or detections; 3) extracting features from the detections; and 4) classifying the detections by comparing their features with those of the known insects in the input feature file. As in Experiment 1, the classifier was set to use only four of the seven features in the feature file: area, circular fit, average difference in gray level or luminosity and the 2D hue/saturation color histogram. Each unknown or detection was assigned to the class of the prototype with the shortest Euclidean distance in the four dimensional (four features) feature space. However, if this distance was greater than 1 (fraction, same as 100% difference), or if the difference in area between the unknown and best match was greater than 40%, or if the average gray-level difference between the two was more than 12%, or if the two 2D color histograms overlapped by less than 68%, it was concluded that a good match was not present. Thus for a poor match, the object was assumed to be something that had not been presented to the classifier during training. In this case the unknown was placed in the undetermined class, OTHER.

The software program, BugClassify.exe, was executed with ScanClutter5.bmp (image of FIG. 30A) and the feature file, ScanTrain.txt as input. The following command was used:

BugClassify ScanClutter5 estimatebackground ScanTrain.

The output result image that was obtained appears on FIG. 30B. BugClassify.exe also sent a listing to the computer screen of the classification results for each object that was detected and listed a summary of the numbers detected for each class. The class assigned to each detection was colored coded in the output image as in Experiment 1:

GREEN=yellow striped thorax syrphid fly;
BLUE=orange non-striped thorax syrphid fly;
YELLOW=asparagus beetle;
ORANGE OR BROWNISH RED=halictid bees;
LIGHT BLUE GREEN=blowfly;
PURPLE=Multicolored Asiatic Ladybird beetle.
RED=OTHER The seven insects detected and correctly identified included the syrphid fly and asparagus beetle that were missing a significant portion of their bodies (FIG. 30B). This illustrates how robust the nearest-neighbor classifier is because it uses a set of complementary features. Missing an abdomen or head may produce a misleading size or shape feature, but the color and luminance features may still be adequate for good classification. The six pieces of plant parts were detected but rejected as not being relevant to the sampling goals. They were labeled as red in the output image and as OTHER in the text output's summary. While the grass and ash seed were each detected as one uniform region, the boxwood foliage and maple seeds were each detected as separate multiple regions, but all of these regions were rejected as clutter. Note that in this test case (FIG. 30A and FIG. 30B), as in the previous experiment, the shadows in the images did not cause any problems. As may have been noticed based on the name of this test image, ScanClutter5.bmp, there were four other similar images, each with different insects and arrangements of plant parts. The four other test cases were completely successful at detecting and identify insects as well as rejecting plant material. The case for ScanClutter5.bmp was included here as it was the most complicated of this test series.

Experiment 2A provides another demonstration of the validity and practicality of the concepts of some embodiments. Some embodiments are able to detect insects within an image. With the statistical features that the software extracts and the nearest-neighbor classifier that uses these features, insects are recognized that are included in the training/feature file. Objects that were not intended to be detected and counted—clutter—were appropriately assigned to a class called OTHER or unknown. It was again demonstrated that both the detection and classification of arthropods can be automated.

Experiment 2B.

This experiment demonstrated the versatility and strength of the systems to identify insects even when they overlap (occlusion). Dealing with occlusion can be important. While a user who places his arthropods on a scanner for counting and identification always has the option of making sure the insects don't overlap or touch one another in order to insure greater accuracy (as in Experiment 1 here), this will not always be possible. It will not be possible to prevent occlusions when embodiments of the systems are configured to include unattended insect-monitoring devices in the field, such as sticky traps. In this situation, a sticky surface, where insects are trapped, will be scanned by an imaging device and the resulting images analyzed. As insects accumulate over time they will overlap (occlusion). The demonstration here illustrates that the software has two ways to deal with overlap in arthropod specimens: 1) subtracting from the occlusion arthropods that were previously detected in earlier image collections. This approach assumes that the system is configured to trap and monitor insects periodically over time, so that the earlier of the overlapped insects are known and can be subtracted out along with the background; or 2) using the higher-level extended silhouette-matching classifier in conjunction with the lower-level nearest-neighbor classifier to solve the ambiguity. For more information on silhouettes see Section B. This experiment demonstrated that the nearest-neighbor classifier that is utilized is robust and can recognize complex situations like occlusion or difficult clutter, and request that the extended silhouette-matching method confirm its identifications or have the, silhouette matching do further analysis on difficult cases.

The same sequence of functions described above in the section, GENERAL DESCRIPTION OF THE OPERATION OF THE SYSTEM, which was previously used in describing Experiments 1 and 2A, is also used here to describe how the system detected and identified occluded insects:

A. Generation of a Background Image

A background image of the scanner's surface was collected with insects but before additional insects were placed on it. This was done to show the advantage of using a previous image as a background image in the case of occlusions rather than estimating the background as was done in Experiments 1 and 2A. The events were simulated that would occur if an embodiment of the system was configured as a monitoring device that collected images at periodic intervals. First an image that was collected at an initial period was simulated. For this a background image was collected of the scanner's surface with insects and clutter (plant material), by placing two insects and a plant seed on the scanning surface. This image was saved as the file, Occ1A.bmp (FIG. 31).

B. Generation of Identifying Reference Features from Known Arthropods

For this experiment it was not necessary to generate a reference feature file because this was done in Experiment 1. Thus, the feature file was used, ScanTrain.txt, generated by that experiment as input for this test. For this application, the system's silhouette-matching capabilities also were used. Therefore, prototype silhouettes had to be generated. The prototype silhouettes were extracted from among the reference insects in the training image, ScanDorsalTrain.bmp (FIG. 26A), of Experiment 1. The silhouette from one individual of each of the six insect species was used. The silhouettes were taken from the following insects of ScanDorsalTrain.bmp:

1) the syrphid fly with the striped thorax was represented by the silhouette of the top left-most insect;
2) the asparagus beetle's silhouette was from the right-most asparagus beetle of the second row;
3) the syrphid fly without a stripe was the right-most insect of the second row; 4) the right-most halictid bee in the third row was used for a silhouette;
5) the blow fly silhouette was extracted from the blow fly of the fourth row; and
6) the ladybug silhouette was taken from the right-most ladybird beetle.

The following process was used to extract the silhouettes. Since the silhouette-generating and -matching routines were not completely integrated into this embodiment's overall program, BugClassify.exe, at the time of this test, the silhouettes were generated by a series of commands. First, the program BugClassify was executed using the file ScanDorsalTrain.bmp as input along with the arguments to tell the command to operate in the training mode. In a DOS shell the following command was typed:

BugClassify ScanDorsalTrain estimatebackground trainingmode

One of the intermediate outputs from this command is the labeled image, LabelImg.bmp, which contained the labeled detections. Another command, MakeSilh.exe, was executed with LabelImg.bmp as input and SilhImg.bmp was the output. The command line in DOS for this function looked like this:

MakeSilh LabelImg SilhImg

The latter image contained the silhouette images of the reference insects. Finally, SilhImg.bmp was used as input for GetSilhCode.exe which used the silhouette images to generate the prototype silhouettes in a chain-code form which was saved to a file called ScanSilhouette.sil. The command was as follows:

GetSilhCode SilhImg ScanSilhouette

This file was hand edited in the text editor, CodeWright, to append the color reference points to each of the six desired silhouettes. The extra silhouettes were deleted. The silhouettes are illustrated in FIGS. 32A-32F.

C. Acquisition of Images of the Unknown Arthropods to be Detected

The next function was the simulation of insects that are occluded. For overlapping pairs of insects, the following were placed on the scanner: 1) a pair of asparagus beetles abutting one another with little or no overlap; 2) a pair of multicolored Asiatic ladybird beetles were placed side by side with little overlap; and 3) an ash seed was positioned so that it obscured at least half the view of a halictid bee (FIG. 33).

An image of these occluded insects was acquired in the same manner as described in Experiment 1, Section B. The image was saved as a file called Occ2A.bmp. This file was created to show that in the case of occlusion the nearest-neighbor classifier can correctly identify members of an occlusion if the system has information about one of the members of the occlusion from a previously processed image. Otherwise it was to be demonstrated that the occlusion problem can still be solved by the nearest-neighbor classifier's calling upon the higher-level classifier, the extended silhouette-matching method.

D.-F. Arthropod Detection, Feature Extraction, Classification

The program BugClassify was run with Occ2A.bmp as the current image input file, Occ1A.bmp as the previous image input file, and ScanTrain.txt (from Experiment 1) as the feature file. The command line appeared in DOS as follows:

BugClassify Occ2A Occ1A ScanTrain

All three insects added since the collection of the image Occ1A were detected and correctly identified (FIG. 34). By taking the difference in the luminance and color between the two input images, the algorithm detected only the objects that were new to Occ2A.bmp and had not been in Occ1A.bmp. This left unambiguous detections for the asparagus and ladybird beetles. The nearest-neighbor classifier found good matches for both these detections since the complete insects were detected. The nearest-neighbor classifier even found the halictid bee was the best match for the occluded bee in spite of the fact that half of it was missing from view. Even though a halictid bee was the best match for the occluded bee, its matching score was poor enough to make this identification uncertain. The nearest-neighbor classifier was able to select the halictid bee because prior to running this test the set of features used by the classifier in Experiments 1 and 2A was changed. Three of the four previously used features were used, area, average relative luminance and the color feature, but the roundness feature was replaced with the insect's width. It was known in advance that the shape of the bee would be compromised by the occlusion, but not the bee's width. Although the best match for the occluded bee was a halictid bee, it was a poor match with respect to the area, color and gray-level features. By the criteria or threshold set in Experiment 2A for rejecting something as clutter, the occluded bee was considered as possible clutter and was left for the silhouette-matching method to clarify. The matching scores of the beetles, on the other hand, were good enough to accept without further analysis.

Although integration of the silhouette routines into Bug-Classify had not been finished at the time of this experiment, manual simulations demonstrated how the nearest-neighbor classifier will interact with the invention's color extended silhouette-matching classifier, in some embodiments. Since the nearest-neighbor-classifier matching scores for the asparagus beetle and ladybird beetle were very good, there was no need to invoke the silhouette classifier to confirm their identification. Where the matching metrics of the nearest-neighbor classifier indicated there was a good match, silhouette matching is optionally omitted in this embodiment, since it is currently a computationally-intensive and time-consuming method. The following functions were taken to simulate how the software will process the case of the occluded bee. As described in Section B of this experiment MakeSilh.exe and GetSilhCode.exe were used to generate a silhouette chain code file of the halictid bee from the intermediate label image produced by BugClassify. TransSilh.exe then read in the silhouette code of the occluded bee and the prototype silhouettes in ScanSilhouette.sil. The command in the DOS window appeared as follows:

TransSilh HBeeSilh ScanSilhouette Occ2A

TransSilh placed each prototype silhouette with its center overlapping the center of the occluded bee's silhouette. It then rotated each prototype 360 degrees at one degree increments. At each increment of rotation it tried shifting the prototype silhouette by as much as 30 pixels in both directions of x and y. The best matches were recorded for each of the prototypes. TransSilh then assigned the occluded bee to the class of the prototype that had the best match, provided that enough pixels of the silhouettes overlapped and the pixels for color sampling agreed with those of the unknown. The halictid bee's prototype silhouette matched the occluded halictid bee best (FIGS. 35A-35C). This was considered an acceptable match, as nearly half the occluded silhouette's pixels overlapped those of the prototype and its remaining pixels were close to those of the prototype and three of the six color sample pixels matched those of the prototype. If this best match had accounted for only a portion of the occluded bee's area, the methodology would have continued considering the other good matches for the remaining portions of the detection, as there could have been another insect that was part of the detection. In the case of the occluded bee, the bee prototype accounted for the entire area of the unknown bee. This portion of the experiment demonstrates that the extended silhouette-matching routine can be useful for correcting or confirming identifications by the nearest-neighbor classifier. It was also illustrated that having information about previously trapped insects can aid in solving occlusion problems simply by subtracting the previous image from the current one.

One more test was conducted as part of this experiment to demonstrate that the nearest-neighbor classifier can detect a matching problem for each of the three occlusions and request that the extended silhouette-matching routine do further analysis. For this, a background image that contained insects was not used. Thus, in this test the system had no prior knowledge about one of the members of each occlusion. The program BugClassify.exe was executed with the image, Occ2A.bmp (FIG. 33) and the feature file, ScanTrain.txt as input.

The command appeared in the DOS shell as follows:

BugClassify Occ2A estimatebackground ScanTrain

BugClassify.exe estimated a background from the test image containing insects (FIG. 33). BugClassify detected all three sets of occluded insects without any false alarms (FIG. 36). To generate FIG. 36, a version of BugClassify was executed that outputs a decision image that color codes each detection with the best match of the nearest-neighbor classifier, regardless of whether the classifier would eventually reject it as possible clutter. If the normal version of BugClassify had been used, it would have reported all three detections as OTHER and colored them red. This version of BugClassify was used to simulate the invention's approach of having the nearest-neighbor classifier withhold final judgment and pass the final decision to the extended silhouette-matching classifier. FIG. 36 shows that the nearest-neighbor classifier found the best match in statistical-feature space for the pair of asparagus beetles was a blow fly. This figure also displays that the pair of ladybird beetles and the ash seed with halictid bee best matched a syrphid fly. The feature-matching scores for the best match for each of these three detections were sufficiently poor to suggest that they could represent either clutter or occlusions. The nearest-neighbor classifier rejected the best matches as acceptable because the clutter-rejection criterion that was mentioned in Experiment 2A was exceeded in each case. The color feature and gray-level feature were too dissimilar to have confidence in the best match. In addition, the area of the ash seed with the bee was far too large to actually be the best match, a syrphid fly.

The action of the extended silhouette-matching routine was simulated by executing the following sequence of functions:

As was mentioned in the previous paragraph, the command BugClassify was executed with the option to estimate the background. BugClassify in addition to producing the output image of FIG. 36 also produces an intermediate results image called LabelImg.bmp. This is a labeled image of the detected areas after the connected-components software has grouped the pixels that appear different from the background, into contiguous regions. LabelImg.bmp was used as input to the command, MakeSilh.exe. MakeSilh.exe produced an image with silhouettes of the unknowns called OccSilh.bmp. The command line in DOS appeared as follows:

MakeSilh LabelImg OccSilh

The command, GetSilhCode.exe, was then used with OccSilh.bmp as input to generate a chain-code silhouette file called TestOccSilh.sil as follows:

GetSilhCode OccSilh TestOccSilh

In the text editor, CodeWright, each of the chain codes for the three occluded detections was copied to their own silhouette-chain-code files called: TestABSilh.sil, TestLBSilh.sil and TestHBSilh.sil. These three chain-code files contained the silhouette chain code for the asparagus beetles, ladybird beetles and ash seed/bee, respectively. The prototype silhouette file, ScanSilhouette.sil, and the command, TransSilh.exe, were used with each of the occluded silhouette files to find the best matches for each occlusion and to simulate the higher-level classification logic. To do this the following three commands in the DOS shell were run:

TransSilh ScanSilhouette TestABSilh Occ2A

TransSilh ScanSilhouette TestLBSilh Occ2A

TransSilh ScanSilhouette TestHBSilh Occ2A

The extended-silhouette-matching method correctly detected and identified each of the beetles. For the detection that included the pair of asparagus beetles, the best match was for the asparagus beetle on the left (FIG. 37A). This best match was the prototype of the asparagus beetle. Thus the beetle on the left was accepted as an asparagus beetle because: 1) more than half the pixels of the prototype's silhouette overlapped the silhouette of the unknown; 2) the remaining pixels of the prototype's silhouette were a short distance to the unknown's silhouette; and 3) more than half the sample pixels for color matched the unknown's corresponding pixels in color. If more than 40 to 50% of the prototype's silhouette overlap the unknown's silhouette (or vice versa) and half or more of the color sample pixels agree with the unknown in color, then it is considered that the match can be accepted as correct and the class of the prototype can be assigned to the unknown. The best match in a remaining portion of the asparagus beetle occlusion was also the prototype silhouette of an asparagus beetle (FIG. 37B). This match was also accepted as a correct identification because nearly half the pixels of the silhouette prototype overlapped the occluded area's silhouette, and most of the color sample pixels agreed in color with those of the unknown.

The identification process for the ladybird beetles was similar to that of the asparagus beetles. The best match and second-best match for the ladybird beetle detection was the prototype silhouette of the ladybird beetle. The prototype ladybird silhouette and the ladybird in the lower right produced the best match (FIG. 37C), while the second-best match was between the prototype silhouette of the ladybug and the silhouette region corresponding to the ladybug in the upper left (FIG. 37D). Both of these matches were considered correct identifications since half or more of the prototype's silhouette overlapped the silhouette of the unknown and the color sample pixels agreed in color with the pixels of the unknown.

The invention's approach to silhouette and color-pattern matching found that a halictid bee was the best overall match for the area around the occluded halictid bee (FIGS. 37E-37F) while the remaining portion of the occlusion was considered clutter. However, the matching score was not high enough to say with certainty that there was a halictid bee there. The match between the halictid bee prototype and the occluded bee was the third best in terms of percentage of silhouette pixel overlap (FIGS. 38A-38C), approximately 21% of the pixels overlapped the unknown's silhouette, but it was the best overall match because half the color sample pixels were correct. The remaining top silhouette matches (spurious correlations of the halictid bee and asparagus beetle with the ash seed) were rejected because none of the sample pixels for color matched the unknown area's color and the percentage of the prototype's pixels that overlapped the unknown silhouette was also low. Thus, the region associated with the ash seed was rejected as clutter by the extended silhouette matching.

If the prototype silhouettes had been scaled (made slightly larger and smaller) in addition to translating (shifting them in x and y, parallel to the x and y axes) and rotating them when looking for a better match, a better matching score is obtained in some embodiments, between the bee prototype and the occluded bee. This would have made the identification of the occluded bee more certain. Although some embodiments only translate and rotate the silhouettes, in other embodiments, it is advantageous to also scale the prototype silhouettes, in order to take into account the natural variation in size among individuals of a given species. Whether or not the classifier should count the detected halictid bee depends on how much uncertainty the user is willing to accept. If the user is willing to lower the acceptance thresholds to count this detection as a bee it is possible that the user will get additional false detections and incorrect identifications on other occasions. One additional point with regard to silhouette matching based on the occluded bee is that it may be difficult in general to recognize arthropods with much confidence when half or more of the specimen is not visible. Clearly, if the insects are just touching or barely overlapping, the syntactic-silhouette-matching method can effectively detect and identify the members of the occlusion. This is also true if the older member of the occlusion can be subtracted by using a previous image as a background input image.

Experiment 2 demonstrates that not only can some embodiments of the invention automatically detect and identify a variety of arthropods at widely differing orientations but they can also deal with such difficult problems as recognizing objects that can be considered clutter, detect and count occluded arthropods and recognize arthropods with missing structures due to damage or occlusion. It was also shown that by using the image-processing algorithms, a color computer scanner and a computer system, it is possible to automate the detection and classification of insects for teachers, researchers, pest-management practitioners, and the employees of various governmental regulatory agencies and public service departments (such as the agricultural extension service). This automated technology reduces the time and cost of sampling, which will allow research and pest-management personnel to improve their monitoring of arthropod populations. With more time and lower costs, they will be able to sample more frequently and/or be free to investigate other aspects of the arthropods that they are studying. This scanning system also offers public agencies a quick and simple way of identifying common insects where people trained in taxonomy are not available or their time is limited. If the individual is attempting to identify an uncommon species that is not in the classifier's database, the software can be instructed to indicate that the best match is not a very good match (just like the method of clutter rejection) and that the user should consider that the correct insect may be in another database or that a taxonomic expert should be consulted since this is likely to be an uncommon or poorly known species or even a previously unknown species.

Experiment 3.

This experiment further demonstrated the validity of general concepts of some embodiments of the invention and their application to a digital camera-based system. This configuration is applicable to the use of the technology of some embodiments in field detection stations, where the automatic detection, identification and counting of insect/arthropods captured on or in various types of traps such as colored sticky boards or baited pheromone traps is proposed. This configuration would include:

a) a sticky surface to which insects are attracted by various stimuli including color, pheromones, kairomones or patterns; and b) an imaging device to acquire images of the sticky surface at various intervals. Processing of the images could be done in situ or sent by various methods (cable, radio) to a processing location.

Equipment setup for some embodiments. FIG. 39.

1. A digital video camera (Kodak MDS 100 Color Camera) with a wide angle C-Mount lens (Computar 8.5 mm fixed focal length, model M8513, with a 41.0 degree angular field of view for a ½ inch CCD) was mounted on a tripod. The lens was fitted with an infrared filter to insure that the elements of the camera's charged-coupled device (CCD) were exposed primarily to visible light. The camera's lens was 26.04 cm (10.25 inches) from the surface. With the digital zoom of the camera set to a magnification of 1.5, the field of view was 7.9 cm by 5.9 cm (3.1×2.3 inches). The lens has manual focus and iris rings. The resolution of the Kodak MDS is 640×480 pixels.

2. A yellow surface (detection surface 624) (plastic back of compact disk painted with fluorescent yellow paint ACE GLO Spray Fluorescent).

3. Two incandescent lights (40 Watts). The height of the lamps over the surface was 24.1 cm (9.5 inches).

4. A notebook computer (IBM Thinkpad 600) was used to store image data from the camera. The camera was connected to the computer via a Universal Serial Bus (USB). The computer was used also to control the camera (shutter speed, digital zoom, contrast, color balance, hue, saturation and brightness) and do the processing for the detection and identification of the arthropods.

Description of the Experiment and its Results

The same sequence of functions described previously in the section, GENERAL DESCRIPTION OF THE OPERA- TION OF THE SYSTEM, and used for Experiments 1, 2A and 2B, is also used here. For the purpose of clarity they are briefly repeated here as applied to this configuration.

A. Generation of a Background Image

An image of the yellow surface, (detection surface 624), was generated prior to placing any insects to be identified on it. This image was saved as a computer file, backg0.bmp (FIG. 40). To capture this image the computer mouse of the host computer was simply clicked on the icon for Kodak's MDS100 software package. From the window of this program the mouse was clicked on the "Take Picture" button and then from the File menu selected the command "Save As."

B. Generation of Identifying Reference Features from Known Arthropods

Features were extracted from known insects, cotton boll weevils. These features are utilized by the classifier of the software. The features were generated in a mode that is referred to as the "training mode" of the system. The detection and classification software, BugClassify.exe, was executed on an image of the known prototypes or reference boll weevils. The software is executed exactly in the same manner as the "detection/classification mode" until the last function, classification. The software then saves the feature set for each of the known insects to a file.

The equipment acquired an image of the reference weevils, called Train1.bmp (FIG. 41), and used this image along with the background image, backg0.bmp, to detect the reference weevils and to generate a feature file (Identifying Reference Feature file), called Weevil.txt. This file contains the values of each feature (feature set) extracted from each of the known boll weevils. This file was then edited to include the species and aspect/orientation that was associated with each reference specimen's feature set. The picture, FIG. 41, contains seven cotton boll weevils used for training placed on a yellow surface in various aspects (positions), which were as follows:

1) three on their sides;
2) one on its back;
3) one on its abdomen;
4) one partially on its side and back; and
5) one sitting on its posterior end.

When the software was run in the "training mode" silhouettes of each reference weevil for classification were optionally not generated, since silhouette matching was not necessary for this application. Although all the statistical features were calculated that were mentioned in Section B of the earlier section, GENERAL DESCRIPTION ON OPERATING THE SYSTEM, an option was selected to write only the four most promising features for identification to the file, Weevil.txt. The first two features were size related, the third was a shape feature, and the fourth characterized the colors of the weevil:

Size-related features:
1) total area;
2) perimeter;

Shape-related feature:
3) circular fit or compactness feature—this feature was described in the equivalent section of experiment 1.

Color feature:
4) the 2D hue/saturation color histogram of some embodiments—this feature was also described in the equivalent section of Experiment 1.

C. Acquisition of Images of the Unknown Arthropods to be Detected

To test the ability of the equipment, process and software to detect various unknown insects, two pictures were taken. These images simulated the actual use of the system to detect and identify insects on a surface. For the first of these pictures three weevils were placed on the yellow surface (FIG. 42). This picture was saved as an electronic file called, wst0.bmp. A second test image was taken (FIG. 43) that included the previous three weevils plus two more weevils and a cantharid beetle. This was stored as a file called, wst1.bmp.

D.-F. Arthropod Detection, Feature Extraction, Classification

This function involved labeling those pixels from the weevil images that appeared different from the background image and thus were likely to belong to a weevil or clutter. The labeled pixels were then connected into continuous regions or blobs by connected-components analysis. Regions that were too small in area were discarded. Features were then extracted and compared with feature sets of known specimens via the single-nearest-neighbor classifier. Although the feature file contained the values for the four previously described features, only two were used to identify the cotton boll weevils: area and the 2D hue/saturation color histogram. For each unknown, the percentage difference in area and percentage difference in overlap of the 2D histogram with respect to each prototype in the feature file was calculated. The unknown was assigned to the class of the prototype that was closest with respect to area and distribution of colors. If, however, the best match differed by more than 45% in area, or if the contents of the two 2D hue/saturation histograms overlapped by less than 40%, this embodiment concluded that the match was not good and that the object must be something that had not been presented to the classifier during training (a species or object not represented among the prototypes of the feature file). In this case, the unknown was assigned to a class called OTHER. These thresholds were empirically arrived at by prior testing with sets of different insects.

The first test image (FIG. 42) was analyzed by running the software BugClassify.exe with the images depicted in FIG. 40 and FIG. 42 and the feature file, Weevil.txt, as input. FIG. 40 represents the previous background state while FIG. 42 is the image containing the three insects to be detected and identified. FIG. 44 is an output from that process. All three boll weevils were detected with no false detects. The detected or labeled pixels associated with each of the detected insects were replaced in the output image with the color code for the species class that was assigned by the classifier. If the classifier decided that an unknown arthropod was a cotton boll weevil, each of the pixels that were associated with that unknown by the segmentation process was colored green in the output image. Pixels that were associated with an unknown that was assigned to the class OTHER were colored red in the output image. Background pixels had the same values as the input image.

The software BugClassSilh.exe was executed for the second test image (FIG. 43), but this time FIG. 40 and FIG. 43 plus the feature file, Weevil.txt, were used as input. FIG. 45 is an output from that process. The weevils are identified as such according to their color code (green) and the cantharid is identified as the class OTHER (color coded red). FIG. 46 illustrates how close the unknown or test boll weevils are to a reference boll weevil in feature space. This figure also shows how different the cantharid is from the reference boll weevils in terms of both area and color. The cantharid beetle was rejected as a boll weevil because the area of the best weevil match differed from the cantharid beetle by more than 45% and the color histograms overlapped by less than 40%. However, if a statistical outlier test is used instead, such as Grubbs' test, a confidence level can be assigned to the best match. In this case, the best match for the cantharid beetle can be rejected because Grubbs' test indicates that there is less than a 1% probability that the cantharid is from the same population as the reference boll weevils based on area alone. Therefore, it can be concluded that the cantharid beetle does not belong to a class of any of the reference specimens and should be labeled as OTHER. It would have been possible to identify the cantharid as such if the system had been previously trained to identify cantharids by including the feature values of one or more reference cantharids. However, in some embodiments the concern is only with counting the number of boll weevils.

These tests have again demonstrated the validity and practicality of the invention's concepts. It was shown that the invention is able to detect insects within an image. It was shown that it is possible to generate distinguishing features to recognize insects and to recognize other objects for which the classifier was not trained. Objects that were not intended to be detected and counted were appropriately assigned to a class called OTHER or unknown. It was also shown that by using the image-processing algorithms of some embodiments, a digital color camera and a computer system, it is possible to automate the detection and classification of insects and other arthropods.

The various method embodiments of the present invention can be implemented on a programmed computer, hardware circuit, or other information-processing apparatus. As such, they are referred to as "machine-implemented methods."

Some embodiments of the invention provide an apparatus that includes an input device configured to receive image information, a detector configures to distinguish one or more objects, including a first object from a background of the image, a histogram generator that generates histogram information for the first detected object, and a comparing device that compares the histogram information to each on of a plurality of stored histogram records in order to generate an identification of the object.

In some embodiments, the object is an arthropod.

In some embodiments, the object includes a plurality of partially overlapped arthropods to be distinguished from one another.

Some embodiments provide a machine-implemented method that includes acquiring a digital image; and detecting a first arthropod object in the image, wherein the detecting includes distinguishing the first object from a background image using image information selected from a group consisting of luminance, hue, color-saturation information and combinations thereof.

In some embodiments, the image information used to distinguish the first object from the background includes luminance, hue and color-saturation information.

Some embodiments further include detecting a second object in the image, wherein the second object is at least partially overlapped with the first object, and distinguishing the first object from the second object using image information selected from a group consisting of luminance, hue, color-saturation information and combinations thereof.

In some embodiments, the second object is not an arthropod object.

Some embodiments further include detecting a second object in the image, and distinguishing a type of the first object from a type of the second object using image information selected from a group consisting of luminance, hue, color-saturation information and combinations thereof.

In some embodiments, the type of the second object is not an arthropod type.

Some embodiments further include generating first-object histogram information based at least in part on color information of the detected first object, and classifying a type of the first object based on the first object histogram information and storing a categorization identifier based on the classifying.

In some embodiments, the first-object histogram information is generated based on image information selected from a group consisting of luminance, hue, color-saturation information and combinations thereof, and wherein the categorization identifier includes a genus identification and a species identification.

In some embodiments, the acquiring of the image includes filtering light for the image to limit a spectral range of the light.

In some embodiments, the acquiring of the image includes filtering light for the image to limit a polarization of the light, and wherein the image information used to distinguish the first object from the background includes luminance, hue and color-saturation information.

Some embodiments provide an information-processing apparatus that includes an input device coupled to receive a digital image, and a detector that detects a first arthropod object in the image, wherein the detector includes a comparator operable to compare image information selected from a group consisting of luminance, hue, color-saturation information and combinations thereof, and wherein the detector distinguishes the first object from a background image based on the comparison.

In some embodiments, the image information used by the comparator includes hue and color-saturation information.

In some embodiments, the detector further detects a second object in the image, wherein the second object is at least partially overlapped with the first object, and the detector distinguishes the first object from the second object based on a comparison of image information selected from a group consisting of luminance, hue, color-saturation information and combinations thereof.

In some embodiments, the second object is not an arthropod object.

In some embodiments, the detector also detects a second object in the image, and distinguishes a type of the first object from a type of the second object using image information selected from a group consisting of luminance, hue, color-saturation information and combinations thereof.

In some embodiments, the type of the second object is not an arthropod type.

Some embodiments further include an identifier that associates categorization identification with the first object.

In some embodiments, the categorization identification includes a genus identification and a species identification.

Some embodiments further include an image-acquisition device that includes a filter to limit a spectral range of acquired light.

Some embodiments further include an image-acquisition device that includes a filter to limit a polarization of acquired light, and wherein the image information used to distinguish the first object from the background includes luminance, hue and color-saturation information.

Some embodiments provide a classifier that can recognize the arthropods regardless of how they are oriented with respect to the imaging device, and in addition to classifying arthropods the system can recognize non-arthropod objects or clutter, image artifacts such as shadows and glare, occlusion or overlapping and touching objects, and incomplete arthropods and the system optionally including one or more of the following:

a) an imaging device to capture pictures of arthropods and the device may be chosen from among the following image sensor types: digital camera, digital scanner, analog or digital video camera; and the sensor should collect color imagery, but a black and white sensor can be substituted for the purpose of reducing cost.
b) an appropriate camera lens for optically coupled to the image device to insure sufficient magnification of the insects and a practical field of view.
c) one or more lens filters to select the portion of the light spectrum that is most efficient for detecting the arthropods of concern and/or filter(s) to selectively remove non-polarized light to reduce glare.
d) a box-like lid for a scanner to prevent contact of the scanner's lid with the arthropods.
e) a polarizing filter placed on the scanner surface to reduce glare by removing non-polarized light.
f) illumination device such as a LED illuminator, ring light or high intensity flash to insure uniform and similar lighting conditions for each image captured and where possible to reduce shadows and glare.
g) a communication link between the camera and the processor, which can include: a direct cable connection using a Universal Serial Bus (USB) connection or a RS-232 serial port connection; wireless device using a radio or infra-red communications band; a phone modem; or an internet connection.
h) a processor along with sufficient memory, and operating system and software to control the camera's functions including lighting and color settings, requesting the capture and transfer of images, processing the image(s) for the detection and identification of arthropods and printing out and/or displaying the results; said processor can be a general purpose computer or specialized computing hardware designed for the arthropod detection and identification system.
i) software to adjust camera settings, capture an image, adjust parameters for image processing routine, apply image processing techniques for the detection and identification of the arthropods, display results to a computer monitor, save results to a computer file, and/or edit files.
j) a surface to place or capture the arthropods that allows the imaging device a clear view to collect images and this surface can include a simple stand alone inspection surface or a surface that is part of a trap or collection device.

Some embodiments provide a first method implemented in software that automatically detects objects including arthropods in an image using luminance, hue and color saturation information to distinguish the objects from a background or an estimated background image.

Some embodiments provide a second method implemented in software that automatically rejects shadows by examining differences in luminance, hue and color saturation between the background or estimated background image and the image being checked for arthropods.

Some embodiments provide a third method implemented in software to extract statistical features that characterize an object's size, shape, luminance and colors (which in the case of reference specimens of arthropods can be stored to a computer file or database) and can be used to calculate a mean and standard deviation for each feature from among the reference specimens of a species, which is to be similarly stored with the features.

Some embodiments provide a fourth method implemented in software to extract: 1) an object's silhouette or outer profile; 2) distinguishing internal edges due to large gradients in luminance or color; 3) reference points of a known offset from the silhouette containing hue and saturation information; and 4) the prototype or reference silhouettes and color samples of arthropods can be stored to a computer file or database.

Some embodiments provide a fifth method or statistical classifier implemented in software that automatically compares statistical features extracted by the third method just described from reference specimens of arthropods and the features similarly extracted from the unknown object under consideration.

Some embodiments provide a sixth method that, on the basis of the unknown's set of features and those of the reference specimens, finds the class which the unknown object is mostly likely to be a member of.

Some embodiments provide a seventh method to assign a statistical confidence to classifier's decision by comparing how each of the features of the unknown are distributed relative to the mean and standard deviation of the features belonging to the members of the class of the matched reference specimen.

Some embodiments provide an eighth method to use the confidence level to make a final decision which can be either: 1) accept the class of the best match for the unknown if the confidence level is good; 2) reject the best match and assign the unknown to an undeterminable class not represented by the reference specimens when one or more features of the unknown exceed the confidence level associated with the class of the best match; 3) as an alternative to item 2, rather than reject the unknown as undeterminable when there is a low confidence instead pass the decision making on to a higher-level syntactic or structural pattern recognition that can deal with occlusion, missing arthropod features, and clutter.

Some embodiments provide a ninth method or classification process implemented to run automatically in software that compares the prototype silhouettes and associated line edges of arthropod structures and color-sample point-of-reference specimens extracted by the fourth method (just described above) with the silhouette and associated information of the unknown.

Some embodiments provide a tenth method and/or logic to iteratively translate, rotate and scale each prototype silhouette looking for the best match and record other good matches for the silhouette and repeat this process for each prototype silhouette.

Some embodiments provide an eleventh method and/or logic that assigns the best silhouette/color sample match to the detection or portion of the detection, provided that the silhouettes and color samples fit the unknown well or otherwise assigns the detected area as clutter.

Some embodiments provide a twelfth method and/or logic that repeats the process for other portions of the detection that have not been explained by any previous silhouette matching until all the detection's area has been explained as being part of an arthropod(s) or clutter.

Some embodiments provide a thirteenth method and/or logic that takes the final results from the process (or subcombinations of the process) defined above and updates the species count of the arthropods and clutter that have been detected and identified by the system.

Some embodiments provide a fourteenth method implemented in software to automatically report the detected and identified arthropods and clutter, and to provide a summary of the detections and identifications to a user's screen, computer file, and/or to output a graphic representation to an image file that is saved to memory or displayed to the user's screen.

Some embodiments provide a fifteenth method implemented in software to allow the user to interact with the software.

Some embodiments provide a method to alter various parameters of the detection and classification process to allow the user to adapt the process to special situations.

Some embodiments provide a sixteenth method to allow the user to request the saving or output of various intermediate results, such as a detected pixels image, segmentation or labeled image of detections, silhouette image.

Some embodiments provide a seventeenth method to alter the settings of the image device. For example, automatic analysis of the image can provide feedback to the image device to improve subsequent images. Alternatively, the human user can look at the image, and provide input to adjust the settings of the imaging device or the illumination provided.

Some embodiments provide a eighteenth method to request the capture of an image or the scheduling of periodic captures of images along with the processing of those images for the detection and identification of arthropods.

Some embodiments provide a nineteenth method to support the system with off-line editing of the reference feature and silhouette files to associate the appropriate class identity with each feature set or silhouette.

Some embodiments provide combinations of two or more of the first through nineteenth methods just described, or of subportions of these methods. These combinations do not necessarily require that any one of the methods be either included or omitted. Some combinations further include other processes, methods, or portions thereof described elsewhere herein. Some embodiments of the invention include (see FIG. 3) a computer-readable media 321 (such as a diskette, a CDROM, a DVDROM, and/or a download connection to the internet) having instructions stored thereon for causing a suitably programmed data processor to execute one or more of the above methods.

Some embodiments provide various supplies that enhance the arthropod-capture process, and/or the image-acquisition process. For example, some embodiments provide an arthropod-capture substrate that includes a sticky surface, and is also colored. In some embodiments, the substrate is colored to attract arthropods of interest. In some embodiments, two or more contrasting colors are provided in order to provide better contrast for a first type of arthropod on a first color, and better contrast for a second type of arthropod on a second color. In some embodiments, a plurality of different colors and/or gray scales and/or hues and saturations are provided (either as part of the substrate, or as an ancillary surface that will be imaged with the substrate and the arthropods), in order to provide calibration information (color (such as hue and saturation), brightness, and/or contrast) in each captured image. In some embodiments, the substrate includes a chemical attractant. In some embodiments, the chemical attractant is supplied as a separate source (e.g., a carbon dioxide container such as a gas cylinder, or supplied from a generator or flame, in order to attract mosquitos or other anthropods) wherein the chemical is emitted through or near the sticky capture surface of the substrate.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
   an input device coupled to receive a digital image; and
   a detector, coupled to the input device, that detects an object in the image;
   a histogram generator coupled to receive object image information from the detector, that generates a first object-image histogram based at least in part on image information of the detected object, wherein the first object-image histogram has a plurality of bins, each one of the plurality of bins located on:
      a row corresponding to a value of a first color-space dimension, and
      a column corresponding to a value of a second color-space dimension; and
   a classifier that classifies the object based on the first image-object histogram and provides a categorization identifier based on the classification.

2. The apparatus of claim 1, wherein the histogram generator uses color information to generate the first image-object histogram, including hue information for the first dimension and color-saturation information for the second dimension.

3. The apparatus of claim 1, wherein histogram generator generates the first image-object histogram having the first dimension that includes hue and the second dimension that includes color-saturation.

4. The apparatus of claim 1, wherein the detector uses color information to detect the object, including both hue information and color-saturation information.

5. The apparatus of claim 1, wherein the histogram generator uses color information based on calculations, from the red, green, blue (RGB) values of each of a plurality of pixels, of substantially: $CR=0.701 \times RED+0.587 \times GREEN+0.114 \times BLUE$, $CB=-0.299 \times RED+0.587 \times GREEN+0.886 \times BLUE$, $SATURATION = SQUARE\ ROOT(CR\ SQUARED+CB\ SQUARED)$, and $HUE=ARCTAN(CR/CB)$.

6. An apparatus comprising:
   an input device coupled to receive a digital image; and
   a detector, coupled to the input device, that detects an object in the image;
   a histogram generator, coupled to receive object image information from the detector, that generates object-image-histogram information based at least in part on image information of the detected object;
   a classifier that classifies the object based on the object-image-histogram information and provides a categorization identifier based on the classification; and
   a distinguisher that distinguishes a first arthropod in the detected object from a second item in the detected object, in digital images where the detected object includes the first arthropod at least partially overlapped with the second item, using image information selected from a group consisting of luminance, hue, color-saturation information and combinations thereof.

7. An apparatus comprising:
   an input device coupled to receive a digital image; and
   a detector, coupled to the input device, that detects an object in the image;
   a histogram generator, coupled to receive object image information from the detector, that generates object-image-histogram information based at least in part on image information of the detected object;

a classifier that classifies the object based on the object-image-histogram information and provides a categorization identifier based on the classification; and a imagable surface having at least one sticky area for capturing arthropods and having at least one colored area for calibrating colors of the image.

8. A machine-implemented method comprising:

acquiring a digital image;

detecting a first arthropod object in the image; and generating first-object histogram information based at least in part on color information of the detected first object; and classifying a type of the first object based on the first-object histogram information and generating a categorization identifier based on the classifying.

9. The method of claim 8, wherein the color information used to generate the histogram includes hue and color-saturation information.

10. The method of claim 8, further comprising:

detecting a second object in the image, wherein the second object is at least partially overlapped with the first object;

distinguishing the first object from the second object using image information selected from a group consisting of luminance, hue, color-saturation information and combinations thereof.

11. The method of claim 8, wherein the first-object histogram information is generated based on hue and color-saturation information, and wherein the categorization identifier includes a genus identification and a species identification.

12. The method of claim 8, wherein the acquiring of the image includes filtering light for the image to limit a spectral range of the light.

13. The method of claim 8, wherein the acquiring of the image includes filtering light for the image to limit a polarization of the light.

14. The method of claim 8, wherein the acquiring of the image includes providing a sticky substrate having first background area that has a first color that is darker than the first object and a second background area that has a second color that is lighter than the first object.

15. The method of claim 8, wherein the acquiring of the image includes providing a substrate having first area that has a first calibration color, and a second area that has a second calibration color that is different from the first calibration color.

16. The method of claim 8, further comprising:

distinguishing the first object from a background image using image information selected from a group consisting of hue information, color-saturation information and combinations thereof.

17. The method of claim 8, further comprising:

adding the categorization identifier to a database, the database including information on a date and a location associated with the categorization identifier.

18. The method of claim 8, further comprising:

applying a pest-control protocol based on one or more categorization identifiers of the database.

19. An apparatus comprising:

an input device coupled to receive a digital image;

means for detecting a first arthropod object in the image and distinguishing the first object from a background image using image information selected from a group consisting of luminance, hue, color-saturation information and combinations thereof; and means for classifying the detected first arthropod object that includes generating a histogram having a plurality of independent dimensions including at least a first dimension and a second dimension.

20. The apparatus of claim 19, farther comprising:

means for detecting a second object in the image, wherein the second object is at least partially overlapped with the first object, and for distinguishing the first object from the second object using image information selected from a group consisting of luminance, hue, color-saturation information and combinations thereof.

21. The apparatus of claim 20, wherein the second object is not an arthropod object.

22. The apparatus of claim 19, further comprising means for acquiring the image including a filter to limit a spectral range of the light and to limit a polarization of the light, and wherein the image information used to distinguish the first object from the background includes luminance, hue and color-saturation information.

* * * * *